US007806625B2

(12) United States Patent  
Carr et al.

(10) Patent No.: US 7,806,625 B2
(45) Date of Patent: *Oct. 5, 2010

(54) INFILLESS AND/OR FUEL ABSORBING SYNTHETIC COVERING SYSTEM FOR SAFETY AREAS OF AIRPORTS

(75) Inventors: Patrick J. Carr, Tinley Park, IL (US); Dale L. Collett, Sedalia, CO (US); William L. Schomburg, Springfield, IL (US)

(73) Assignee: AvTurf, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,012

(22) Filed: Feb. 12, 2007

(65) Prior Publication Data

US 2008/0032069 A1    Feb. 7, 2008

Related U.S. Application Data

(60) Division of application No. 10/445,860, filed on May 27, 2003, now Pat. No. 7,175,362, which is a continuation-in-part of application No. 09/816,524, filed on Mar. 23, 2001, now Pat. No. 6,794,007, which is a continuation-in-part of application No. 09/727,276, filed on Nov. 30, 2000, now Pat. No. 6,620,482.

(51) Int. Cl.
    *E01C 7/32* (2006.01)
(52) U.S. Cl. .......................... 404/75; 404/72
(58) Field of Classification Search ............ 404/75, 404/73, 72; 428/17; 405/36–50; 244/114 R
    See application file for complete search history.

(56) References Cited

U.S. PATENT DOCUMENTS

| 1,939,846 A | * | 12/1933 | Fenton | ......................... 428/17 |
| 1,949,063 A | * | 2/1934 | Merrill | ......................... 404/28 |
| 2,044,498 A | | 6/1936 | Pearce | |
| 3,157,557 A | | 11/1964 | Palmer | |
| 3,395,625 A | | 8/1968 | Blanchette et al. | |
| 3,407,714 A | | 10/1968 | Henderson | |
| 3,418,897 A | | 12/1968 | Humalainen | |
| 3,433,137 A | | 3/1969 | Henerson | |
| 3,625,011 A | * | 12/1971 | Stevenson | ..................... 405/36 |
| 3,661,687 A | * | 5/1972 | Spinney et al. | ................ 428/17 |

(Continued)

FOREIGN PATENT DOCUMENTS

CA    1182485    2/1985

(Continued)

OTHER PUBLICATIONS

Control-problem Accidents, Commercial Jet Transport Aircraft 1958-1993, Flight Safety Digest, Dec. 1994.

(Continued)

*Primary Examiner*—Raymond W Addie
(74) *Attorney, Agent, or Firm*—K&L Gates LLP

(57) ABSTRACT

An airport safety system includes an area of land wherein natural grass has been removed substantially from the grass and artificial turf having a plurality of synthetic fibers, the turf securely installed in the area without the use of a layer of infill dispersed between the fibers. The turf also is capable of absorbing fuel from a fuel spill at or near the area.

21 Claims, 22 Drawing Sheets

U.S. PATENT DOCUMENTS

| | | | |
|---|---|---|---|
| 3,664,241 A | 5/1972 | Blackburn | |
| 3,687,021 A * | 8/1972 | Hensley | 404/31 |
| 3,731,923 A | 5/1973 | Greene | |
| 3,735,988 A | 5/1973 | Palmer et al. | |
| 3,840,167 A | 10/1974 | Otteman et al. | |
| 3,935,352 A | 1/1976 | Toland | |
| 3,968,041 A | 7/1976 | De Voss | |
| 3,995,079 A | 11/1976 | Haas, Jr. | |
| 4,044,179 A | 8/1977 | Haas, Jr. | |
| 4,047,491 A | 9/1977 | Spanel et al. | |
| 4,067,757 A | 1/1978 | Layman | |
| 4,091,625 A * | 5/1978 | Fontana et al. | 405/258.1 |
| 4,132,074 A | 1/1979 | Wendel | |
| 4,152,473 A * | 5/1979 | Layman | 428/17 |
| 4,164,933 A | 8/1979 | Alosi | |
| 4,183,984 A * | 1/1980 | Browers et al. | 428/81 |
| 4,216,735 A | 8/1980 | McDaniel, Jr. | |
| 4,241,532 A * | 12/1980 | Fancy | 43/112 |
| 4,312,504 A | 1/1982 | Rutledge et al. | |
| 4,337,283 A | 6/1982 | Haas, Jr. | |
| 4,381,622 A | 5/1983 | Spidell | |
| 4,396,653 A | 8/1983 | Tomarin | |
| 4,462,184 A | 7/1984 | Cunningham | |
| 4,489,115 A | 12/1984 | Layman et al. | |
| 4,497,853 A | 2/1985 | Tomarin | |
| 4,637,942 A | 1/1987 | Tomarin | |
| 4,662,778 A | 5/1987 | Dempsey | |
| 4,755,401 A | 7/1988 | Friedrich et al. | |
| 4,843,525 A | 6/1989 | Williams | |
| 4,948,116 A | 8/1990 | Vaux | |
| 5,205,068 A | 4/1993 | Solomou | |
| 5,206,058 A | 4/1993 | Fry et al. | |
| 5,303,523 A | 4/1994 | Hand et al. | |
| 5,335,112 A | 8/1994 | Bennett et al. | |
| 5,392,723 A | 2/1995 | Kaju | |
| 5,439,968 A | 8/1995 | Hyche | |
| 5,489,317 A | 2/1996 | Bergevin | |
| 5,586,408 A | 12/1996 | Bergevin | |
| 5,651,641 A | 7/1997 | Stephens et al. | |
| 5,672,352 A | 9/1997 | Clark et al. | |
| 5,697,730 A | 12/1997 | Goeing | |
| 5,850,708 A | 12/1998 | Bergevin | |
| 5,902,414 A | 5/1999 | Keal et al. | |
| 5,932,357 A | 8/1999 | Coates et al. | |
| 5,958,527 A | 9/1999 | Prevost | |
| 5,976,645 A | 11/1999 | Daluise et al. | |
| 5,986,551 A | 11/1999 | Pueyo et al. | |
| 6,039,767 A | 3/2000 | Boyes et al. | |
| 6,048,282 A | 4/2000 | Prevost et al. | |
| 6,132,137 A * | 10/2000 | Gunter | 405/36 |
| 6,207,077 B1 | 3/2001 | Burnell-Jones | |
| 6,216,389 B1 | 4/2001 | Motz et al. | |
| 6,242,062 B1 * | 6/2001 | de Vries | 428/17 |
| 6,277,989 B1 | 8/2001 | Reid | |
| 6,620,482 B2 | 9/2003 | Carr et al. | |
| 6,723,412 B2 | 4/2004 | Prevost | |
| 6,740,387 B1 | 5/2004 | Lemieux | |
| 6,794,007 B2 | 9/2004 | Carr et al. | |
| 6,802,669 B2 | 10/2004 | Ianniello et al. | |
| 6,946,181 B2 | 9/2005 | Prevost | |
| 7,128,497 B2 * | 10/2006 | Daluise | 405/43 |
| 7,260,297 B2 * | 8/2007 | Hajto et al. | 385/115 |
| 2002/0028307 A1 | 3/2002 | Prevost | |
| 2002/0064628 A1 | 5/2002 | Carr et al. | |
| 2002/0146519 A1 | 10/2002 | Carr et al. | |
| 2003/0182855 A1 | 10/2003 | Prevost | |
| 2003/0215287 A1 | 11/2003 | Prevost | |
| 2004/0005194 A1 * | 1/2004 | Williams et al. | 405/43 |
| 2004/0058095 A1 | 3/2004 | Carr et al. | |
| 2004/0058096 A1 | 3/2004 | Prevost | |
| 2004/0146352 A1 | 7/2004 | Carr et al. | |
| 2005/0031803 A1 | 2/2005 | Prevost | |
| 2005/0129903 A1 | 6/2005 | Carr et al. | |
| 2006/0088380 A1 | 4/2006 | Prevost | |

FOREIGN PATENT DOCUMENTS

| | | |
|---|---|---|
| CA | 1226313 | 9/1987 |
| CA | 1235160 | 4/1988 |
| CA | 2043170 | 11/1992 |
| CA | 2095158 | 10/1994 |
| CA | 2218314 | 9/1998 |
| CA | 2206106 | 12/1998 |
| CA | 2206295 | 12/1998 |
| CA | 2294071 | 12/1998 |
| CA | 2294096 | 12/1998 |
| CA | 2238953 | 11/1999 |
| CA | 2247484 | 3/2000 |
| DE | 3901392 | 7/1990 |
| WO | WO 02/15161 | 2/2002 |
| WO | WO 02/20903 | 3/2002 |

OTHER PUBLICATIONS

Surface Safety: Everyone's Responsibility, Federal Aviation Administration, Publication #: 003099.pm.
LD&A, *Precision Approach Path Indicator System*, www.iesna.org, Jul. 1998.
U.S. Department of Transportation, Advisory Circular, *Standards for Specifying Construction of Airports*, Feb. 1999.
Airport Technology R & D Branch, *Evaluation of Fiber Optic Running Distance—Remaining (RDR) Signs at Pittsburgh Int'l Airport*, www.airportech.tc.faa.gov, Feb. 2000.
Bird Strike Doesn't Mean No Baseball in Baltimore, Air Line Pilots Association, Feb. 2000.
Ranking the Hazard Level of Wildlife Species to Aviation, Wildlife Society Bulletin, Summer 2000.
Some Significant Wildlife Strikes to Civil Aircraft in the United States, 1990-2000, FAA Wildlife Strike Database U.S. Department of Agriculture National Wildlife Research Center, Jul. 28, 2000.
U.S. Department of Transportation, Advisory Circular, *Standards for Airport Markings*, Dec. 1, 2000.
Affidavit of James A. Grief, Jan. 31, 2003.
Deposition of James A. Grief.
Airport Technology R & D, Branch *Airport Markings Paint and Bead Durability*, www.airportech.tc.faa.gov, Mar. 25, 2003.
*Website*.
http://www.faa.gov/arp/ace/625/whmp.htm, Jul. 13, 2000.
http://www.icao.org/icao/en/jr/5308_arl.htm, Jul. 18, 2000.
hht://www.sciam.com/1999/0999issue/-000scicit4.html, Jul. 19, 2000.
http://www.tc.gc.ca/aviation/aerodrme/birdstke/manual/g/g5.htm, Jul. 19, 2000.
http://www.tc.gc.ca/aviation/aerodrme/brdstke/manual/g/g6-1.htm, Jul. 19, 2000.
http://www.birdstrike.org/, Sep. 25, 2000.
http://www-afsc.saia.af.mil/magazine/htdocs/aprmag97/ap971005. htm, Oct. 23, 2000.
http://www.faarsp.com/e2.html, Jan. 29, 2001.
http://www.faarsp.com/aptsigns. htm, Jan. 29, 2001.
http://www.ntsb.gov/pressrel/2000/000613.html, Aug. 24, 2001.
http://www.abcnews.go.com/sections/us/DailyNews/runway000613.htm, Aug. 24, 2001.
http://www.avweb.com/other/aopa027a.html, Aug. 24, 2001.
http://www.faarsp.com/daily/cy00daily.htm, Aug. 24, 2001.
http://www.faarsp.com/ricats88-99.htm, Aug. 24, 2001.
http://www.faarsp.com/lightguns.htm, Aug. 24, 2001.
http://www.faarsp.com/pdpies97-99.htm, Aug. 24, 2001.
http://www.faarsp.com/rimonthly97-99.htm, Aug. 24, 2001.
http://www.faarsp.com/daily/ritot01-00.htm, Aug. 24, 2001.
http://www.faarsp.com/smgcs.htm, Jan. 29, 2001.
http://www.faarsp.com/h2.htm1, Aug. 24, 2001.
http://www.aopa.org/asf/publications/sa07, Jan. 29, 2001.
Examiner's first report on Australian Patent Application No. 2001297923 dated Sep. 19, 2006.

\* cited by examiner

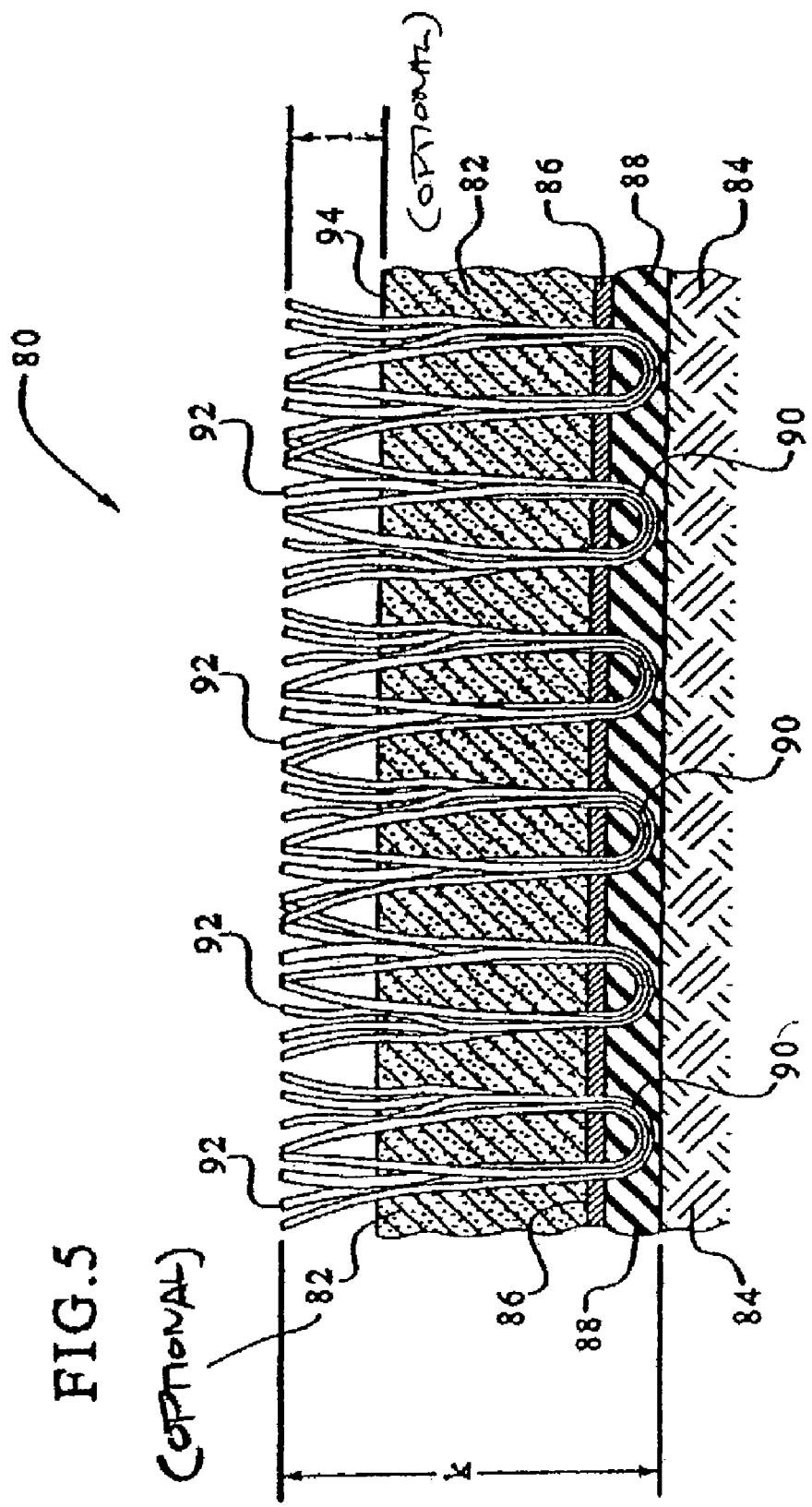

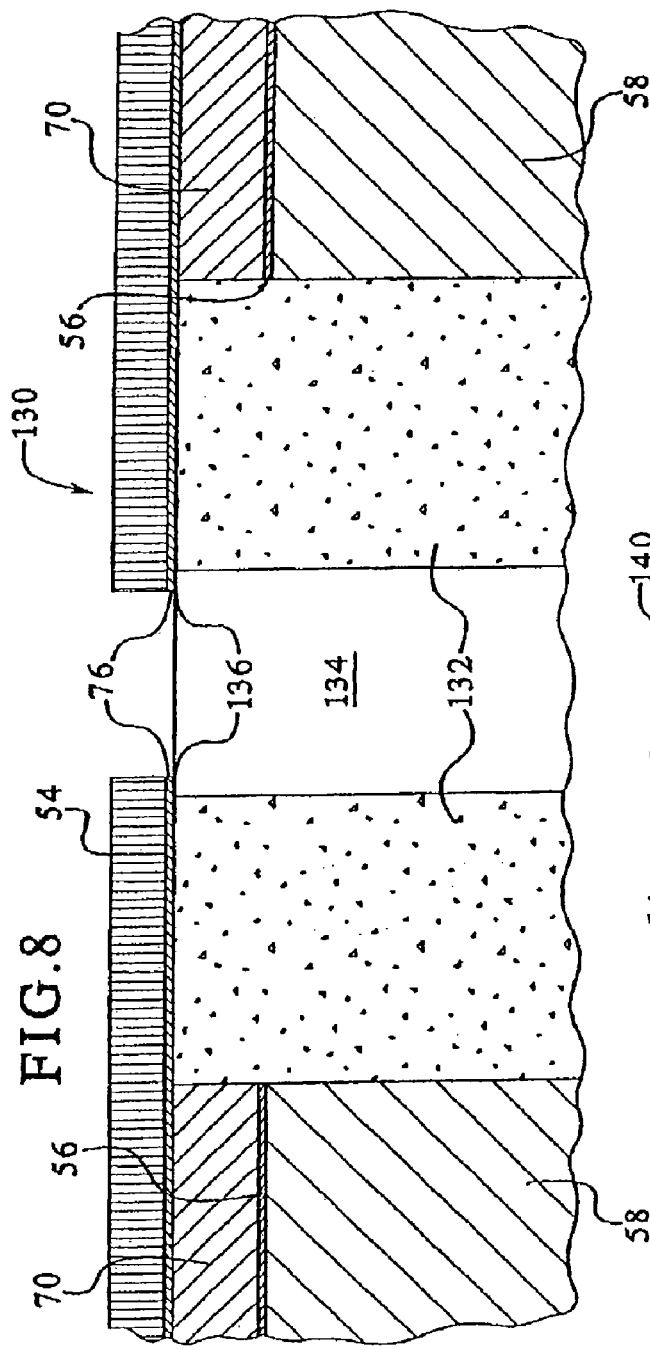
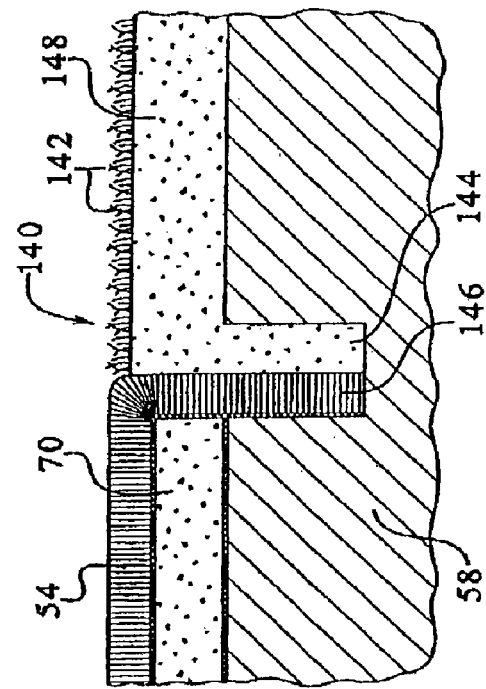

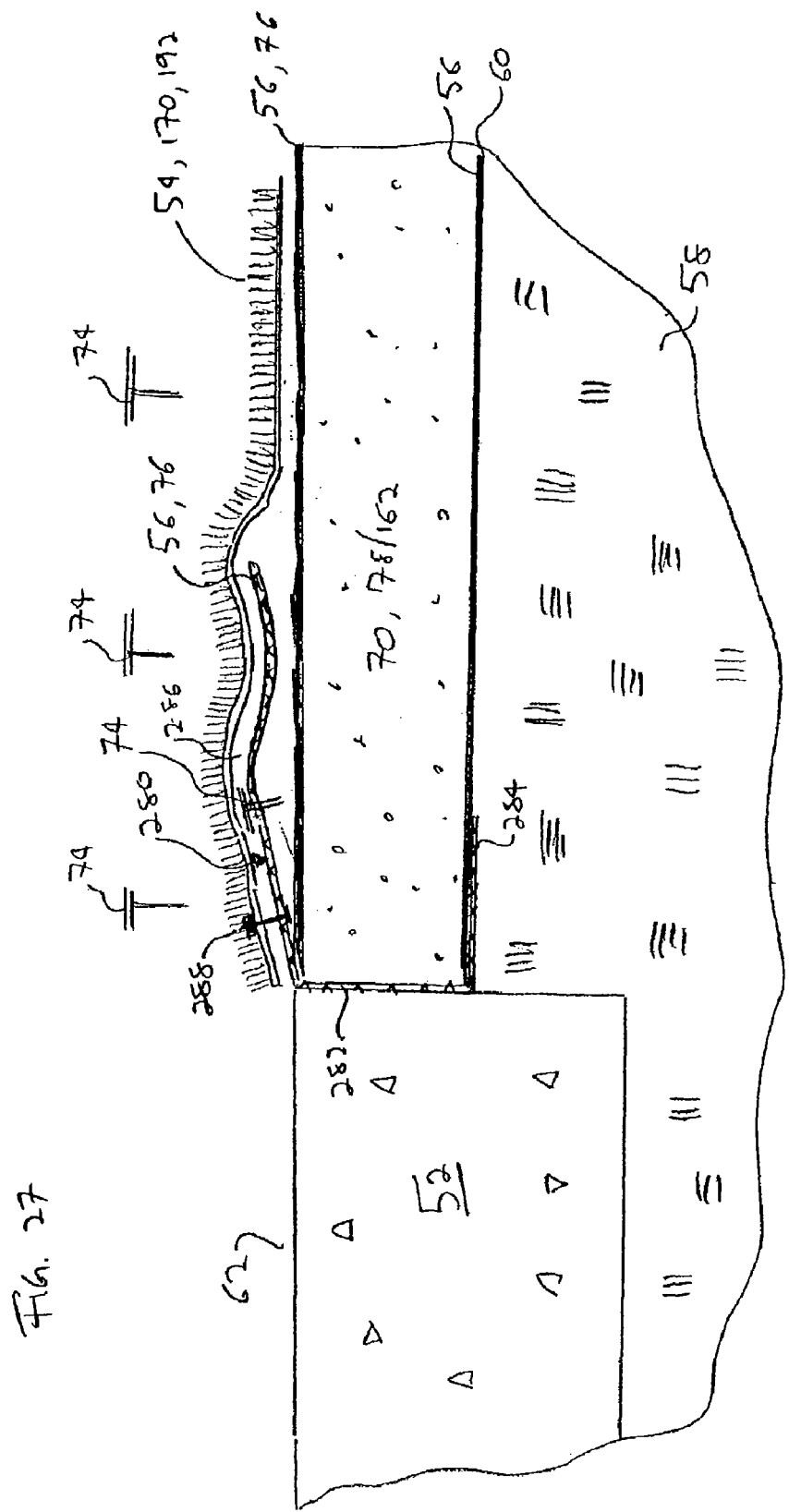

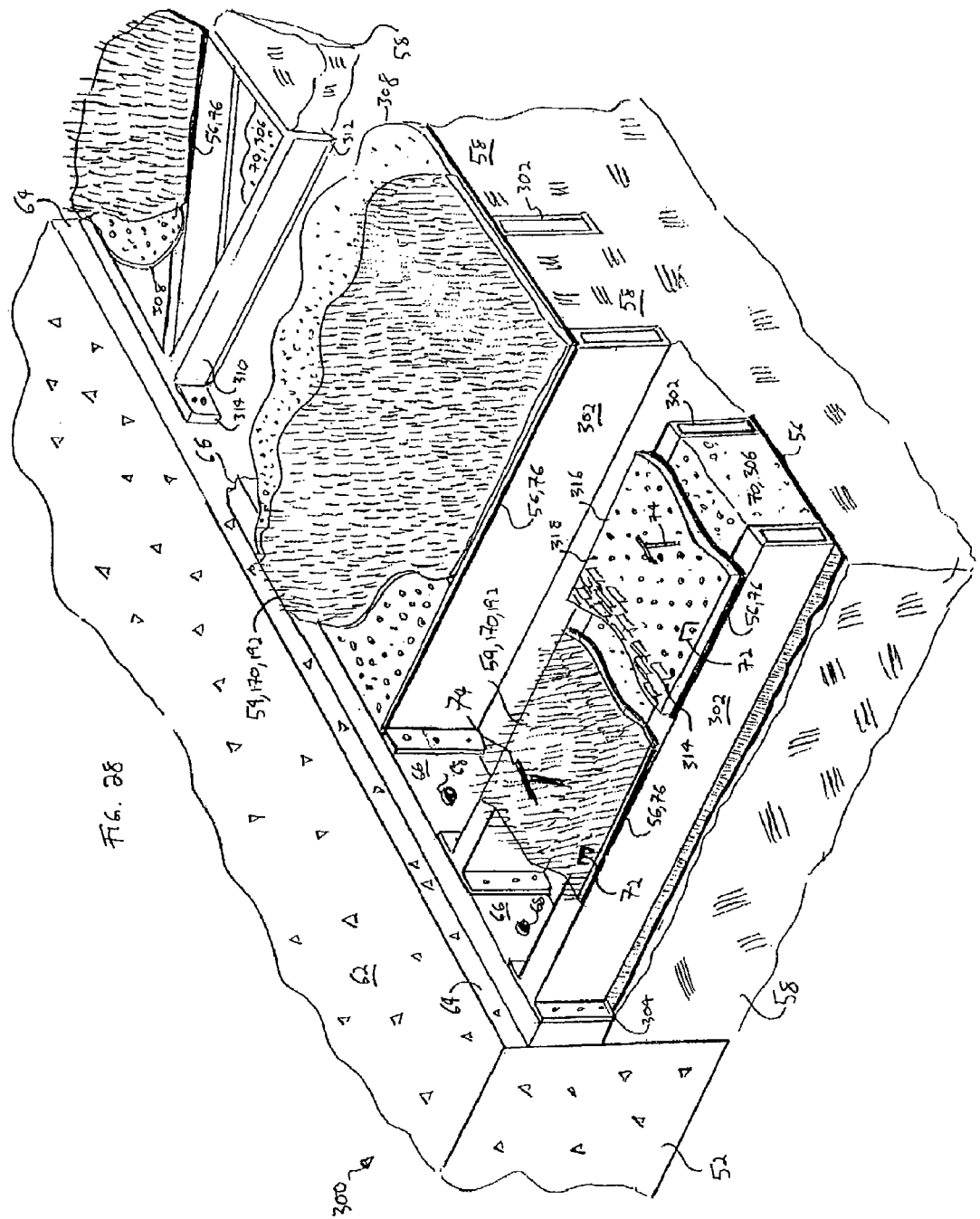

FIG. 39

INFILLESS AND/OR FUEL ABSORBING SYNTHETIC COVERING SYSTEM FOR SAFETY AREAS OF AIRPORTS

PRIORITY CLAIM

This application is a divisional application of U.S. patent Ser. No. 10/445,860 now U.S. Pat. No. 7,175,362, filed May 27, 2003, entitled, "SYNTHETIC COVERING SYSTEMS FOR SAFETY AREAS OF AIRPORTS", which is a continuation-in-part application of U.S. patent Ser. No. 09/816,524 now U.S. Pat. No. 6,794,007, filed on Mar. 23, 2001, entitled, "ARTIFICIAL TURF AIRPORT MARKING SAFETY SYSTEM", which is a continuation-in-part application of U.S. patent Ser. No. 09/727,276 now U.S. Pat. No. 6,620,482, filed on Nov. 30, 2000, entitled, "SAFETY SYSTEM FOR AIRPORTS AND AIRFIELDS".

BACKGROUND

The present disclosure relates in general to a safety system for airports and airfields and more particularly to an apparatus and method for installing a synthetic turf system around airport runways and taxiways to enhance and improve airport and airfield safety.

Airfields, including military airfields, small airfields and large commercial airports presently have grass surfaces adjacent to the airport runways and taxiways. Those natural grass surfaces are difficult, time consuming and expensive to maintain and are not aesthetically pleasing. More importantly, the existing grass surfaces create potential safety problems for departing and arriving aircraft. The existing grass surfaces also create potential safety problems relating to the clean-up of hazardous waste spills and to the use of pesticides and herbicides necessary for proper upkeep of the grass.

A further problem with natural grass surfaces at airports or airfields is improper water drainage. In typical natural grass installations, the surface of the soil is approximately at the same height as the concrete (or other) surface of a runway/taxiway. The height of the grass thus normally extends past the height of the runway/taxiway surface. Grass clippings, dust, dirt and debris blown across the runway/taxiway, catch the overextending lip of grass and collect adjacent thereto, creating a more extensive vertical barrier. The clippings, dust, dirt and debris trapped adjacent to the runway/taxiway increase the potential of "foreign object damage" or "FOD" to airplanes and are therefore classified as "FODS." FODS are any foreign object that can damage a stationary or moving aircraft, specifically including a turbine engine.

The collected clippings, dust, dirt and debris along the edge of the runway/taxiway also inhibit proper water drainage from runways or taxiways. That build-up also traps and pools rainwater that contacts the runway/taxiway and drains to their sides (i.e., down their grade). The water eventually drains into and through the build-up and often creates a three to four foot (30 to 40 cm) area of wet mud adjacent to the runway. The grass in that area often dies, the mud dries and the top soil erodes so that new grass seed cannot effectively form a root system. Grass sod directly adjacent to a runway/taxiway can become loose, fly up and become a FOD, so that airports are effectively stuck with eroded soil in safety areas adjacent runways or taxiways.

Commercial airports (and certain other airports) provided graded surfaces to aid in draining heavy rains. Over time, the flow of water carrying dirt and debris away from the runway/taxiway erodes the grade, at least at certain points, in the natural grass surfaces adjacent to the runway/taxiway. Water tends to pool in such areas of the natural grass where the grade is eroded. The pooled water also kills the grass and creates muddy areas where little grows. The muddy areas are aesthetically displeasing and conventional vehicles such as sanitation trucks, maintenance trucks and emergency vehicles cannot travel on or over the muddy areas, if necessary.

In dry, desert like climates, sand adjacent to runways and taxiways also creates problems. Little grows in sand, which leaves the airport with the unenviable choice of either planting, irrigating and maintaining an expansive and expensive natural grass surface or exposing large areas of aesthetically displeasing sand. Conventional vehicles such as sanitation trucks, maintenance trucks and emergency vehicles also cannot travel on or over the areas having sand, if necessary. Windblown sand can also be a dangerous FOD, which in certain instances has been known to sand blast the inside of a jet's turbine engine.

Natural grass is also expensive to upkeep. In peak periods, some airport operators must mow twice a week. Weeds, high grass, muddy areas and other obstructions collect litter and debris intermittently over the entire airport or airfield.

Although airfields are noisy and frequented by large, fast moving jet-powered aircraft, they still tend to support wildlife. Airfields often cover large expanses of open natural grass field surrounded by fences, providing good visibility and a haven for birds and other animals from man and pets. Man-made retention basins and drainage ditches provide a convenient source of free standing water. Mowing machines leave behind mowed straw and the like for nest construction and shattered seeds and maimed insects for food.

The water and nesting materials lead to a well known and potentially dangerous safety problem, bird and animal strikes. Many birds including gulls, waterfowl, raptors such as hawks and other species flock to airfields to eat, drink and reproduce. Birds eat insects and grubs which live in natural grass up to six inches (15 cm) below the soil surface. Birds also eat rodents, which feed on the insects. Standing water, especially after fresh rains, attracts many species of birds, including waterfowl. Large birds such as ducks or geese also create especially dangerous conditions for aircraft and are classified as FODs. Natural grass further provides materials and cover for birds to nest and breed. Accordingly, many airports and airfields report collisions between airplanes and birds and other animals.

Runway incursions present another significant safety problem for airports and airfields. The Federal Aviation Administration ("FAA") defines a "runway incursion" as, "any occurrence at an airport involving an aircraft, vehicle, person, or object on the ground that creates a collision hazard or results in loss of separation with an aircraft taking off or intending to take off, landing, or intending to land." A "collision hazard" is defined as any "condition, event or circumstance which could induce an occurrence of a condition or surface accident or incident (e.g., a pilot takes an unplanned or evasive action to avoid an aircraft, vehicle, object, or person on the runway)." "Loss of separation" includes "an occurrence or operation, which results in less than the prescribed separation between aircraft, vehicles, or objects." For definitions, see:

http://www.faa.gov/runwaysafety/, under statistics and data.

The FAA places runway incursions into three general causal categories, namely: (i) a pilot can cause a pilot deviation ("PD"); (ii) a tower controller can cause an operational error ("OE") runway incursion; and (iii) a person or vehicle on a runway/taxiway can cause a vehicle/pedestrian device ("V/PD") runway incursion. Runway incursions have led to serious accidents.

One cause of the problem is that the complex instrument panels in many airplanes cause pilots to be "heads down" for substantial periods of time. When a pilot is "heads down" it is more difficult for the pilot to know the plane's exact position on the runway/taxiway. Moreover, when pilots do look out their windows, airport markings should be clean and legible. Pilots should be able to taxi to and from an active runway without getting lost.

Presently, the pavement markings and small upright runway signs placed near runways and taxiways provide limited guidance to pilots, ground crews and tower controllers. The pavement signs fade and chip and do not contrast well against gray pavement. The upright signs are necessarily small, so that pilots, grounds people and tower personnel can have an uninterrupted view of other ground and air vehicles on intersecting and adjacent runways and taxiways.

A need exists for a solution to each of the above-described airport safety problems.

SUMMARY

One aspect of the present disclosure involves a synthetic covering system for areas, and primarily safety areas, adjacent to airport and airfield runways and taxiways. In one embodiment, the system includes an aesthetically pleasing artificial turf that repels birds and other animals and an accompanying sub-surface, which enhances water drainage and facilitates the accessibility of airport vehicles to all parts of the runway/taxiway. In another embodiment, a perforated or porous plastic mat is installed securely to the sub-surface. In either embodiment, the present disclosure replaces existing natural grass as well as an application specific volume of soil or other material beneath the natural grass in target areas adjacent to and around airport runways and taxiways.

The present disclosure also applies to new airport or airfield installations, wherein the system employs an existing graded and/or compacted surface without additional excavation and/or compaction or natural grass replacement. The present disclosure uses an application specific form of synthetic covering, e.g., artificial turf, which includes plastic, such as polypropylene or polyethylene, or otherwise synthetic fibers slit or fribulated to appear grass-like. The present disclosure is described primarily using the terms "artificial turf", "synthetic turf" or simply "turf". Except when describing the turf itself, those terms also expressly include other embodiments contemplated herein for the synthetic covering, e.g., perforated or porous matting. The matting can be colored or textured to appear grass-like. In still another embodiment, the turf is installed without an infill layer, reducing the cost of an installation.

Beneath the artificial or synthetic turf, the present disclosure includes a sub-surface having an animal and plant retarding base, such as rock, crushed rock or concrete. The rock is compacted to eliminate as much air as possible from between the rocks, to create a hard and stable surface. The base is thus able to support the weight of an aircraft or airplane. That is, the base at least supports the weight of small aircraft in small airfield applications and supports the weight of any large aircraft or airplane in commercial or military airport applications. As used herein, "aircraft" and "airplane" are interchangeable and both include all aircraft and all airplanes.

By removing the top soil and natural grass and replacing them with compacted rock and artificial or synthetic turf, the present disclosure substantially limits the plant and animal life that can or desires to exist in the target areas. The present disclosure virtually eliminates grubs or insects that live on the surface or below the surface to a depth of approximately six inches (15 cm). The lack of natural grass, grubs or insects virtually eliminates rodents and other small animals that live in the natural grass and eat the grubs and insects. The lack of natural grass, grubs, insects, rodents and other small animals virtually eliminates all food sources for birds, which provide the greatest potential danger to aircraft. The present disclosure likewise eliminates virtually all food sources for other animals including deer, coyotes, etc.

The lack of natural grass, the ability to grow natural grass and the need to mow natural grass, which creates clippings convenient for nesting purposes, eliminates the cover and materials necessary for birds and other animals to nest and/or reproduce. The lack of natural grass also reduces the amount of environmentally unfriendly herbicides or pesticides that airport or airfield operators have to apply.

The present disclosure further includes a plurality of water drainage mechanisms to produce a target area near airport and airfield runways or taxiways substantially free from standing water or wet areas. Specifically, the present disclosure provides a layer of infill, which is primarily sand, between the synthetic fibers, that sufficiently absorbs water and provides a first line of defense against standing water. For heavy rains, the present disclosure enables water to drain through the artificial turf of the present disclosure into a sub-surface retention area. The system includes additionally grading the soil surface, creating the positive drainage necessary to eliminate standing water. The sub-surface of the present disclosure includes water sheeting layers or mechanisms, such as a waterproof membrane, to enable water to drain across the top of the turf leading into pipes or larger drains.

Removing standing water eliminates muddy or dead areas that currently proliferate at airports, resulting in a uniform, year round surface. The lack of available water eliminates another attraction for birds and other animals. A substantially dry surface in combination with a stable, compacted base also enables any type of airport vehicle to reach any part of the runway/taxiway at any time of the year, if necessary, subject only to extraneous conditions. The lack of mud around standing water reduces the likelihood of mud reaching the runway/taxiway and becoming a FOD.

The present disclosure further includes installing the artificial turf so that the grass tips of the turf are substantially even with slightly above or below the surface of the runway/taxiway, and so that grass clippings (from areas not employing the present disclosure), dust, dirt and debris can blow across the runway/taxiway unimpeded by undesirable obstructions as a result of grass growing above their surfaces. Such debris can blow all the way to an airport fence, unimpeded by weeds or mud, which facilitates easier and more cost effective waste removal. The transition or distance from the runway/taxiway surface to the top surface of the synthetic turf backing also enables a positive water drainage from the runway/taxiway to the turf.

The artificial turf of the present disclosure requires less maintenance, i.e., an occasional vacuuming of airborne soil and other materials that has collected on the turf of the present disclosure, which can lead to a limited germination of seeds. The turf may also require limited spraying of herbicides or pesticides if weeds begin to grow. The turf of the present disclosure includes polypropylene fibers representing grass blades, a woven polypropylene backing into which the fibers are woven, a polyurethane backing and a pure sand infill. The porous or perforated material is rubber or plastic, e.g., particles held together by a binder. Each of those materials and the sand infill absorb hazardous material spills, such as jet fuel, and are readily replaceable without exposing large areas of bare dirt near a runway/taxiway. Each of those materials also retards and reduces a fire, such as that related to a fuel spill or other incident.

A multitude of embodiments are described herein for installing securely the artificial turf or other forms of synthetic covering along an edge of a runway/taxiway. Importantly, the turf or covering cannot fly-up or become removed from the base due to the force of a jet engine blast. The turf or covering must be securely installed to the base, especially along the edge of the runway. Apparatuses and methods of using same including anchors, mounting members, pinning devices, wedged flexible mounting sheets and glue are descried herein for securely installing the turf or other synthetic covering. The attachment mechanisms are particularly useful for securely installing the perforated or porous matting or the artificial turf without the additional weight of an infill layer.

Another aspect of the present disclosure involves a system for areas near the ends of airport runways which includes an aesthetically pleasing artificial turf that covers and forms part of a soft ground arrester bed for slowing the motion of a runaway aircraft. The arrester bed system includes all the drainage features, aesthetics, ease of maintenance and accessibility of the artificial turf system described above. The arrester bed system employs a deeper base than the artificial turf system, and the base of the arrester bed system includes rolled rather than crushed rock, to soften the shock of an impacting plane and to absorb its kinetic energy. The arrester bed system also includes a turf area extending from the end of the runway a sufficient distance about one thousand feet (300 m), while the artificial turf system provides substantial benefits at sufficient distances, on the order of one hundred to two hundred feet (30 to 60 m).

A further aspect of the present disclosure is to provide a turf that inhibits or repels loitering animals. As illustrated above, the present disclosure eliminates the attractions for animals including birds to congregate on the artificial turf of the present disclosure, including eliminating food, water and cover and materials for reproduction. However, certain species, namely seagulls, tend to loiter in areas for no apparent reason. To counteract such loitering, the present disclosure contemplates using artificial turf having stiff or repelling fibers among the polypropylene fibers, which are uncomfortable to touch, stand on or lay on. The present disclosure contemplates that the stiff or repelling fibers bother the web-footed seagull as well as animals having paws or hoofs.

Yet another aspect of the present disclosure includes providing at least one segment, area or portion of a multicolored or multi-pigmented synthetic turf adjacent to or near airport runways and taxiways. The multicolored turf segments or areas provide a permanent, readily implemented and effective way of communicating with pilots, ground crews, tower controllers and airline passengers. The multicolored or multi-pigmented turf areas provide an effective tool for decreasing the frequency of runway and taxiway incursions, providing information to passengers landing at the airport as well as providing a forum for advertising.

The multi-pigmented turf segments include a plurality of differently colored dyed or painted fibers, including fluorescent fibers, which are tufted or stitched into the artificial turf. The multi-colored turf segments also include one or more sections of a differently colored turf section that is cut out and stitched together with a section of a base colored turf, e.g. green. The multicolored turf segments can also be created by placing a stencil over the base colored turf and painting the base turf with one or more colors, in a desired shape or pattern, using suitable paints.

While airports and airfields are one implementation for the turf and synthetic covering of the present disclosure, it is contemplated to provide the systems described herein in other venues, such as along roadsides, riverbanks, mountainsides, railway lines, and in the interior of racetracks, such as auto race tracks and horse race tracks. In particular, it is contemplated to provide turf or synthetic covering having lettering or advertising at the above-listed alternative venues. The safety aspects of the present disclosure are also incorporated into the above applications in various embodiments.

Still a further aspect of the present disclosure is to provide apparatus below or adjacent to the turf that either provides fire suppression, heats the turf or absorbs solar energy that is converted into energy used by the airport, for example, to power runway lights. In one embodiment, at least one heating element is placed on top of the turf or synthetic covering. The heating element can provide any type of heating, such as, electrical heating, hot water heating, steam heating and hot air heating. In one embodiment, the elements are thermally connected to heat conductive strips or conductors that transfer heat from the solar energy system. The fire suppression system can use $CO_2$, a chemical suppression, or both.

The solar system is steam driven or uses photoelectric technology. The solar panels or mirrors absorb or reflect radiant energy from the sun. The energy is converted into directly or indirectly into electrical energy, which can be used to operate a number of electrical devices, such as the heater or fire suppression equipment described above or runway lights. The solar energy system operates with an electrical backup system in one embodiment.

It is therefore an advantage of the present disclosure to provide a synthetic covering system for airports and airfields that retards birds and other animals and has a sub-surface that enhances water drainage and as well as the accessibility of airport vehicles.

Another advantage of the present disclosure is to provide a synthetic covering system for airports and airfields that includes a synthetic covering and a sub-surface that slows a moving aircraft.

A further advantage of the present disclosure is to provide an artificial turf adapted to retard or repel loitering animals.

Yet another advantage of the present disclosure is to provide a multi-pigmented turf or covering that defines airport markings, symbols, messages, advertising and the like for airports and other venues, such as along roadsides, riverbanks, mountainsides, railway lines, and in the interior of racetracks, such as auto race tracks and horse race tracks.

Yet a further advantage of the present disclosure is to provide a multitude of apparatuses and methods for securely installing the turf or synthetic covering along runways and taxiways and at other venues, such as along roadsides, riverbanks, mountainsides, railway lines, and in the interior of racetracks, such as auto race tracks and horse race tracks.

Additional features and advantages of the present disclosure are described in, and will be apparent from, the following Detailed Description of the Invention and the figures.

BRIEF DESCRIPTION OF THE DRAWINGS

FIG. 5 is a fragmentary front elevation sectional view taken through one embodiment of the artificial turf of the present disclosure.

FIG. 8 is a fragmentary cross-sectional view, taken along line VIII-VIII of FIG. 2, of one embodiment of the present disclosure for interfacing the artificial turf and associated sub-surface of the present disclosure with a drain or other obstruction.

FIG. 9 is a fragmentary cross-sectional view, taken along line IX-IX of FIG. 2, of one embodiment of the present disclosure for interfacing the artificial turf and associated sub-surface of the present disclosure with natural grass.

FIGS. 20 through 27 are schematic elevation views of various embodiments for securely installing artificial turf in airport safety areas.

FIG. 28 is a perspective view illustrating various embodiments for stabilization frames, various base materials and a synthetic mat used in place of artificial turf.

FIG. 29 is a schematic sectional view of a runway/taxiway installation illustrating various embodiments for a solar collection/power distribution system, heating system and fire suppression system of the present disclosure.

DETAILED DESCRIPTION

Artificial Turf System

Figure 2:
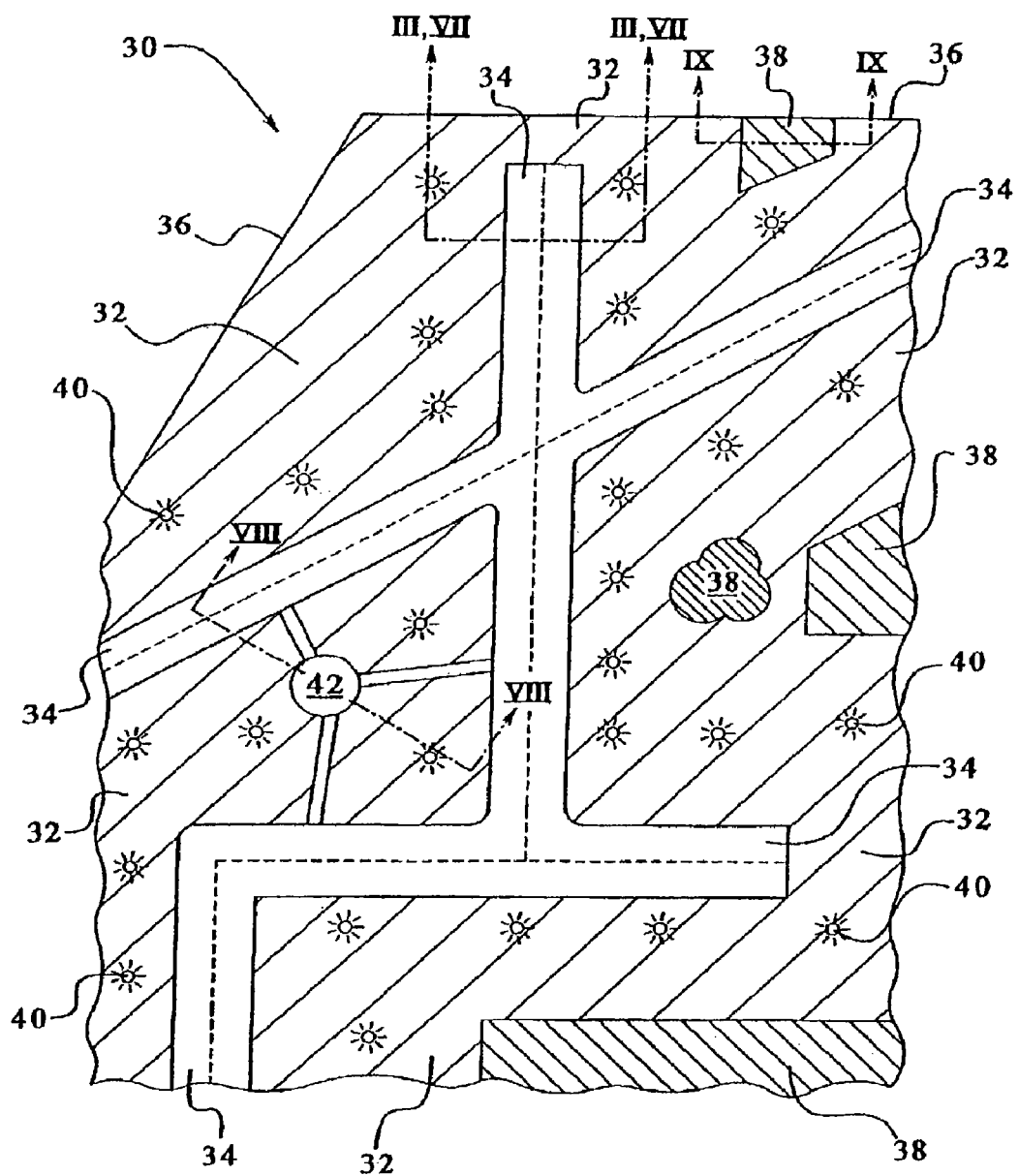
FIG. 2 is a fragmentary top plan view of an airport or airfield, illustrating sections of airport runways, taxiways and areas of adjacent synthetic turf of the present disclosure.

Referring now to the drawings, and in particular to FIG. 2, an airport or airfield 30 employing the present disclosure has runways, including taxiways and areas of synthetic turf 32 adjacent thereto. The artificial turf areas 32 are installed adjacent to the runways or taxiways 34 or sections thereof. The present disclosure contemplates installing the artificial turf areas 32 adjacent to or substantially adjacent to all the runways or taxiways 34. It is possible that certain presently existing runways or taxiways contain obstacles, such as drains, etc., along their side surfaces that do not allow the turf to be uniformly applied directly along their edge or side surfaces. The turf of the present disclosure, however, is installed adjacent to the runway/taxiway wherever possible.

The artificial turf areas 32 are installed on one or both sides of a runway/taxiway 34 and their surrounding areas, as desired by the airport operator, builder or maintainer. The greater the artificial turf area 32, the greater the benefit, as described above. However, any substantial turf area 32 produces some benefit. The turf areas 32 are adaptable to be installed to match any shape or contour created by the runways or taxiways 34, airport fences 36, natural grass areas 38 or by any other roads, driveways, accessways, pathways, trees, bushes, buildings, terminals, garages, hangers (not illustrated), or any other structures associated with an airport or airfield. The turf areas 32 likewise are adaptable to accommodate any interior obstruction, such as runway lights 40, interior natural grass sections 38 or other uses (if desired by the airport operator), drains or drainage ways 42, access roads, buildings, garages, hangers (not illustrated), or any other structures associated with an airport or airfield. One interface between the turf areas 32 and the natural grass areas 38 is described below.

The present disclosure includes any turf area 32 having any distance perpendicular to a runway/taxiway 34. It is preferable to have the turf areas 32 perpendicularly extend at least 150 to 300 feet (45 to 90 m) (transversely from the runway/taxiway to ensure a proper bird strike reduction. Many airports contain parallel runways less than 300 feet (90 m) apart. In such cases, it is preferable that the turf areas 32 extend from runway to runway (including from runway to taxiway and from taxiway to taxiway). As illustrated, the present disclosure contemplates installing the turf areas 32 on both sides of the runways or taxiways 34 and one or more of the ends of the runway/taxiway. Again, to ensure proper bird strike reduction, the turf in one embodiment is installed 150 to 300 feet (45 to 90 m) perpendicular to the end of the runway/taxiway 34.

Figure 3:
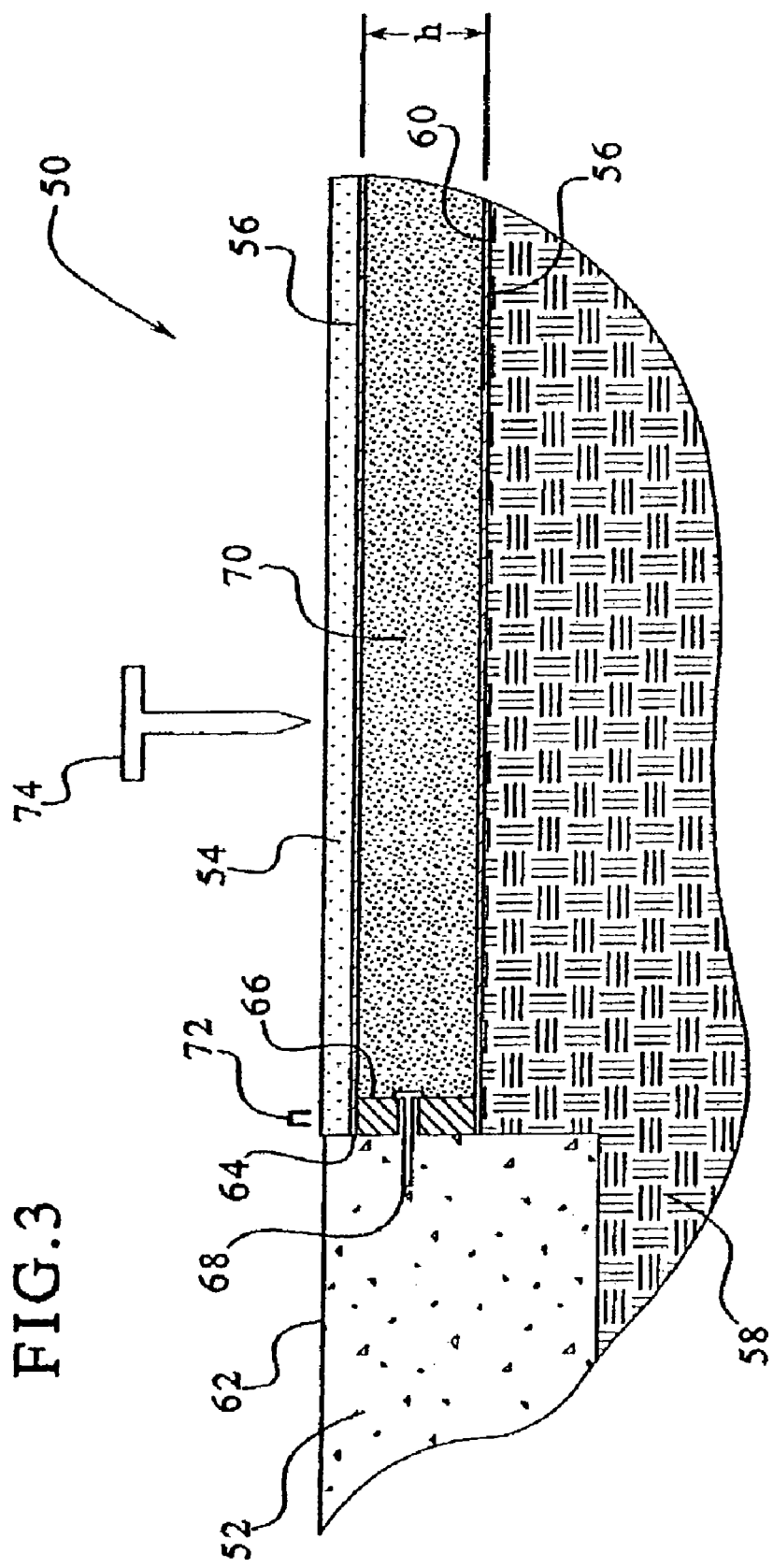
FIG. 3 is a fragmentary cross-sectional view, taken along line III-III of FIG. 2, of one embodiment of the artificial turf system of the present disclosure illustrating an airport runway section adjacent to an artificial turf surface, which includes a sub-surface having one or more weed barriers.

Referring now to FIG. 3, a fragmentary cross-sectional view, taken along the section line III-III of FIG. 2, of one embodiment of the artificial turf system 50 is illustrated, which includes an airport runway/taxiway section 52 adjacent to the artificial turf 54 and an accompanying sub-surface having one or more weed barriers 56. To install system 50 of the present disclosure, an installer: (i) excavates, grades, scarifies and compacts an application specific amount, volume or depth of the soil 58 to create a desired soil surface 60 (for existing airports and in certain instances for a new airport); (ii) installs a weed barrier 56 onto the soil surface 60; (iii) glues and ramsets a composite stud or member 66 using a suitable non-toxic glue and ramset 68; (iv) installs and compacts to tested specification an application specific amount, volume or depth of base material 70, e.g., ¾ inch (1.87 cm) minus crushed rock with binder; (v) installs a second weed barrier 56, and staples (or otherwise suitably attaches or connects) the weed barrier to the top of the composite stud or member 66; (vi) installs a two inch (5 cm) artificial turf by stapling and gluing (or otherwise suitably attaching or connecting) the turf initially to the composite stud or member 66, sewing separate adjacent and interior sections of turf together as necessary, pulling the sewed section(s) taught, and driving pinning devices 74 in a grid pattern to secure the turf before applying infill; and (vii) applying an application specific infill (e.g., non-uniform sand) to an application specific height (e.g., one inch (2.5 cm) below tips of the turf's grass-like fibers).

More specifically, FIG. 3 illustrates an existing runway/taxiway section 52 imbedded in the existing soil 58. The thickness or depth of airport runways or taxiways varies in accordance with airport or airfield engineering specifications. Many existing runways or taxiways are 18 inches (45 cm) thick or deep. The soil 58 includes a soil top surface 60 that is maintained below a runway/taxiway top surface 62, and which abuts a side wall 64 of the runway/taxiway 52. To aid in the description of the present disclosure, the term "runway" hereafter refers to a runway, a taxiway or any other road traveled by airplanes.

The present disclosure contemplates the distance between the runway top surface 62 and the soil top surface 60 at the runway side wall 64 being application specific, but in any application, at least an inch (2.5 cm). Certain applications require more excavation than others. For instance, if it is found that the soil 58 adjacent to the runway side wall 64 is pure sand, the application may require that the sand be excavated initially to twelve inches (30 cm) below the runway top surface 62 at the wall 64. It is conceivable that the application could require 18 to 24 inches (45 to 60 cm) of initial excavation. The application is limited to the thickness or depth of the runway 52 in one embodiment. That is, excavation does not extend below or beneath the runway 52 in one embodiment. However, excavation could extend below or beneath the runway 52 in certain instances.

Most applications require an initial excavation of approximately six to ten inches (15 to 25 cm) of soil at the side wall 64. In a new airport installation, the soil surface 60 is graded initially to the appropriate specifications. For cost reasons, it is not desirable to excavate any deeper than necessary. It should be appreciated from the advantages of the present disclosure described above, however, that the top of the synthetic turf 54, i.e., the tips of the synthetic grass blades, be approximately even with or slightly below the runway top surface 62 at the wall 64. Also, the present disclosure includes a suitable base providing structural stability, water absorption and a life retarding environment. The present disclosure therefore prefers an average initial excavation of six inches (15 cm) of the soil 58 at the side wall 64 of the airport runway section 52.

Although not illustrated in FIG. 3, the soil top surface 60 is graded such that the system 50 enables water to drain away from the runway. In FIG. 3, therefore, water drains from left to right and the soil surface 60 is graded so that the soil is higher near the side wall 64. The grade as well as the depth of excavation is application specific. That is, a particular airport can have a drainage system in place whereby the grade beginning at the runway side wall 64 is much steeper than normal. In such a case, the present disclosure contemplates working with and enhancing the initial engineering plan and keeping the original grade.

Assuming that the application does not have a drainage system in such proximity to the runway side wall 64, the soil top surface 60 is graded at approximately two percent in one embodiment. That is, for every foot (30 cm) measured from left to right from the runway side wall 64, the surface level drops ¼ inch (0.62 cm). If possible, the system 50 maintains a constant grade, so that a 150 foot (45 m) application is gradually excavated to approximately three additional feet (90 cm) of soil from the side wall 64 to the end, 150 feet (45 m) away.

Certain airports have been engineered to handle or properly drain a hundred year flood, which requires more or less drainage depending upon the geographic location of the airport. Certain airports have existing retention or detention ponds that may or may not be functioning properly. It is therefore probable that at some distance from the runway, each application of the system 50 is going to include a grade that departs, slightly or radically, from the two percent grade. It is conceivable that the system 50 grades certain areas of the airfield as much as sixty to seventy percent, or to whatever percentage is most beneficial to the airport.

Additionally, the system 50 uses a scarified and compacted soil surface 60. Most surface soil exists at approximately eighty-eight percent compaction. That is, surface soil is comprised of approximately twelve percent air. The soil 58 is compacted on its surface 60 to between ninety and ninety-seven percent. Before compacting, the present disclosure contemplates scarifying, i.e., breaking up or roughing up the soil, similar to a rototile. Approximately four inches of the unexcavated topsoil 58 is scarified. Scarification enables better compaction, which aids in providing a firm base.

Suitable scarification equipment is commercially available and well known in the art. For instance, a four-ton double drum roller can be used to compact the soil 58. A sheep's-foot compactor can also be employed, which contains a device for stirring up the soil as it compacts the soil.

The artificial turf system 50 includes a weed barrier 56 on top of the soil 58. The weed barrier is laid onto the compacted soil surface shortly before installing a base material 70, as described in detail below. The weed barrier is a plastic or other fabric, that retards upward weed growth and allows a steady and unimpeded flow of water in the opposite direction, i.e., downward. The weed barrier is woven, thermally bonded or otherwise suitably formed. One suitable thickness is 4 mils. One weed barrier contemplated by the present disclosure is a Polyspun 350 brand drainage/weed control fabric made by Landmaster Products of Engelwood, Colo.

The weed barrier 56 prevents weeds or other plants as well as grubs or worms from traveling from the soil surface 60 through the remainder of the system 50. The weed barrier 56 also enables the water to flow from the system 50 into the soil 58. In one embodiment, the maximum allowable rate of water that can flow through weed barrier 56 is equal to or greater than the maximum rate of water that can flow through the remainder of system 50, including synthetic turf 54. The rate of water through standard synthetic turf is 25 to 50 gallons per hour per square foot, which the weed barrier 56 of the present disclosure is capable of handling. The weed barrier product specified above is believed to handle 300 gallons per minute per square foot.

The weed barrier 56 also functions as a mat or cover that provides stability as the remainder of the system is installed. When the soil 58 is compacted it is in an unnatural condition whereby wind, machinery, workers, etc., can kick up the soil 58, adding air to it and lessening the level of compaction. The weed barrier 56 counteracts the tendency for the soil 58 to decompress by not allowing the soil surface 60 to be easily disrupted. Accordingly, a heavier or thicker weed barrier 56, e.g., ⅛ inch, (0.31 cm) is used in certain installations to provide additional stability on unstable soil.

The artificial turf system 50 includes maintaining an elongated composite stud or attachment bracket or member 66 horizontally mounted or connected to the side wall 64 of the runway 52. The composite stud or member 66 has any suitable size and shape. One primary function of the composite stud or member 66 is to establish the depth of the base of the artificial turf 54 and to provide an anchor on which to initially attach the artificial turf 54. Therefore, the correct depth and levelness of the installation of the composite stud or member 66 below the runway surface 62 is important.

For a six inch (15 cm) excavation, a two by four or a two by six inch (5 by 10 cm) composite stud or member 66 is installed with the four inch (10 cm) side abutting the side wall 64, leaving room for a desired two inch (5 cm) synthetic turf fiber to be substantially parallel with the runway surface 62 at the side wall 64 as illustrated in FIG. 3. The composite stud or member 66 is synthetic and is a solid, rectangular, recycled plastic bar having low deterioration characteristics in one embodiment. It should, however, be appreciated that the stud or member is made of other suitable materials, sizes, shapes having varying methods of construction. The member or stud, for example, further includes a hollow or rectangular tube or a suitable three sided structured beam.

The artificial turf system 50 includes gluing the composite stud or member 66 to the runway wall 64. Both the runway 52 and the composite stud or member 66 are porous, so that when a suitable non-toxic glue, such as a PL400 glue by 3M, sets up, the stud is permanently fixed. The glue permeates both the concrete of the runway and the recycled plastic stud or member 66. The present disclosure contemplates intermittently driving a plurality of ramsets 68 or concrete nails through the composite stud or member 66 into the side wall 64 of the runway section 52, primarily to hold the stud in place until the glue sets up. Employing such ramsets will minimize or eliminate any damage to the runway. It should also be appreciated that a vibration damping material (not illustrated) could be installed in conjunction with the stud, bracket or attachment member 66 to dampen the runway vibration caused by airplanes and other vehicles.

The artificial turf system 50 includes a base material 70 that characteristically or inherently retards plant and animal life, absorbs water and enables water to drain through to the weed barrier 56 between the base material 70 and the soil surface 60 and provides a firm and stable foundation for the synthetic turf 54. The base material 70 includes any material having such characteristics including, but not limited to: rock, crushed rock, concrete, or any combination thereof. The base material 70 also includes sand in combination with rock, crushed rock or concrete.

The base material 70 can be a state approved road base, for example, ¾ inch (1.87 cm) minus road base, which is commonly used in the construction of roads. Road base approved by the state or other regulatory authority is installed when possible. Each state has an approved road base material, such as ¾ inch (1.87 cm) minus road base. Three quarter inch (1.87 cm) minus road base includes crushed rock and binder, wherein the largest rocks have an average diameter of ¾ inch (1.87 cm). The binder material is smaller fragments of rock including sand sized rock pieces.

After the base material 70 is placed onto the weed barrier 56, it is smoothed and compacted. The system 50 includes compacting the crushed rock base material 70 in a manner similar to compacting the soil surface 60. Those skilled in the art of soil excavation and road base installation commonly compact crushed rock or road base. For example, a four-ton double drum roller can be used to compact the base material 70. Alternatively or additionally, a sheep's-foot compactor is used to compact the base material 70. The sheep's-foot compactor contains an additional device for stirring up the base material. Optimally, the crushed rock and binder is wetted with water while compacting the base material.

The artificial turf system 50 includes installing a crushed rock road base that is tested and found to be compacted to at least ninety percent (i.e., ten percent air or less) and from ninety-five to ninety-seven percent or above in various embodiments. Upon compaction, the dust and smaller rocks of the road base fill the interstices between the larger rocks, creating a very solid stable base that can approach 100% compaction. In that manner, the base 70 is able to support the weight of an aircraft or airplane. That is, the base at least supports the weight of small aircraft in small airfield applications and supports the weight of any large aircraft or airplane in commercial or military airport applications.

The height h of the base material 70 is application specific and is equal to the depth of the excavation along the runway wall 64 less the height of the artificial turf 54 in one embodiment. That is, the fiber tips are substantially parallel with or slightly below the runway surface 62 at the side wall 64 in one embodiment. The tips are alternatively above the runway surface 62. In an application involving a six inch (15 cm) excavation and two inch (5 cm) high turf 54, the height h of the base material 70 is thus four inches (10 cm).

Alternatively, if the system 50 employs pure sand or a ¼ inch (0.62 cm) minus crushed stone as a base material 70, in an application having a very stable soil surface 60, the height h is as little as ½ inch (1.25 cm). Further alternatively, the height h is as deep as 2 feet (60 cm), wherein the system 50 provides for maximum stability and water absorption.

The system 50 includes a second weed barrier 56 installed on top of the base material 70. The upper weed barrier 56 is initially stapled or otherwise suitably attached or connected to the composite stud or member 66 with suitable fasteners such as one inch (2.5 cm) galvanized staples 72. The weed barrier can then be pulled taught before laying the turf 54. It should be appreciated that one skilled in the art can suitably fasten the weed barrier 56 to any surface of the composite stud or member 66. The weed barrier is fastened to the top of the stud or member 66 in one implementation.

The artificial turf 54, which weighs approximately ten pounds per square foot with a dry infill layer, secures the upper weed barrier 56 onto the base material 70. The upper weed barrier 56 in one embodiment is the same weed barrier that is installed on the soil surface 60 and has the same water flow though capability as does the lower weed barrier 56. The system 50 therefore provides flow-through drainage.

The weed barriers could be different for cost saving purposes, where it is contemplated that a more expensive weed barrier is applied on the soil surface 60, wherein weeds are more likely to propagate. Moreover, the system 50 contemplates not providing an upper weed barrier 56 in certain applications. For example, in certain areas, such as North Dakota, the soil is relatively alkaline such that weeds do not tend to grow, and so that an upper weed barrier 56 is not necessary. The system 50 includes a lower weed barrier 56, even in an alkaline soil application, as added protection and to take advantage of the weed barrier's stabilizing effect.

The flow-through system 50 is used in a geographical area that is generally able to dry after receiving precipitation. That is, the system 50 absorbs substantial rain and remains stable throughout if the weather eventually allows the system to dry. If the soil 58 becomes saturated from continuous precipitation, the system 50 can become less stable. By varying the height h, the absorption and stability of the system is altered to match the amount of precipitation that the system 50 receives. As stated above, the system can also grade the system 50 can also be graded to employ an airport's existing water retention and detention systems and thereby lessen the drainage burden on the system. The flow-through system 50 is therefore applicable to many applications of the present disclosure.

The artificial turf system 50 includes a layer of flexible synthetic or artificial turf 54 on top of the upper weed barrier 56 of the system 50. The system 50 includes any suitable commercially available turf including the turf disclosed in connection with FIG. 1. One suitable flexible turf embodiment is described below. As previously described, the height of the fibers or grass-like blades of the artificial turf 54 is substantially even or slightly above or below the runway surface 62 at the wall 64. The top surface of the artificial turf 54 created by the substantially uniform tips of the grass-like fibers thereafter slopes as the soil surface 60 slopes, due to the grade.

The artificial turf 54 is attached section by section, beginning along the runway wall 64 and on top of the composite stud or member 66. It should be appreciated that one skilled in the art can fasten the turf 54 to any surface of the composite stud or member 66. The turf 54 is fastened to the top of the stud or member 66 in one embodiment. The turf is normally provided in twelve or fifteen foot (3.6 to 4.5 m) rolls. Once a section of turf is cut, a bead or other suitable amount of non-toxic glue is applied along the top of the composite stud or member 66, where the turf 54 is to be installed.

After putting the turf onto the stud or member 66 having the bead of glue, the turf is stapled to the composite stud or member 66, e.g., using suitable fasteners, such as one inch (2.5 cm) galvanized staples 72. The galvanized staples 72 primarily hold the turf in place while the glue sets up. Both the flexible backing of the turf 54 and the composite stud or member 66 are porous, so that when a suitable non-toxic glue, such as a PL400 glue by 3M, sets up, the turf is permanently affixed to the stud. A meshed weed barrier 56 between the stud or member 66 and the backing of the turf 54 enables the glue to flow through the meshes of the barrier and into the porous materials.

A plurality of sections are laid along the runway wall 64 and on top of the composite stud or member 66 in the above described manner and sews the sections together in a conventional manner, so that the turf becomes one continuous piece. Installing interior sections of flexible synthetic turf 54 also includes sewing a turf section to a currently installed section in a conventional manner. Once a sufficient area of turf is laid down, such as a 50 square foot section, pinning devices 74 are driven into the system 50, at various points, to pin the synthetic turf 54 and the underlying weed barrier 56 to the base material 70.

Figure 4:
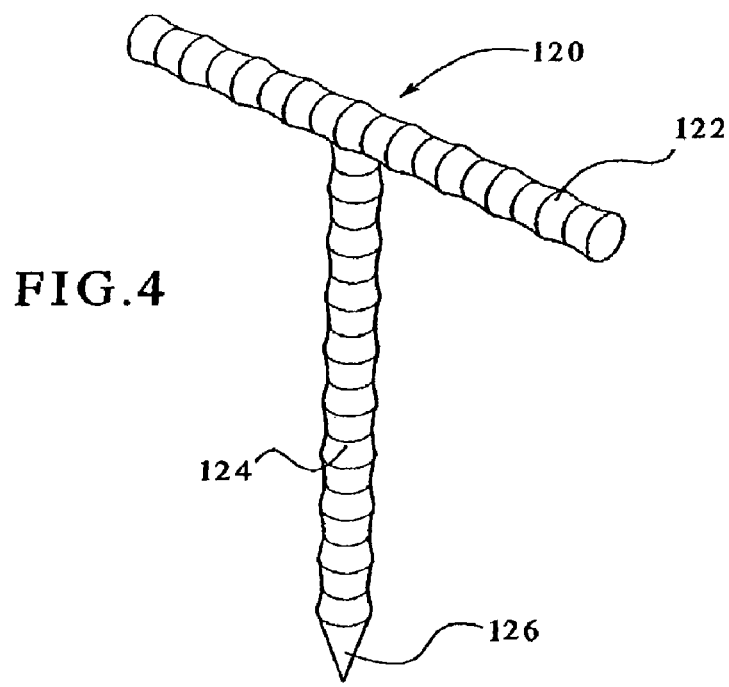
FIG. 4 is a perspective view of a pinning device, which includes a plastic coated steel reinforced "T" shaped spike having a pointed end to enable penetration of a compacted base material.

Referring now to FIG. 4, one embodiment or a "T" shaped spike 120 or pinning device used for the present disclosure is illustrated. The top horizontal section 122 of the pinning device is four inches (10 cm) long, although the appropriate length will vary with the installation. The horizontal section 122 in one embodiment is circular in cross-section and ¼ inch (0.62 cm) in diameter, although the shape and diameter may vary based on the installation. The vertical spike section 124 is ten inches (25 cm) long, although the appropriate length will vary with the installation. The vertical spike section 124 is also circular in cross-section and is ¼ inch (0.62 cm) in diameter, although the shape and diameter may vary based on the installation. The pinning device and specifically the horizontal section 122 and the vertical spike section 124 in one embodiment is made of steel reinforced bar, which are welded, forged, fastened or otherwise suitably fixed so that one end of the vertical spike section 124 connects substantially to the middle of the horizontal section 122.

The spike 120 includes a plastic coating, such as polypropylene or polyethylene of approximately 4 mils thick to prevent moisture damage and to provide a suitable contacting surface with which to strike and drive the spike 120. A pointed end 126, which includes the bottom ¼ to 2 inches (0.62 to 5 cm) of the spike section 124, is driven into the base material 70. The relatively thick spike 120 and the pointed end 126 facilitate penetrating the compacted base material 70 and the compacted soil 58. The outer surface of the plastic coating of the pinning device is in one embodiment non-smooth, bumpy or irregular (e.g. from a ribbed reinforced bar) to increase the frictional engagement with the base material 70 and soil 58, which prevents vibration from causing the displacement of the pinning device.

The pinning devices 74 are spaced apart as needed, e.g., in a 6 foot by 6 foot (1.8 m by 1.8 m) grid or in a 10 foot by 10 foot (3 m by 3 m) grid, etc., wherein the pins are spaced evenly such that for a 10 foot (3 m) grid and a 15 foot (4.5 m) wide turf roll, 2½ feet (75 cm) of turf is left on either side of two pins spaced 10 feet (3 m) apart. The pinning devices 74 primarily hold the artificial turf 54 taught while the infill is installed and prevent the turf from having to be removed to smooth out a buckle in the synthetic turf 54. The infill layer is approximately ten pounds per square foot in one embodiment.

Referring to FIG. 3, many airports such as Los Angeles International Airport and Chicago's Midway Airport have limited runways. The installation of the artificial turf system 50 adjacent to the runway walls 64 may have to take place at night, e.g., from 10:00 PM to 7:00 AM, when air traffic and particularly air passenger traffic is somewhat lighter. In these critical areas, e.g., from the runway to 50 feet (15 m) in any direction, the wind direction can dictate where the system implementers work at any given time. If the wind changes and the planes have to take off in another direction, the airport can order the system implementers out of an area.

Dirt, sand or other objects in the critical areas cannot be left exposed to become FODs. An application must be completed or at least covered before work in critical areas stops. Therefore, it is important not to excavate too much dirt at one time in a critical area. Once the installation extends past the safety area of the runway, e.g., 300 feet (90 m), work can take place at any time of the day, wherein turf is laid in the most efficient manner.

Artificial Turf

Referring now to FIG. 5, an infill layer 82 is illustrated in connection with one embodiment of the flexible turf 80 of the present disclosure. The turf 80 is laid over a sheet 84. As discussed above in the flow-through embodiment of FIG. 3, the sheet 84 is a weed barrier in one embodiment. In a sheeting embodiment described below, the sheet 84 includes a waterproof membrane. In certain applications, there is no weed barrier or waterproof membrane, in which case the turf lays upon the base material 70. The turf, e.g., a 12 or 15 foot (3.6 or 4.5 m) roll of the flexible turf 80 includes a primary flexible backing 86 of double woven polypropylene and a secondary flexible backing 88, which is polyurethane. The thickness of the primary flexible backing 86 is provided by the manufacturer. The thickness of the secondary flexible backing 88 is between 10 and 20 mils in one embodiment.

The turf 80 includes a plurality of fibers 90, which are tufted or stitched into the primary backing 86. The secondary backing 88, applied after tufting or stitching, covers some or all of the stitch depending on the thickness of the secondary backing 88. The turf 80 includes 19 tufts or stitches per every three inches (7.5 cm). The fibers 90 are fribulated (i.e., separate filaments which remain connected at certain points so that the yarn if stretched apart creates a honeycombed mesh) in one embodiment to form separate grass-like strands 92. The fibers 90 are polypropylene, 7500 denier and 32 ounces per square yard in one embodiment. Polypropylene has superior melting point and wear ability verses other materials, is adapted to be sprayed with pesticides and herbicides, does not degrade upon contact with toxic jet fuel and limits the spread of fire from a fuel spill due to its fire retardant characteristic.

Figure 1:
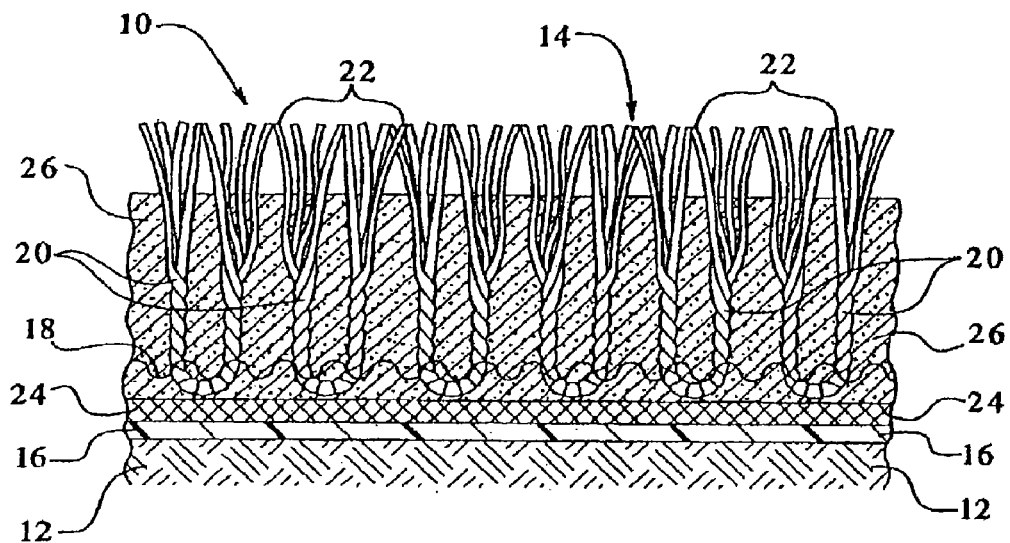
FIG. 1 is a front elevation sectional view through a known section of artificial turf used for sporting applications.

The height of the grass-like strands 92, k, above the bottom of the secondary backing 88 is ½ inch to six inches (1.25 to 15 cm), and specifically 1½ to 2½ inches (3.75 to 6.25 cm) and 2 inches (5 cm) in one embodiment. As illustrated in FIG. 1, the individual fribulated or slit filaments are twisted together near the stitched end and come apart at the top. The turf 80 includes a twisted fiber. Alternatively, the manufacturer makes the fibers 90 flat, so that the individual grass-like strands 92 stack one on top of the other, as illustrated in FIG. 5. The turf 80 can be of either style.

The infill layer 82 is a material that characteristically or inherently retards plant and animal life, absorbs water and enables it to drain through to the primary backing 86 and the secondary backing 88 and provides a firm and stable foundation for the fibers 90. The infill layer 82 includes any material having these characteristics including, but not limited to: rock, sand, concrete, plastic, fiberglass, rubber, ceramic material, cork, or any combination or derivative thereof.

The infill layer 82 is crushed rock or sand and washed sand inn one embodiment. In certain instances, e.g., in the rainy Northwest, the infill layer can be ¼ inch (0.62 cm) minus crushed rock (i.e., ¼ inch (0.62 cm)) average diameter rock down to rock particles) to enhance drainage. Referring to the terminology used in connection with FIG. 1, the infill layer 82 includes resilient materials, such as: (i) granulated cork; (ii) rubber particles including natural rubber or synthetic rubber; (iii) beads of synthetic polymers e.g., vinyl chloride, vinyl ethers, vinyl acetate, acrylates and methacrylates, polyvinylidene chloride, urethanes, polyamids and polyesters; (iv) synthetic polymer foam particles; (v) vinyl foams, e.g., polyvinyl chloride foams, polyvinyl ether foams, foamed polystryene, foamed polyurethanes and foamed polyesters; and (vi) foamed natural rubber. However, the airport application of the present disclosure does not require the spongy, cushioned impact properties associated with sports turf. Moreover, since rubber (one suitable resilient material in practice) is lighter than sand, it tends to float to the top of an infill layer. The rubber on top of the layer can then become a FOD that is sucked through a jet engine, where it can melt over a sensor.

In sport applications, as disclosed above in connection with FIG. 1, the sand is fine sand between about 40 and 200 U.S. screen mesh size to feel less abrasive to players who contact the turf. The size of the sand in the infill 82 can include bigger sand particles that vary between about 4 and about 70 U.S. screen mesh size. The sand is provided in a range of sizes, which facilitates better compaction.

The turf 80 includes a compacted infill layer 82 of variable sand particles. A four-ton double drum roller may be used to make one or more passes over the turf 80. The length 1, which is the average distance between the tips of the grass-like strands 92 and a top surface 94 of the infill layer 82, is ⅛ to 5 inches (0.31 to 12.5 cm) in one embodiment, given that the contemplated variable turf height of the grass-like strands 92, k, above the primary backing 86 is ½ inch to six inches (1.25 to 15 cm). The runway (i.e., runway, taxiway or any other road traveled by an airplane) application of the turf projects an inch (2.5 cm) of the grass-like strands 92 above the infill surface 94, wherein the free ends of the strands 92 shield the sand infill 82 from the weather and from any air flow created by a jet or prop engines. Thus, in an application wherein the grass-like strands 92 are two inches (5 cm) high, the infill layer 82 is about one inch (2.5 cm) high, leaving a distance 1 of about one inch (2.5 cm). In contrast, sport applications, as described in connection with FIG. 1, use as much shock absorbing resilient infill as possible.

Figure 6:
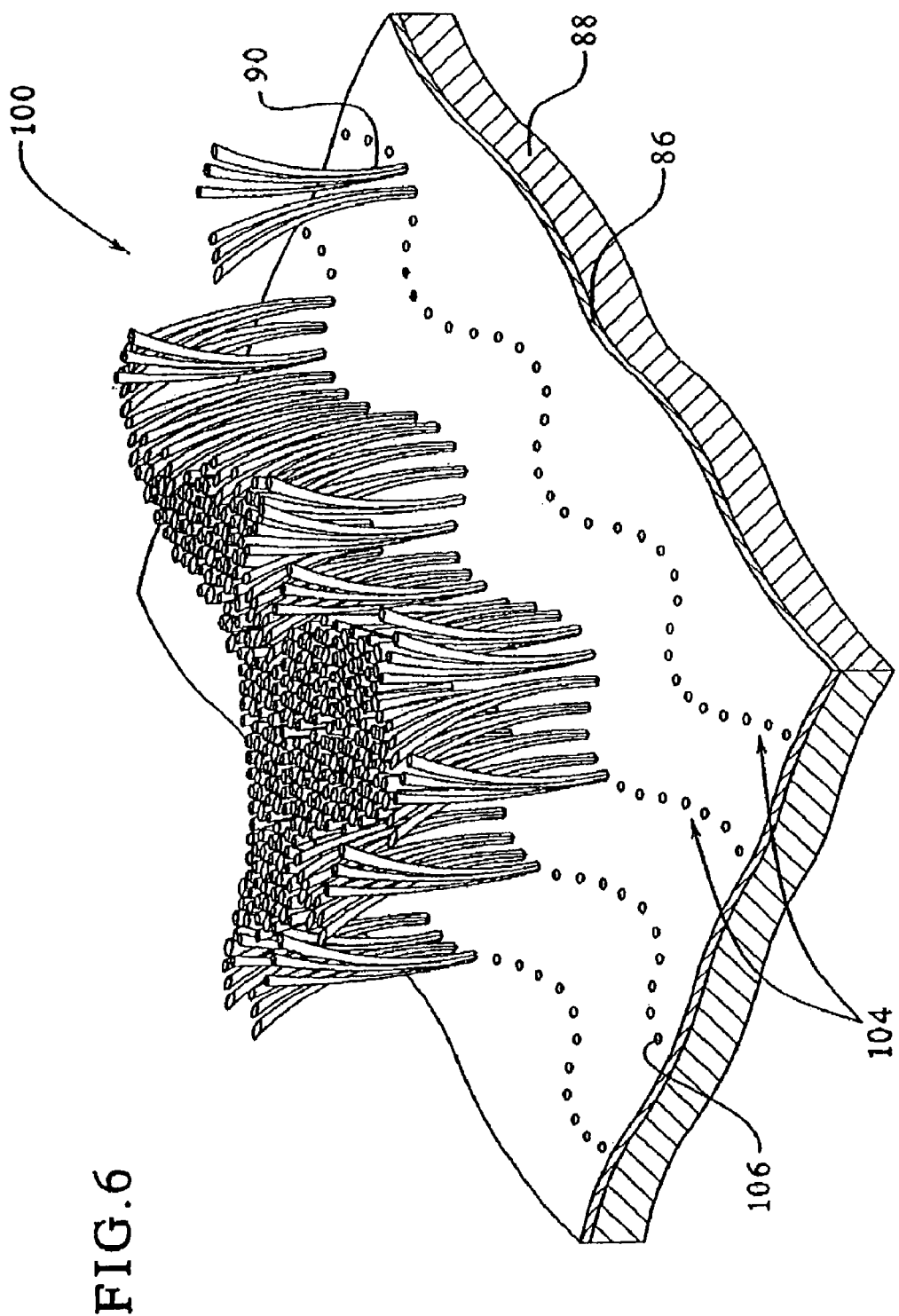
FIG. 6 is a fragmentary perspective view taken through one embodiment of artificial or synthetic turf, wherein a portion of the grass-like fibers is cutaway to illustrate a plurality of rows of stitch holes.

Referring now to FIG. 6, a top-front perspective sectional view through one embodiment of artificial or synthetic turf is illustrated, wherein a plurality of the fibers 90 are cutaway to illustrate a plurality of rows 104 of stitch or tuft holes 106. As above, the turf section 100 includes a primary backing 86 and a secondary backing 88. The rows 104 in this embodiment are alternatingly curved, forming a serpentine shape, to prevent any possible "corn-row" effect from parallel rows. It has been observed that straight rows of the turf described above do not produce a corn-row effect. The present disclosure therefore includes a turf having alternatingly curved or straight rows.

The rows 104 of the turf section 100 are spaced apart in one embodiment from between ¼ to 2 inches (0.62 to 5 cm), are specifically spaced ⅜ to ¾ inches (0.93 to 1.87 cm) apart and spaced ¾ inches (1.87 cm) apart in one embodiment. Known stitching machines are set to stitch rows in multiples of ⅜ inch (0.93 cm), so if a wider row is desired, a row of 1⅛ or 1½ inches (2.81 or 3.75 cm) is likely the most feasible.

Alternative Artificial Turf System

Figure 7:
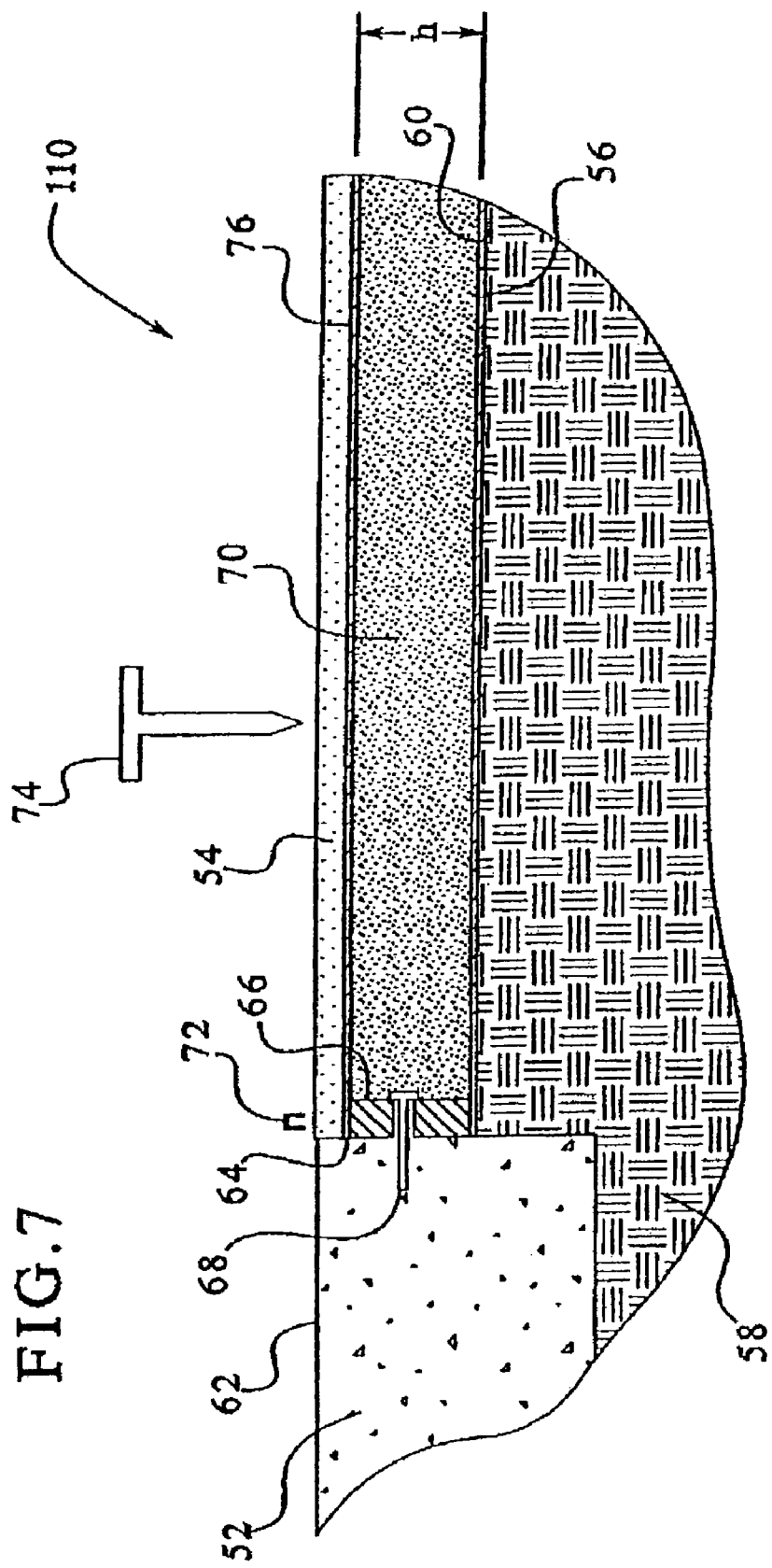
FIG. 7 is a fragmentary cross-sectional view, taken along the line VII-VII of FIG. 2, of another embodiment of the artificial turf system illustrating an airport runway section adjacent to an artificial turf surface, which includes a sub-surface having a water proof membrane and a weed barrier.

Referring now to FIG. 7, an fragmentary cross-sectional view, taken along the section line VII-VII of FIG. 2, of one embodiment of an artificial turf system 110 illustrates an airport runway/taxiway section 52 adjacent to the artificial turf 54 and a sub-surface having a weed barrier 56 and a waterproof membrane 76. An installer of system 110: (i) excavates, grades, scarifies and compacts an application specific amount of the soil 58 to create a desired soil surface 60 (for existing airports and in certain instances for a new airport); (ii) installs a desired weed barrier 56 onto the soil surface 60; (iii) glues and ramsets a composite stud or member 66 using a suitable non-toxic glue and ramset 68; (iv) installs and compacts to tested specification an application specific amount of base material 70, e.g., ¾ inch (1.87 cm) road base or ¾ inch (1.87 cm) minus crushed rock with binder; (v) installs a second sheet, which in this embodiment is a waterproof membrane 76, and the staples or suitably attaches the membrane to the top of the composite stud or member 66; (vi) installs a two inch (5 cm) artificial turf by stapling and gluing the turf initially to the composite stud or member 66, sews separate adjacent and interior sections of turf together as necessary, pulls the sewed section taught, and drives pinning devices 74 in a grid pattern to secure the turf before applying infill; and (vii) applies an application specific infill (e.g., non-uniform sand) to an application specific height (e.g., one inch (2.5 cm) below the tips of the turf's grass-like fibers).

The waterproof membrane 76 includes any commercially available pond liner or water impermeable membrane, which can be between 2 and 30 mils thick. One possible waterproof membrane 76 made by Little Giant Pump Co. is a 20 mil thick plastic, e.g., polypropelyne, sheet, which can be ordered in ten or fifteen foot (4.5 m) wide rolls or sheets. One fifteen foot (4.5 m) width is laid in target areas near runways or taxiways. A larger area can also be used as desired. Multiple passes of the membrane are laid to form a shingle-like overlap in concert with the grade to ensure downhill flow. Six inches (15 cm) of overlap is sufficient.

As stated above, the flow-through system 50 of FIG. 3 is used in many or most applications. Most applications, however, will have one or more areas, usually near drains, retention or detention ponds, wherein the waterproof membrane 76 is used in lieu of the upper weed barrier 56. The sheeting system 110 of FIG. 7 moves water along the grade as opposed to the vertical absorption and drainage of the flow-through system 50.

In one example of a sheeting application, a particular airport may desire to have an area of fifteen feet (4.5 m) adjacent to a runway/taxiway that is never to have standing water under any weather conditions, e.g., access under any conditions. The sheeting system 110 is installed for the first fifteen feet (4.5 m) in one method by: (i) gluing the membrane 76 to the composite stud or member 66; (ii) stapling the membrane 76, along the glue bead, to the composite stud or member 66 using, e.g., 1 inch (2.5 cm) sod pins; (iii) pulling the membrane 76 taught; (iv) gluing the turf 54 to the membrane 76; and (v) stapling the turf 54, along the glue bead, to the composite stud or member 66 using, e.g., 1 inch (2.5 cm) sod pins. After fifteen feet (4.5 m), the flow though system 50 is installed, which includes dual weed barrier layers 56.

Referring now to FIG. 8, a fragmentary cross-sectional view, taken along line VIII-VIII of FIG. 2, of a drainage system 130 illustrates another waterproof membrane application for the present disclosure. As mentioned above with respect to FIG. 2, the present system accommodates and enhances existing drains or drainage ways. The drainage system 130 includes a concrete drain 132 having a drainhole 134 that allows water to drain into a main pipe, retention or detention pond (not illustrated). The drainage system is built into the existing soil 58, which is likely graded to run water to the drain 132.

In many instances, the land will have heaved or risen around the drain, not allowing proper flow to the existing drain. The drainage system 130 includes excavating, scarifying, regrading and compacting the soil 58 around the drain 132, installing a weed barrier 56 as described above, laying and compacting an application specific amount and type of base material 70, and then applying the waterproof membrane 76 and the turf 54.

The drainage system 130 includes a lip 136 of material (exaggerated here for illustration) of approximately 1/16 inch to 3/4 inch (0.15 to 1.87 cm), wherein the waterproof membrane 76 and the turf 54 extend past the edge of the drain 132, which enhances and enables the water to drain smoothly into the drainhole 134 of the drain 132. The membrane 76 is in one embodiment glued to the surface of the porous concrete drain 132 using the non-toxic glue and method described above. The infill layer, which is washed sand in one embodiment, compresses the artificial turf 54 onto the membrane 76. The drainage system 130 also includes suitable ramsets or other suitable fastening devices driven into the concrete drain 132 (not illustrated) to hold the membrane 76 and turf 54 in place until the glue sets up. The waterproof membrane 76 is used to sheet the drainage water to the drainhole 134, for at least three to four feet (90 to 120 cm) and to ten or fifteen feet (3 or 4.5 m) around the drain in one embodiment.

Turf/Natural Grass Interface Embodiment

Referring now to FIG. 9, a fragmentary cross-sectional view, taken along line IX-IX of FIG. 2, of one embodiment 140 for interfacing the synthetic turf 54 and the sub-surface of the present disclosure with natural grass 142 is illustrated. As mentioned above with respect to FIG. 2, the present system includes interfacing with existing natural grass, such that an airport selectively installs synthetic turf in target areas and specifically in areas adjacent to runways or taxiways. The system 140 includes a convenient method for securely interfacing the turf 54 with existing grass, such that the interface survives severe winds.

The interface embodiment 140 includes digging a trench 144 into the existing soil 58 along a desired interface line of the airfield. The trench 144 is sufficiently deep to secure a piece of vertical turf 146 that is folded over the base material 70 and backfilled with compacted soil 148. A one foot (30 cm) deep by four inch (10 cm) wide trench is generally sufficient. Well known trenchers can dig thousands of feet of this trench in an hour. Natural grass sod 142 or seed is then planted, depending on the proximity of the interface to the runway/taxiway (sod too close to the runway can fly up and become a FOD, however, a turf/grass interface is 150 feet (45 m) from the runway/taxiway in one embodiment).

Arrester Bed System

Figure 10:
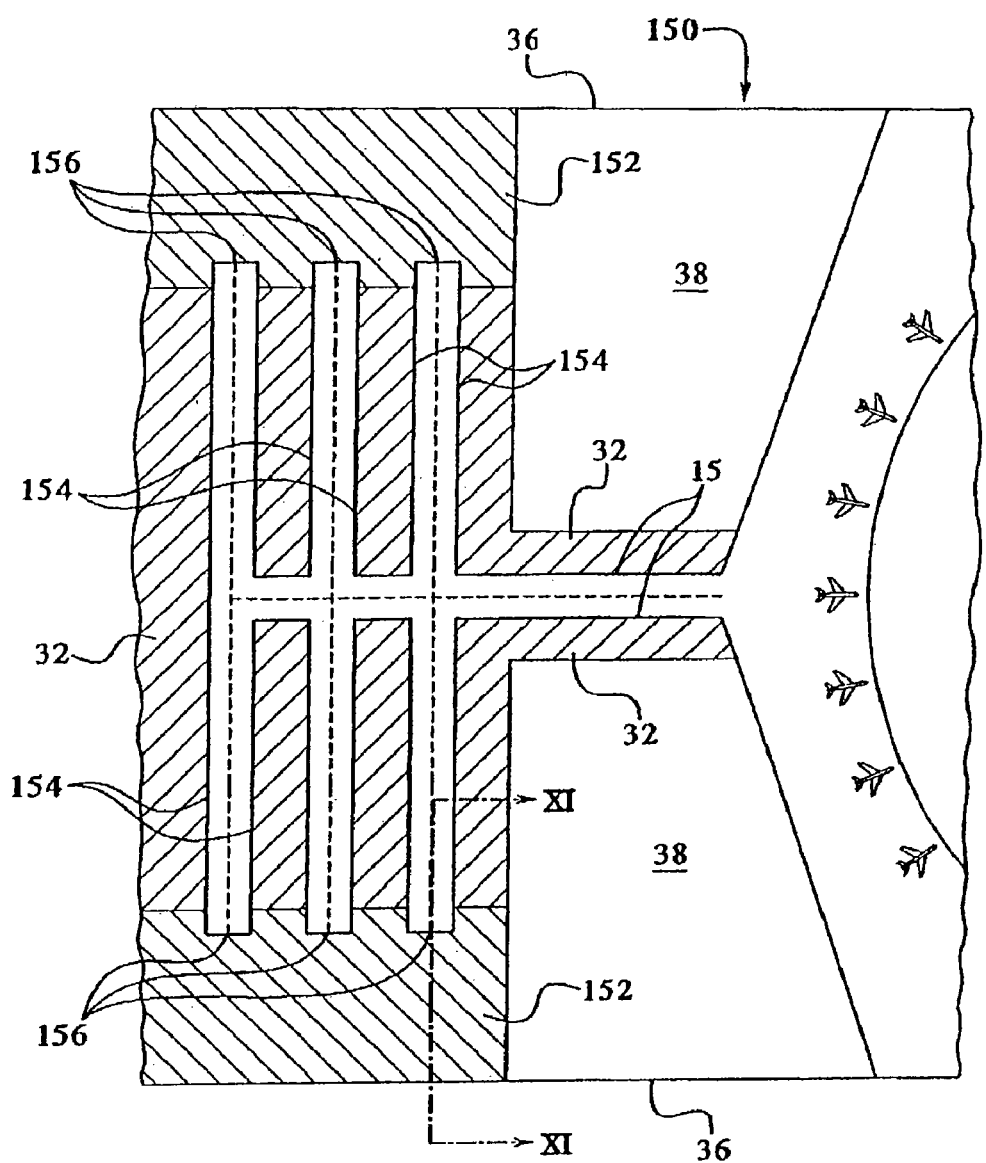
FIG. 10 is a fragmentary top plan sectional view of an airport or airfield, illustrating sections of airport runways, taxiways and areas of adjacent synthetic turf employing a soft ground arrester system of the present disclosure.

Referring now to FIG. 10, a top plan sectional view of an airport or airfield 150, including sections of airport runways, taxiways and areas 152 of adjacent synthetic turf employing a soft ground arrester system of the present disclosure is illustrated. The present disclosure uses the artificial turf system 50 or 110 (FIGS. 3 and 7 respectively) in areas 32 adjacent to or substantially adjacent to the runway/taxiway sides 154. The present disclosure uses the arrester bed areas 152 having an arrester bed sub-surface adjacent to the runway/taxiway ends 156 wherever possible. Again, it is conceivable that the runways or taxiways contain obstacles, such as drains, etc., along their sides 154 or ends 156 that do not allow the turf to be uniformly applied along their edges.

The arrester bed areas 152 include many of the aesthetic and drainage features of the artificial turf systems 50 and 110. The arrester bed areas 152 are additionally adapted to slow the motion and absorb the kinetic motion of an aircraft that has traveled off of a runway/taxiway. Particular airport operators or administrators may desire that the arrester bed areas 152 be additionally installed along a portion of one or more sides 154 of the runway/taxiway to protect a plane that exits the runway/taxiway along their sides. As illustrated, the present disclosure additionally includes the arrester bed areas 152 adjacent to a portion of the sides 154 of the runway/taxiway.

The arrester bed areas 152 are installable on one or both ends 156 of the runway/taxiway, as desired by the airport. The arrester bed areas 152 are adaptable to be installed to match any shape or contour created by the turf areas 32, sides 154 and ends 156 of the runway/taxiway, airport fences 36, natural grass areas 38 or by any other road, driveway, accessway, pathway, tree, bush, building, garage, hanger (not illustrated), or any other structure associated with an airport. The arrester bed areas 152 likewise accommodate any interior obstruction, such as runway lights, interior natural grass sections, trees, bushes, drains or drainage ways, interior or access roads, buildings, garages, hangers (not illustrated), or any other structure associated with an airport. The interface embodiment of FIG. 9 also applies to an interface between the arrester bed areas 152 and the natural grass areas 38.

The arrester bed areas 152 include any area of turf having any distance perpendicular to a side 154 or end 156 of the runway/taxiway. Airport operators most likely install the arrester bed areas 152 around runways, however, they are installable around taxiways as well. For purposes of illustration, the term runway includes runways, taxiways or any road traveled by airplanes. It is recommended that an airport install an arrester bed area 152 on both runway ends 156 perpendicularly from between 200 to 1000 feet (60 to 300 m) to provide enough area to properly slow a runaway aircraft. Many airports contain parallel runways less than 300 feet (90 m) apart. If so, the airports include a large arrester bed area 152 at each runway end 156, as shown, or include a plurality of individual arrester bed areas 152.

Figure 11:
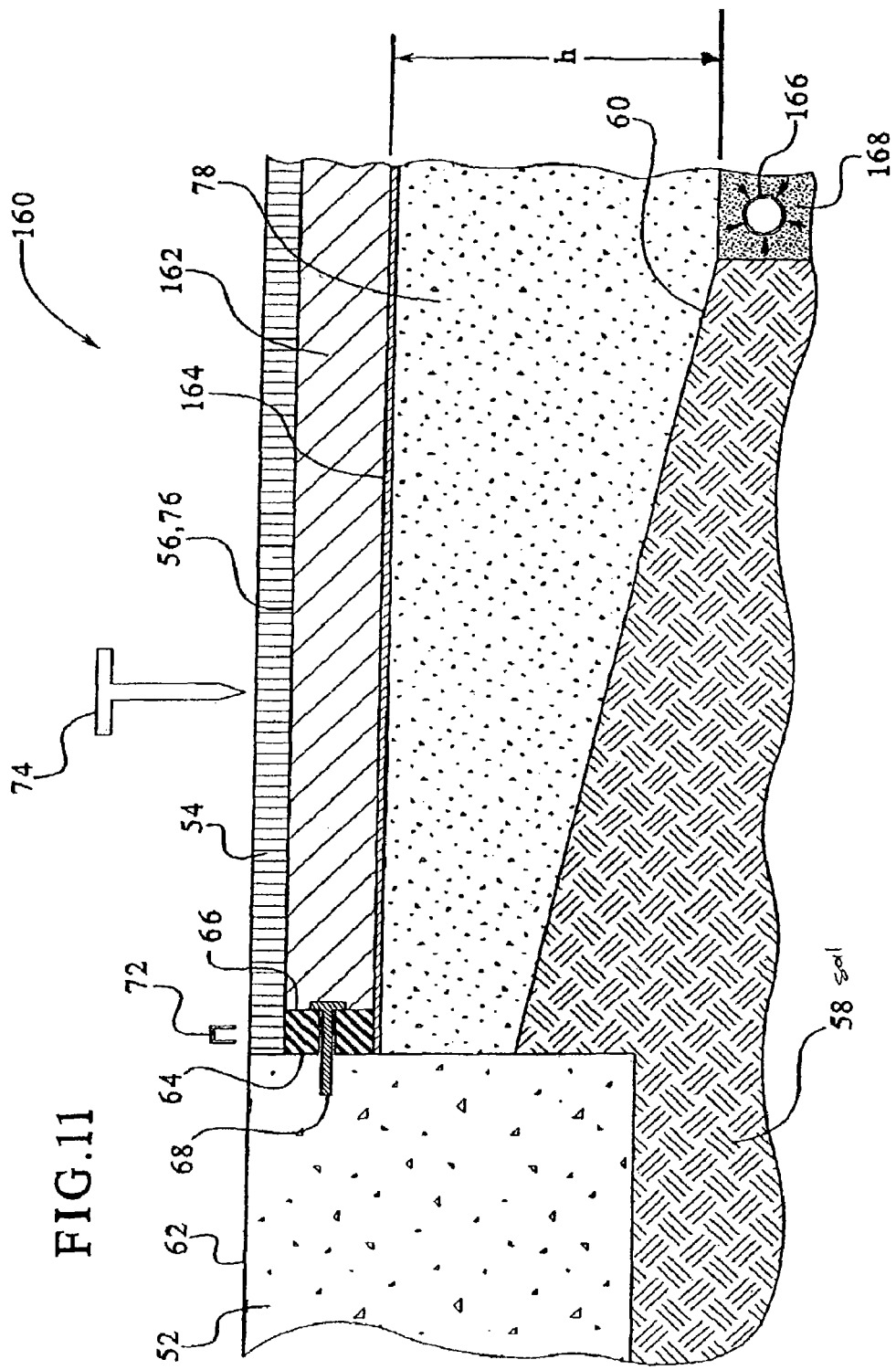
FIG. 11 is a fragmentary cross-sectional view, taken along line XI-XI of FIG. 10, of one embodiment of a soft ground arrester system illustrating an airport runway section adjacent to an artificial turf surface, which includes a sub-surface having a soft ground arrester bed.

Referring now to FIG. 11, a fragmentary cross-sectional view, taken along line XI-XI of FIG. 10, of one embodiment of a soft ground arrester bed system 160 employing a synthetic turf and a sub-surface having an arrester bed is illustrated. An arrester bed system 160 is then installed using a different sequence or method than those described above in connection with the artificial turf system 50 of FIG. 3 and the system 110 of FIG. 7. Namely, the installer: (i) excavates, grades, scarifies and compacts an application specific amount of the soil 58 to create a desired soil surface 60 (for existing airports and in certain instances for a new airport); (ii) installs a drain pipe 166 and a surrounding layer of washed rock 168, wherein the pipe 166 leads to an airfield's drainage system; (iii) installs an application specific amount of arrester base material 78 onto the compacted soil surface 60; (iv) installs a thick weed barrier and stabilizer 164 on top of the arrester base material 78; (v) glues and ramsets a composite stud or member 66 via a suitable non-toxic glue and ramset 68; (vi) installs a second arrester base material 162 onto the heavy weed barrier 164; (vii) installs a thin weed barrier 56 or alternatively a waterproof membrane 76 onto the second arrester base material 162, and staples the barrier or membrane to the top of the composite stud or member 66; (viii) installs a two inch (5 cm) artificial turf by stapling and gluing the turf initially to the composite stud or member 66, sewing separate adjacent and interior sections of turf together as necessary, pulling the sewed section taught, and driving pinning devices 74 in a grid pattern to secure the turf before applying infill, and (ix) applying an application specific infill (e.g., non-uniform sand) to an application specific height (e.g., one inch (2.5 cm) below the tips of the turf's grass-like fibers).

The primary differences between the arrester bed system 160 and the artificial turf systems 50 and 110 of FIGS. 3 and 7, respectively, include the typical locations of the systems disclosed above in FIG. 10 and the base material 70 of the prior systems versus the arrester base materials 78 and 162. The arrester bed system 160 includes a base material 78 that characteristically retards plant and animal life, absorbs water, enables water to drain through to the soil surface 60 and provides a cushioned or slightly collapsible, energy absorbing characteristic to the sub-surface of the arrester bed system 160. The arrester base material 78 includes any material having these characteristics including, but not limited to: rolled rock, sand, rubber, foamed rubber, plastic, cork, or any combination or derivative thereof.

The arrester base material 78 in one embodiment is washed ⅜ inch (0.93 cm) rolled rock, which is commonly referred to as pea gravel. The rock used for the arrester base material 78 is uncrushed, is not compacted, and is likewise of roughly the same size, i.e., ⅜ inch (0.93 cm) average diameter. The same size rock creates a layer having interstices or openings that enable energy absorption and facilitate flow-through drainage. The arrester bed system 160 is a flow-through rather than a sheeting system.

The height h of the base material 78 is application specific and in one embodiment is the depth of the excavation along the runway end or side wall 64 less the height of the fibers of the artificial turf 54, wherein the fiber tips are substantially parallel with the runway surface 62 and less the height of a layer of a second base material 162. One major difference between the arrester bed system 160 and the artificial turf systems 50 and 110 of FIGS. 3 and 7, respectively, is that the height h of the base material 78 varies, while the top surface of the artificial turf 54 remains substantially flat and substantially coplanar with the runway surface 62.

The arrester bed system 160 gradually brings a runaway plane to a stop. An arrester system having a deeper height h absorbs more energy more quickly. If the height h of the base material 78 is initially too deep, a runaway plane may stop too fast and cause the plane's landing gear to collapse and the cargo and passengers of the plane to lurch forward. The height h therefore deepens as the arrester bed system 160 spans away from the end or the side wall 64.

The depth of the excavation for the arrester bed system 160 is typically deeper than the depth of the excavation for the artificial turf systems 50 and 110 of FIGS. 3 and 7, respectively. The arrester bed systems 160 include an initial excavation at the runway end or side wall 64 of between eight inches and three feet (20 and 90 cm). The initial excavation is deeper than the depth or thickness of a runway, in which case sufficient steps are taken not to damage the integrity of the soil beneath the runway.

As illustrated, the soil surface 60 is graded. The severity of the grade depends primarily on the length or perpendicular distance that the arrester bed system 160 spans from the end or side wall. The excavation typically reaches a depth of between 20 inches and four feet (50 and 120 m) depending on the arrester base material 78 and the type and weight of airplanes taking off and landing at the airport. If possible, a grade of one quarter inch (0.62 cm) for every foot (30 cm) in a direction perpendicular to the runway is employed, approximately a two percent drop, until a desired depth is reached. In shorter applications, e.g., 200 to 400 feet (60 to 120 m), the grade may have to be steeper to reach the desired depth.

After grading the soil 58, the soil surface 60 is compacted to between ninety and ninety-five percent. Before compacting, the present disclosure contemplates scarifying approximately four inches of the unexcavated topsoil 58. Scarification enables better compaction, which aids in providing a firm base. A four-ton double drum roller or a sheep's-foot compactor can be used to compact the soil 58.

The arrester bed system 160 is a flow-through system, wherein water drains vertically to the compacted soil surface 60, down the soil's grade and into a drain pipe 166. The drain pipe 166 includes any synthetic or metal pipe or tube and is a four inch (10 cm) NPT PVC pipe in one embodiment. The pipe 166 lays parallel with the wall 64 and captures drain water through perforations approximately ⅛ wide inch by two inches (0.31 by 5 cm) along in the pipe's wall. The perforations are spaced so that the longer two inch (5 cm) length runs radially along the pipe. The perforations are spaced apart approximately one half inch (1.25 cm).

To keep the soil 58 and arrester base material from filling the drain pipe 166, the pipe is protected by a one to six inch (2.5 to 15 cm) layer of washed rock 168, wherein the rock is sized sufficiently to keep material from passing through the perforations. A suitable trench is dug using a known trench digger, wherein the trench is partially filled with the washed rock 168, and wherein the pipe 166 is laid and the remainder of the trench is filled with washed rock 168. The arrester base material 78 is poured so as to have a substantially flat surface that is parallel to the runway surface 62.

A heavy weed barrier 164 is installed onto the surface of the arrester base material 78. The heavy weed barrier is a thick weed barrier, e.g., ⅛ inch (0.31 cm), which is plastic or other fabric, woven, or thermally bonded or otherwise suitably formed. The heavy weed barrier and stabilizer 164 includes a Polyspun brand drainage/weed control fabric made by Landmaster Products of Engelwood, Colo. As above, the heavy weed barrier 164 prevents weeds or other plants as well as grubs or worms from traveling from the soil surface 60 though the remainder of the arrester system 160. The heavy weed barrier 164 also enables the water to flow from the arrester system 160 into the soil 58. The weed barrier 164 is thicker to provide extra support to the system, which includes uncompacted arrester base material 78.

The composite stud or member 66 is installed using ramsets 68 and non-toxic glue as described above in connection with FIG. 3. A second arrester base material 162 is then installed onto the heavy weed barrier 164. The arrester base material 78 is uncompacted and likewise less adept at keeping weeds and other contaminants from propagating out of the soil 58 and traveling through the arrester base material 78 and the remainder of the arrester system 160. The second arrester base material 162 includes any material that substantially retards plant and animal life, that allows flow-through drainage and is in one embodiment washed sand of between about 4 and 70 U.S. screen mesh size. A layer of the second arrester base material 162 is constant throughout the area of the arrester system 160, is between one and ten inches (2.5 and 25 cm) deep and is four inches (10 cm) deep or approximately the same as the height of composite stud or member 66 in one embodiment.

A weed barrier 56 is installed onto the top of the second arrester base material 162. The weed barrier 56 and its method of installation are discussed above in connection with FIG. 7. In certain areas of the arrester system 160, the water is sheeted as desired. The arrester system 160 thus includes a waterproof membrane 76, described above in connection with FIG. 3, in the place of the weed barrier 56.

A two inch (5 cm) artificial turf 54 is installed such that the fiber tips are substantially coplanar or slightly below the runway surface 62, as described above in connection with FIG. 3. A washed sand infill layer (not illustrated) having varying sized granules, such as the infill 82 of FIG. 5, is installed, smoothed an compacted by making one or more passes with a four-ton double drum roller as described above. The method of laying, sewing, stretching, and pinning the artificial turf 54 of the arrester system 160 is substantially the same as that disclosed in connection with the system 50 of FIG. 3.

Artificial Turf for Repelling Birds or Other Animals

Figure 12:
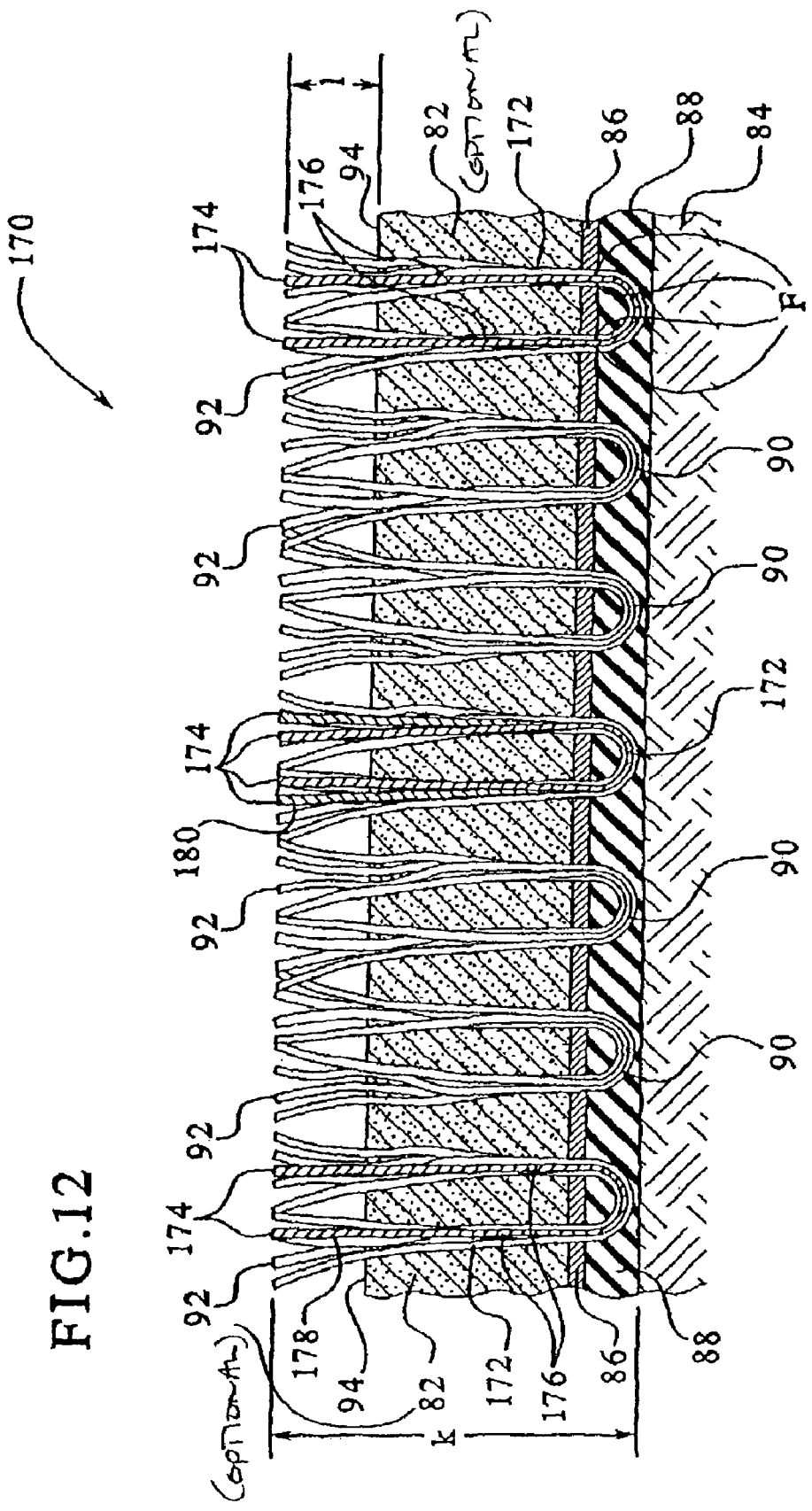
FIG. 12 is a fragmentary front elevation sectional view taken through one embodiment of an artificial or synthetic turf having spaced-apart repelling fibers.

Referring now to FIG. 12, a front elevation sectional view through an embodiment 170 of artificial or synthetic turf is illustrated, wherein a plurality of the grass-like fibers 90 are replaced by stiff, spiny, barbed, needle bearing or prickly fibers or any combination thereof which are referred to herein as repelling fibers 172, and which repel loitering animals. The repelling turf 170 is laid over a sheet 84. As discussed above in the flow-through embodiment of FIG. 3, the sheet 84 is a weed barrier. In a sheeting embodiment discussed in FIG. 7, the sheet 84 is a waterproof membrane. A twelve or fifteen foot (3.6 or 4.5 m) roll of the repelling turf 170 includes a primary flexible backing 86, e.g., of double woven polypropylene and a secondary flexible backing 88, e.g., which is polyurethane in one embodiment. The backings are alternatively any known primary or secondary backing, some of which are disclosed above in connection with FIG. 1. The thickness of the primary backing 86 is provided by a manufacturer. The thickness of the secondary backing 88 is between ten and twenty mils.

The repelling turf 170 includes a plurality of flexible fibers 90 and repelling fibers 172, which are tufted or stitched into the primary backing 86. The secondary backing 88, applied after stitching, covers some or all of the tuft or stitch depending on the thickness of the secondary backing 88. The repelling turf in one embodiment includes 19 tufts or stitches per every three inches (7.5 cm) or any number of stitches disclosed above in connection with FIG. 1. The flexible fibers 90 are in one embodiment fribulated (i.e., separate filaments remain connected at certain points so that the yarn if stretched apart creates a honeycombed mesh) to form separate grass-like strands 92. The fibers 90 include being of any material disclosed above in connection with FIG. 1 and are polypropylene, 7500 denier and 32 ounces per square yard in one embodiment.

The repelling fibers 172 include metal wire, stiff or hard plastic fibers, metal wire with a plastic coating, fiberglass fibers, etc. The repelling fibers 172 include one or more relatively stiff plastic, e.g., polypropylene, polyethylene, polyurethane, nylon, polyester, etc., woven or monofilament (non woven) fibers 174 of approximately 10,000 denier.

The stiff plastic fibers 174 are tufted or stitched into the primary backing 86 with the flexible fibers, so that the repelling fibers also include grass-like strands 92. FIG. 12 illustrates that the repelling turf 170 includes repelling fibers 172 that are tufted and folded over to form a U shape. That is, one repelling fiber 172 is tufted or stitched, via existing stitching machines, through the primary backing 86 to form the illustrated U shape having two stems 176, each having a stiff plastic fiber 174. A compressive, frictional force F applied to the repelling fiber 172 by the primary backing 86, due to the stitching process, holds the repelling fiber 172 in place. The secondary backing 88 also clamps the fiber 172 in place.

Alternatively, the repelling turf 170 includes a single repelling fiber 172 (not illustrated), which is again a stiff plastic, e.g., polypropylene, polyethylene, nylon, polyester woven or monofilament fiber 174 of approximately 10,000 denier, and which is not folded over, but includes an attached end. That is, the alternative fiber 172 includes only one stem 176. One method for attaching a single repelling fiber 172 (not illustrated) is to provide a ball, tab or thicker portion at the attached end of the repelling fiber 172, which enables the single stem 176, but not the ball or tab, to pass through the primary backing 86. The compressive, frictional force F applied to the repelling fiber 172 by the primary backing 86, as well as a clamping force applied by the secondary backing 88, secure the ball, tab or thick portion between the primary and secondary backings.

Both the dual stem or U shaped fiber embodiment and the single stem embodiment include a stiff plastic fiber 174 of approximately 10,000 denier, as illustrated by the fiber 178.

Both the dual or U shaped fiber embodiment and the single repelling fiber embodiment also contemplate including a plurality of stiff plastic fibers 174, of approximately 10,000 denier, as illustrated by the fiber 180.

The height of the grass-like strands 92 and the tips of the repelling fibers 172, k, above the bottom of the secondary backing 88 is ½ inch to six inches (1.25 to 15 cm), 1½ to 2½ inches (3.75 to 6.25 cm) in one embodiment and most two inches (5 cm) in one embodiment. As illustrated in FIG. 1, the individual fribulated or slit filaments are twisted together near the stitched end and come apart at the top. The present disclosure contemplates using such a twisted fiber. Alternatively, the manufacturer makes the repelling fibers 172, such that the individual stiff plastic fiber(s) 174 and grass-like strands 92 stack one on top of the other. The repelling turf 170 includes either style.

The repelling turf 170 provides an uncomfortable (but not unsafe) environment for birds and animals. That is, the stiff plastic fibers 174 annoy an animal's paw or a webbed foot of a loitering bird, such as a seagull, but do not injure the paw or foot in any way. The repelling turf 170 quickly teaches the target animals to stay away before the system inflicts even limited damage. The present disclosure thus contemplates including the repelling turf in any of the artificial turf systems 50 and 110 of FIGS. 3 and 7 and the arrester system 160 of FIG. 11, wherein the repelling turf includes stiff, spiny barbed, needle bearing or prickly fibers or any combination thereof.

The infill layer 82 of the repelling turf 170 is any a material that characteristically retards plant and animal life, absorbs water and enables it to drain through to the primary backing 86 and the secondary backing 88 and provides a firm and stable foundation for the flexible fibers 90 and the repelling fibers 172. The infill layer 82 includes any material having these characteristics including, but not limited to: rock, sand, concrete, plastic, fiberglass, rubber, ceramic material, cork, or any combination or derivative thereof.

The infill layer 82 is crushed rock or sand and is washed sand in one embodiment. In certain instances, e.g., in the rainy Northwest, the infill layer is ¼ inch (0.62 cm) minus crushed rock (i.e., ¼ inch (0.62 cm) average diameter rock down to rock particles) to enhance drainage. Referring to the terminology used in connection with FIG. 1, the infill layer 82 includes resilient materials, such as: (i) granulated cork; (ii) rubber particles including natural rubber or synthetic rubber; (iii) beads of synthetic polymers e.g., vinyl chloride, vinyl ethers, vinyl acetate, acrylates and methacrylates, polyvinylidene chloride, urethanes, polyamids and polyesters; and (iv) synthetic polymer foam particles; (v) vinyl foams, e.g., polyvinyl chloride foams, polyvinyl ether foams, foamed polystryene, foamed polyurethanes and foamed polyesters; and (vi) foamed natural rubber.

The size of the sand in the infill 82 varies between about 4 and about 70 U.S. screen mesh size. The repelling turf 170 does not require the sand to be less abrasive and prefers a range of sizes, which facilitates better compaction. The repelling turf 170 includes compacting the infill layer 82 of variable sand particles using a four-ton double drum roller by making one or more passes over the repelling turf 170. The stiff plastic fibers 174 are therefore of a material that does not crack, snap or permanently deform upon compaction.

The length 1, which is the average distance of the tips of the grass-like strands 92 and the tips of the repelling fibers 172 above a top surface 94 of the infill layer 82, includes the range of ⅛ to 5 inches (0.31 to 12.5 cm). The airfield application of the repelling turf 170 projects an inch (2.5 cm) of the flexible strands 92 and repelling fibers 172 above the infill surface 94, which shield the sand infill 82 from the weather and from any winds created when the plane takes off or lands. In an application wherein the flexible strands 92 and the repelling fibers 172 are two inches (5 cm) high, the infill layer 82 is one inch (2.5 cm) high and the distance 1 is one inch (2.5 cm) in one embodiment.

Figure 13:
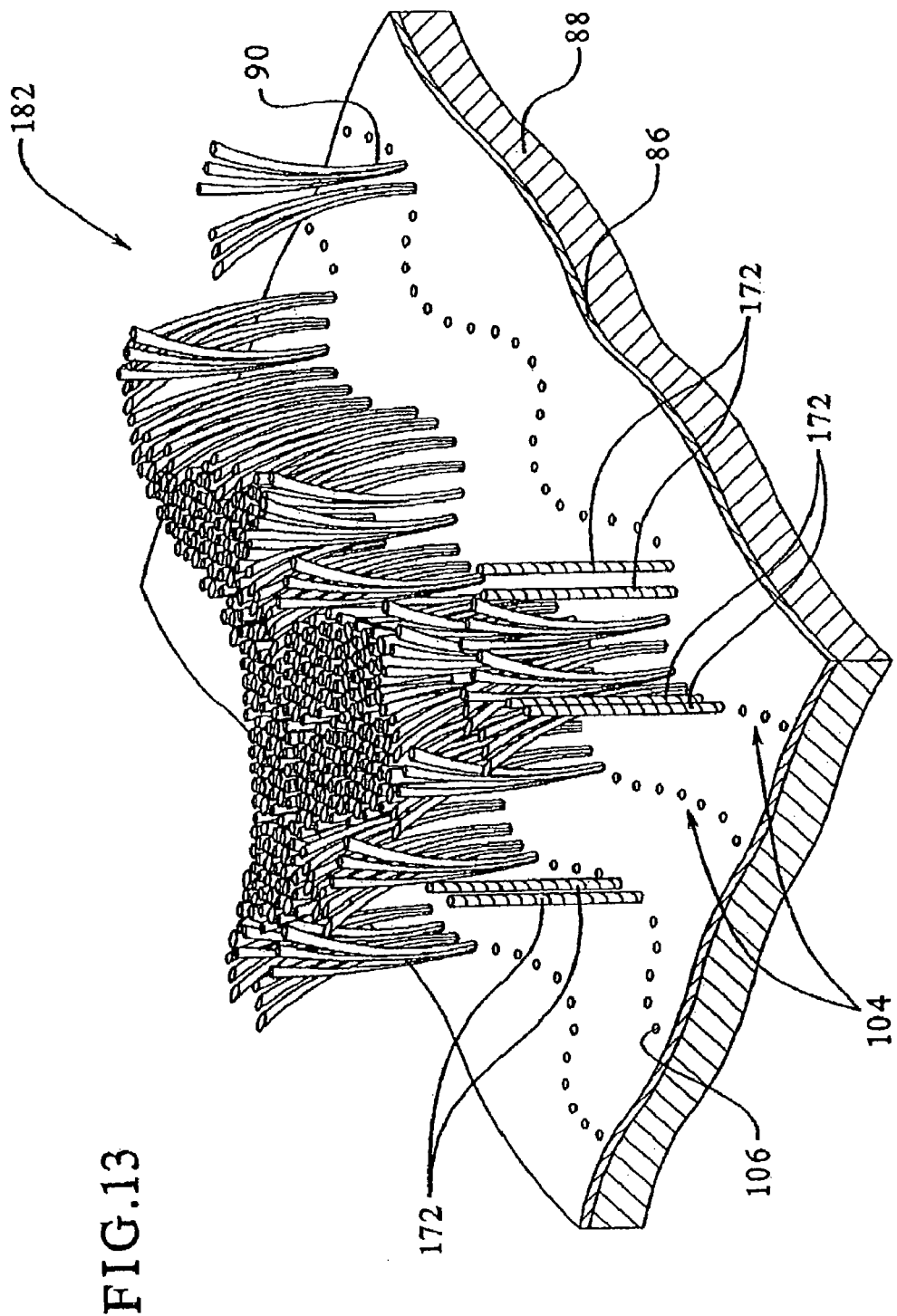
FIG. 13 is a fragmentary perspective sectional view taken through one embodiment of an artificial or synthetic turf having spaced-apart repelling fibers.

Referring now to FIG. 13, a top-front perspective sectional view through one repelling turf embodiment is illustrated, wherein a plurality of the flexible fibers 90 are replaced by repelling fibers 172 that repel loitering animals. The repelling turf section 182 has a plurality of the flexible fibers 90 and repelling fibers 172 cut away to illustrate a plurality of rows 104 of stitch or tuft holes 106. As discussed above, the repelling turf section 182 includes a primary backing 86 and a secondary backing 88 and the above described methods of repelling fiber attachment. The rows 104 in this embodiment are alternatingly curved in a serpentine shape to prevent any possible "corn-row" effect from parallel rows. It is contemplated that straight rows of the repelling turf section 182 do not produce a corn-row effect. The repelling turf section 182 therefore includes alternatingly curved or straight rows.

The rows 104 of the repelling turf section 182 include being spaced apart from between ¼ to 2 inches (0.62 to 5 cm), but are spaced apart ⅜ to ¾ inch (0.93 to 1.87 cm) and spaced apart ¾ inch (1.87 cm) in one embodiment. Known stitching machines are set to stitch rows in multiples of ⅜ inch (0.93 cm), so if a wider row is desired, a row of 1⅛ or 1½ inches (2.81 or 3.75 cm) is likely the most feasible. The repelling turf section 182 includes repelling fibers 172 interspersed among the flexible fibers 90, which the present disclosure contemplates interspersing a plurality of ways.

In one embodiment, the repelling turf section 182 includes interspersing one or more adjacent repelling fibers 172 among one or more flexible fibers 90 of a particular row 104. In a single row, the repelling turf section 182 includes one or more adjacent repelling fibers 172 after every flexible fiber 90, after every two adjacent flexible fibers 90, after every three adjacent flexible fibers 90, etc., or after any number of adjacent flexible fibers 90, the number being from one to one hundred flexible fibers 90. In a single row, the repelling turf section 182 includes one or more adjacent repelling fibers 172 after every ¼ inch (0.62 cm) of flexible fibers 90, after every ¼ inch to ½ inch (0.62 to 1.25 cm) of flexible fibers 90, after every ½ inch to ¾ inch (1.25 to 1.87 cm) of flexible fibers 90, etc., or after any ¼ inch (0.62 cm) range of adjacent flexible fibers 90, the ranges existing from between 0 to ¼ inch (0 to 0.62 cm) to between 15¾ inches to 16 inches (39.37 to 40 cm).

Alternatively, the repelling turf section 182, includes interspersing one or more rows 104 of repelling fibers 172 among one or more rows 104 of flexible fibers 90. The repelling turf section 182 includes one or more rows of adjacent repelling fibers 172 after every row of flexible fibers 90, after every two adjacent rows of flexible fibers 90, after every three adjacent rows flexible fibers 90, etc., or after any number of rows of adjacent flexible fibers 90, the number being from one to fifty rows of flexible fibers 90. The one or more rows of adjacent repelling fibers 172 include each being entirely comprised of repelling fibers 172 or, alternatively, interspersing the repelling fibers 172 among the flexible fibers as described above. The present disclosure also includes one or more rows of adjacent repelling fibers 172 after every ¼ inch (0.62 cm) of flexible fibers 90, after every ¼ inch to ½ inch (0.62 to 1.25 cm) of flexible fibers 90, after every ½ inch to ¾ inch (1.25 to 1.87 cm) of flexible fibers 90, etc., or after any ¼ inch (0.62 cm) range of adjacent flexible fibers 90, the ranges existing from between 0 to ¼ inch (0 to 0.62 cm) to between 15¾ inches to 16 inches (39.37 to 40 cm).

Manufacturing and Installation of Multi-Pigmented Turf

Figure 14:
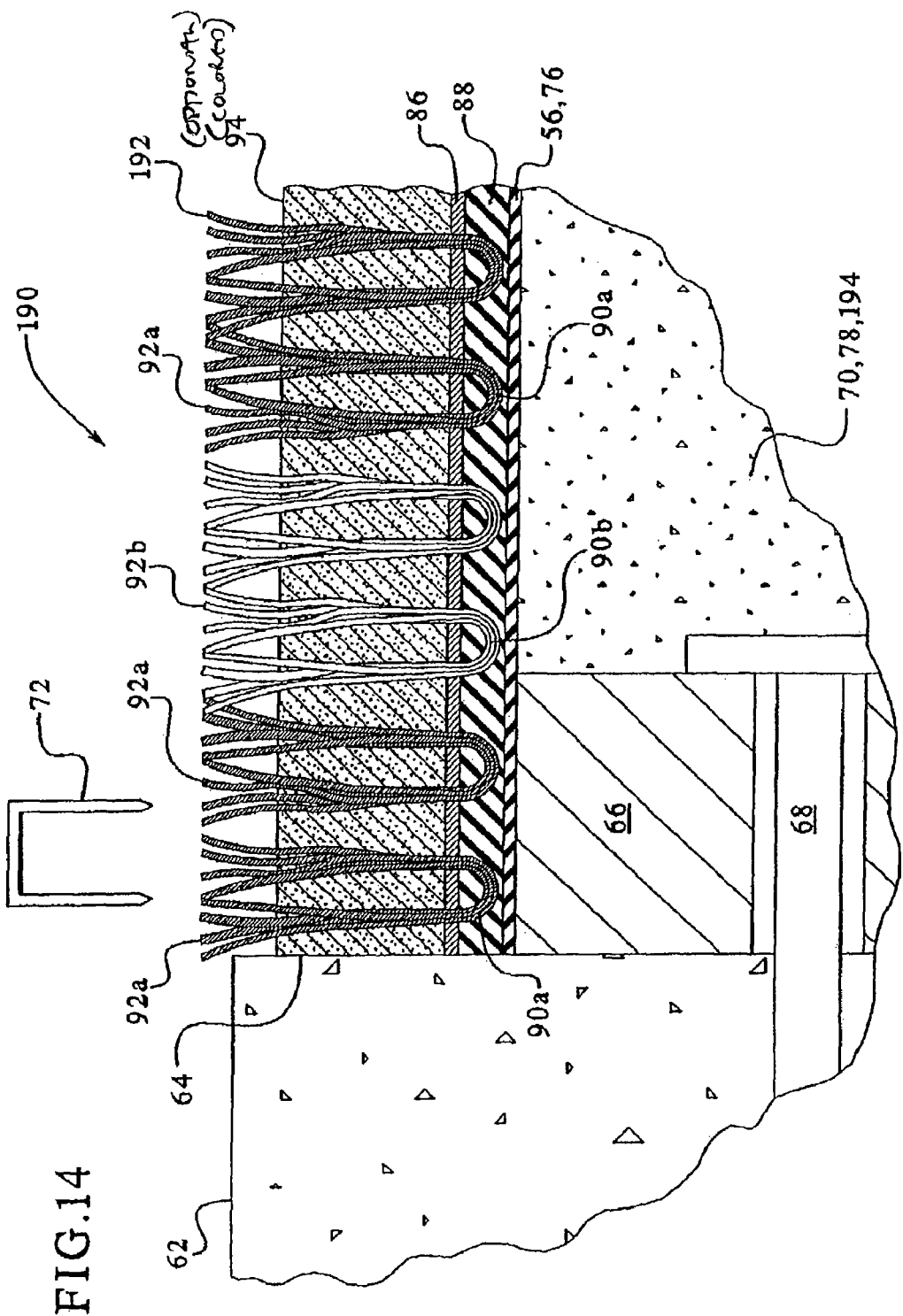
FIG. 14 is a fragmentary cross-sectional view, taken substantially along line XIV-XIV of FIG. 2, of one embodiment of the artificial turf system of the present disclosure illustrating an airport runway section adjacent to an artificial turf surface having multi-colored fibers or strands.

Referring now to FIG. 14, one embodiment of the airport marking system 190 of the present disclosure is illustrated. The airport marking system 190 includes a section of multi-colored or multi-pigmented artificial or synthetic turf 192, adjacent to a section of an airport runway/taxiway top surface 62 and side wall 64. The turf system 190 is adaptable to incorporate the turf 80 or the repelling turf 170, as discussed above. The multicolored or multi-pigmented turf 192 includes a plurality of different colored fibers 90a and 90b tufted or stitched into a primary backing 86 and coated with a secondary backing 88 in one embodiment. The multi-pigmented turf is formed on a conventional multi-yarn carpet tufting or stitching machine in one embodiment. The conventional carpet stitching machine can employ a high-low technique or a pattern technique to produce the different colored fibers 90a and 90b of the multi-pigmented turf 192.

The different colored fibers 90a and 90b are fribulated or otherwise separated to form separate grass-like strands 92a and 92b of different color, respectively. Although not illustrated, the multi-pigmented turf 192 alternatively includes one or more repelling fibers 172, which contains one or more stiff plastic fibers 174 as described above. The repelling fibers 172, including the stiff plastic fibers 174, have different colors based on their location in the multi-pigmented turf 192. A layer of suitable infill 94 is then placed between the grass-like strands 92a and 92b for stability and proper water drainage. In this illustration, either fiber 90a or 90b can be the base fiber, e.g., green, or the marking fiber, i.e., defining an airport marking. In one alternative embodiment, the infill layer 94, or a portion thereof, is colored instead of or in addition to the marking fiber. The colored infill layer 94, or portion thereof, can be the same color as the marking fibers or base fibers or can be a different color than both. The colored infill can alternatively be a different shade of one of the colors of the base and/or marking fibers. The infill layer can be of multiple different colors. The colored infill is in one embodiment dyed or otherwise colored sand.

The airport marking system 190 includes the base 70, the arrester base 78 or any other base 194 desired by the airport operators as discussed above, which includes dirt, sand, gravel, concrete, natural grass, brick or stone in a natural or compacted condition or any combination thereof in a natural or compacted condition. That is, the multicolored artificial turf 192 of the present disclosure may also be installed with the base 194 in airport areas not requiring either of the safety bases 70 or 78 as they are described above. The airport marking system 190 is adaptable to employ either the weed barrier 56 or the waterproof membrane 76 beneath the turf 192, as described above.

For sections of multi-pigmented turf installed adjacent to runways and taxiways, the multi-pigmented turf system 190 includes the composite stud 66 mastiqued and bolted to the runway side wall 64 via the ramsets 68, as described above. The multi-pigmented turf system 190 includes inserting the one inch (2.54 mm) staples 72 and the pinning devices 74 (not illustrated) as well as applying the glue as disclosed above to hold the turf in place. Each of these mounting devices enables snow removal from the multicolored turf 192, so that the airport markings of the system are visible. The multi-pigmented turf system 190 is adaptable to withstand the weight of a snow plow driving over the turf. Although the multi-pigmented turf system 190, as well as the other systems 50, 110 and 160 disclosed herein, can likely withstand the shearing force of the snow plow, another method of snow removal is contemplated.

Unlike natural grass, the artificial turf of the present disclosure withstands melting agents such as rock salt, calcium chloride and airplane deicing fluid. One method for removing snow from areas that the airport operators wish to have visible or accessible includes: (i) plowing or snow blowing a portion of the snow, leaving a layer of snow between a fraction of an inch (less than 2.5 cm) to several inches (several centimeters); and (ii) spraying or applying deicing fluid, rock salt, calcium chloride or other suitable snow melting agent on the remaining layer to melt the remainder of the snow.

The different colored fibers 90a and 90b of the multi-pigmented system 190 include a plurality of a first colored strands 92a adjacent to a plurality of second colored strands 92b. The first colored strands 92a and second colored strands 92b represent a multi-pigmented turf 192 having two different colors, e.g., a base color and a marking color, however, the multi-pigmented turf 192 includes having any number of desired pigments or colors. The embodiment of FIG. 14 illustrates that the present disclosure achieves a visual differentiation by placing fibers of different colors adjacent to each other and in one embodiment by placing rows of fibers of different colors adjacent to each other. Other forms of visually differentiating a marking fiber from a base fiber include providing different fiber heights, different fiber grains or different fiber fribulations or separations.

The multi-pigmented turf 192 includes a tufted or stitched plurality of one color fiber 90a adjacent to a tufted or stitched plurality of a second color fiber 90b, so that the color differentiation is readily discernable. For illustration purposes, FIG. 14 includes two adjacent first colored fibers 90a on either side of two adjacent second colored fibers 90b. The multi-pigmented turf 192 may include a first colored artificial fiber 90a and one or more different colored artificial fibers adjacent to two sides of the first colored fiber 90a (e.g., 90b/90a/90b or 90b/90b/90a/90b/90b, 90b/90a/90c or 90b/90b/90a/90c/90c). The multi-pigmented turf 192 may include a plurality of adjacent first colored artificial fibers 90a and one or more different colored artificial fiber adjacent to two sides of the first colored fibers 90a (e.g., 90b/90a/90a/90b or 90b/90b/90a/90a/90b/90b, 90b/90a/90a/90c or 90b/90b/90a/90a/90c/90c).

Figure 15:
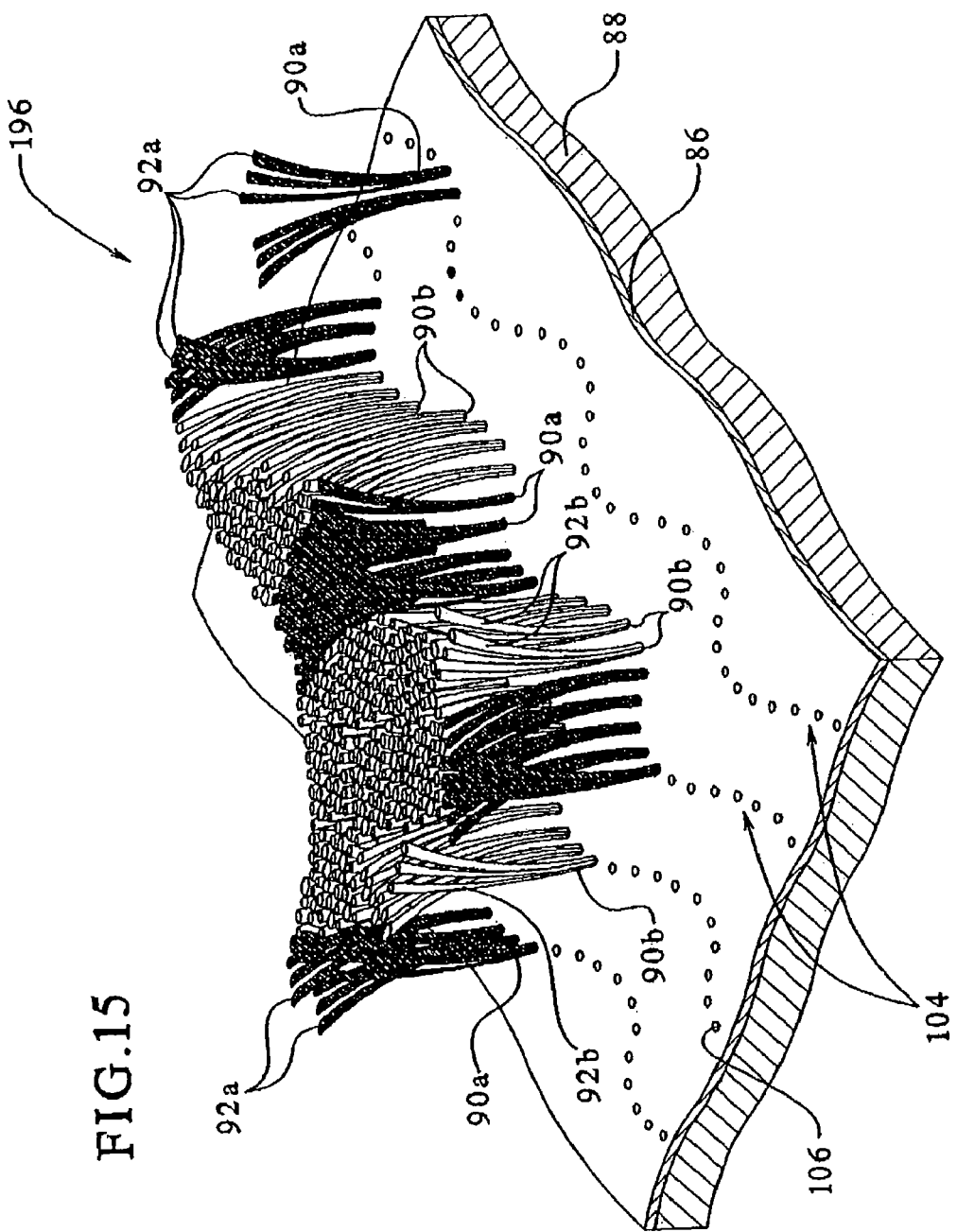
FIG. 15 is a fragmentary perspective view of one embodiment of artificial or synthetic turf having marking fibers or strands, wherein a section of the turf is cutaway to illustrate a plurality of rows of multi-pigmented tufted fibers.

The present disclosure contemplates three separate methods by which the multi-pigmented artificial turf 192 of the multi-pigmented system 190 is produced. Referring now to FIG. 15, the first method includes employing known multi-yarn tufting and stitching machines and methods to form a multi-pigmented turf segment 196 having a plurality of multi-pigmented polypropylene fibers of the desired denier. A number of the fibers are cutaway from their tuft or stitch holes 106 for purposes of illustration. The multi-pigmented fibers 90a and 90b are selectively, through known methods of control and control devices, tufted or stitched via multiple needles into the primary backing 86 and coated by a secondary backing 88 in one embodiment. The fibers 90a and 90b are then slit or fribulated to form grass-like strands 92a and 92b of varying color or pigment.

The rows 104 of tuft or stitch holes 106 include being curved or serpentine (as illustrated) or alternatively straight (not illustrated). When tufting or stitching the multi-pigmented fibers 90a and 90b, etc., the multicolored fibers are dyed to their desired color and loaded as spools of yarn onto the known carpet machines. The dyes include fluorescent dyes and one or more or all of the colors, i.e., the base color or the marking colors, of the segment 196 are adaptable to be fluorescent. It should be appreciated from FIG. 15 that different shapes, objects, patterns, characters or designs, having two or more pigments, i.e., a base color and one or more marking colors, are achieved by varying pigments in the same row 104 as well as varying pigments in different or adjacent rows 104.

Figure 16:
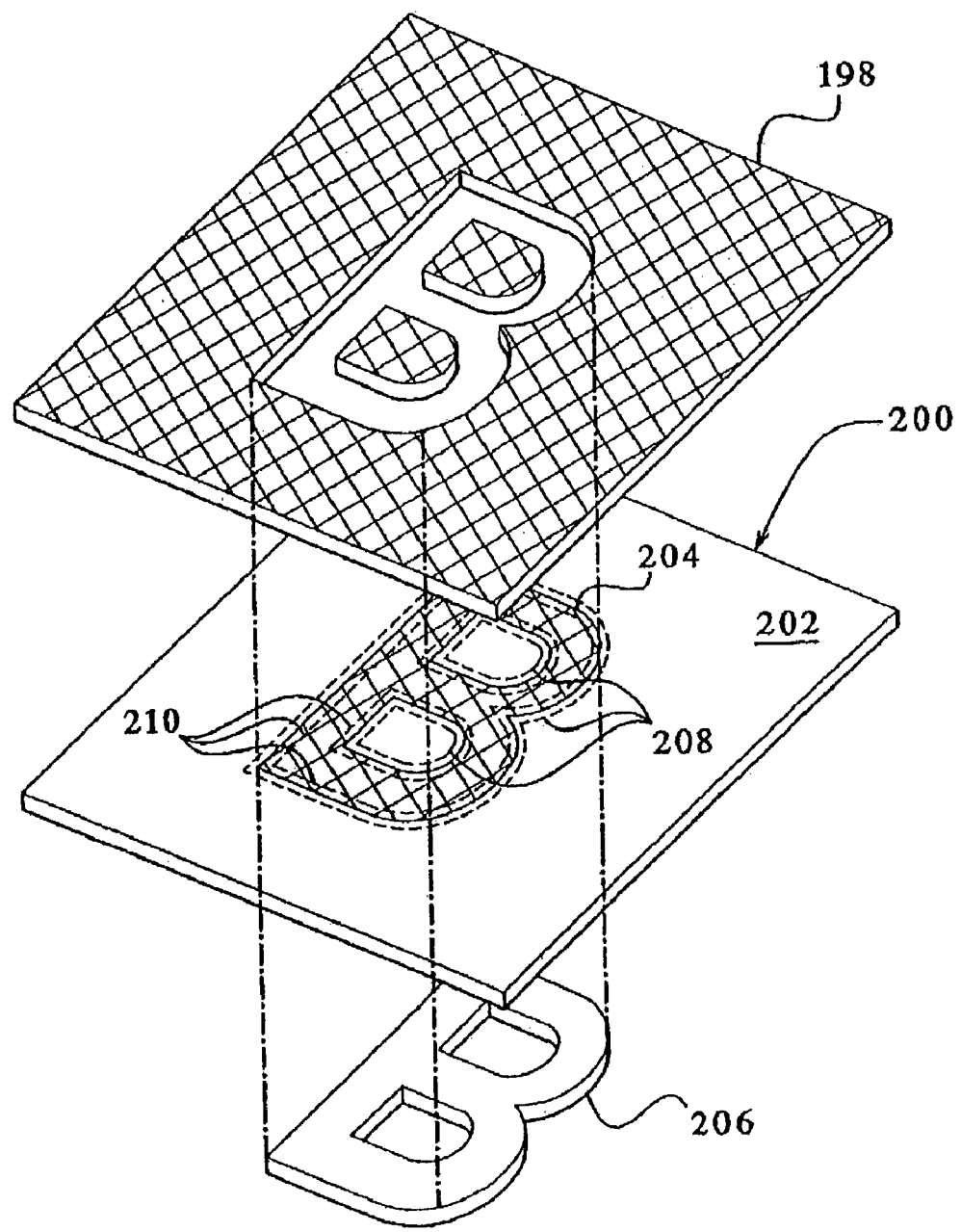
FIG. 16 is a schematic perspective view of a plurality of differently pigmented turf sections illustrating a cut and stitch method of producing a multi-pigmented turf segment.

Referring now to FIG. 16, a schematic perspective view of a plurality of turf sections 198 and 202 illustrates a second method by which a multi-pigmented artificial turf segment 200 of the multi-pigmented system 190 is produced. Initially, the turf section 198 is produced having a first, e.g., marking colored fiber, and the turf section 202 is produced having a second, e.g., base colored fiber. The letter "B" cutout 204 is cut or stamped from the first colored or marking section 198. The letter "B" cutout 206 is also cut or stamped from the second colored or base section 202.

In one implementation of this method, the first colored "B" cutout 204 is cut outwardly bigger in all directions along the dashed cut lines 208, e.g., 0.25 to 2 inches bigger (6.4 to 50.5 mm), than is the cutout 206. The first colored or marking fibers are removed from the primary and secondary backings (backings 86 and 88 in FIG. 15) of the cutout 204 in the areas constituting the overlap between the marking cutout 204 and the base cutout 206. The second colored section 202 is laid over the first colored cutout 204. The two sections are stitched together in the overlapping backing area to form the multi-pigmented turf segment 200.

In another implementation of this method, the reverse occurs. The first colored "B" cutout 204 is cut along the solid contour lines of the "B" shaped cutout 204. The second colored cutout 206 is cut inwardly smaller in all directions along the cut lines 210, e.g., 0.25 to 2 inches smaller (6.4 to 50.5 mm), than is the cutout 204. The second colored or base fibers are removed from the primary and secondary backings of the second colored turf section 202 in the areas constituting the overlap between the cutout 204 and the cutout 206. The first colored or marking cutout 204 is laid over the second colored section 202. The two sections are stitched together in the overlapping backing area to form the multi-pigmented turf segment 200.

It should be appreciated that third, fourth and fifth colored marking sections, etc., can be stitched into the multi-pigmented turf segment 200 via this method. The marking sections can all be a portion of the same marking. Alternatively, the marking sections can alone or in combination form a plurality of markings. The method allows for any number of complex shapes of any size, color or number of colors to be sewn or stitched into the base section 202, which itself is adaptable to be any color. In this method, the various different colored sections used to make the multi-pigmented turf segment 200 contain plastic or polypropylene fibers that are dyed to their desired color in one embodiment. The dyes include fluorescent dyes and one or more or all of the colors of the section multi-pigmented turf segment 200 are adaptable to be fluorescent.

Figure 17:
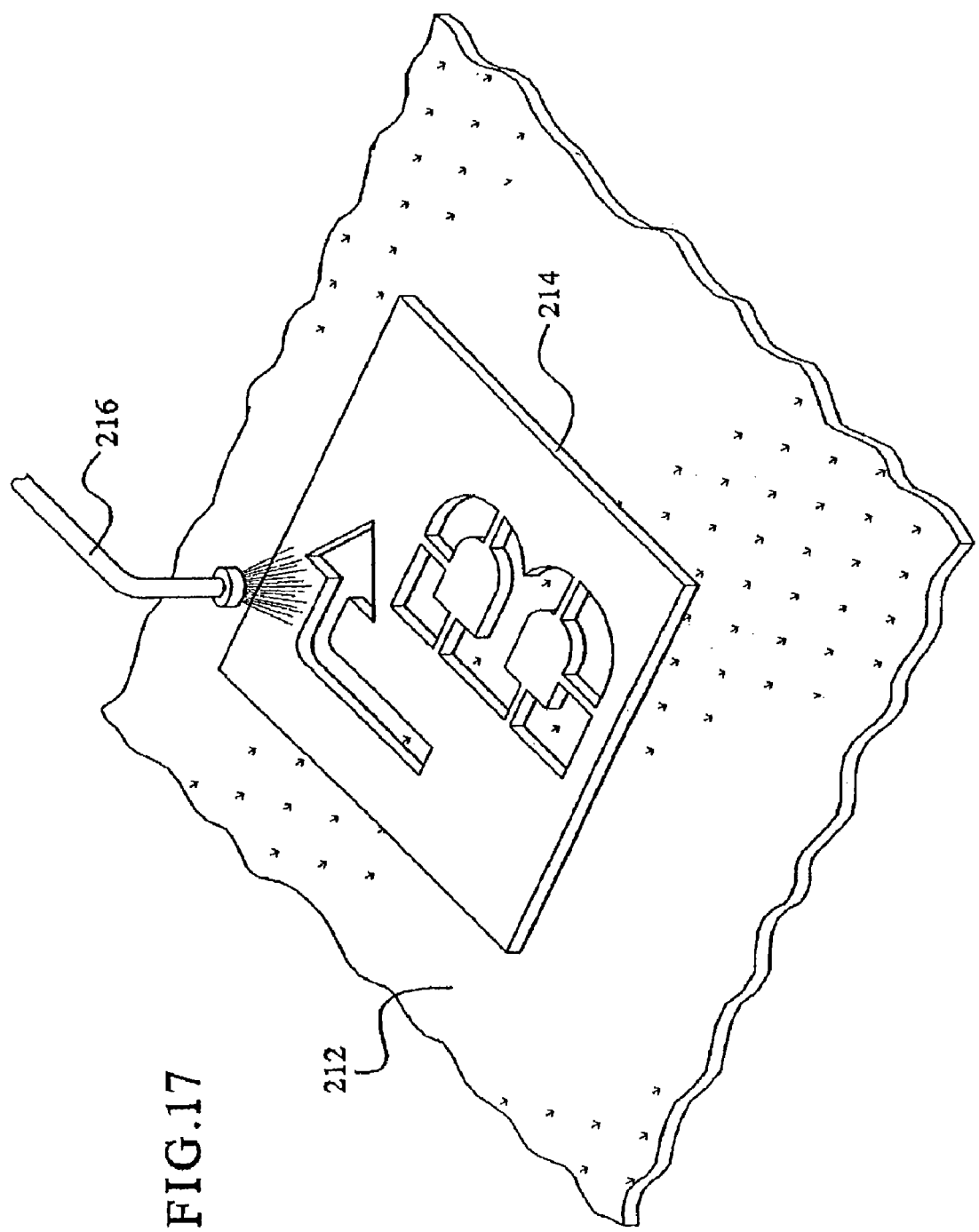
FIG. 17 is a schematic perspective view of a plurality of differently pigmented turf sections illustrating a stencil and paint method of producing a multi-pigmented turf segment.

Referring now to FIG. 17, a schematic perspective view of a turf section 212 illustrates a third method by which the multi-pigmented artificial turf 192 of the multi-pigmented system 190 is produced. A first or base colored turf section 212 has any desired base color. A plastic, wood or metal stencil 214 is laid over the base turf section 212. The method includes laying the stencil 214 on top of the artificial fibers or pressing the stencil 214 onto the turf section 212 so that the fibers to be painted a marking color protrude through the stencil 214. The stencil 214 is also adaptable to have sides (not illustrated) that extend downwardly and engage the top of the primary backing 86 (FIG. 15) of the turf section 212, to create vertical barriers that disallow paint from contacting undesired areas.

A suitable sprayer 216 sprays paint or primer or both onto desired areas of the turf section 212. A plurality of colors, including fluorescent colors, can be spayed using a single stencil 214. Using different stencils 214 and one or more different color, including fluorescent colors, for each stencil, the turf installer readily produces a multicolored turf segment of any size, complexity and having any number of colors. While paint is not suitable for natural grass; paint, on plastic or polypropylene is much more permanent. The plastic fibers do not have to be mowed, and the paint does not destroy the fibers. If the paint fades over time, the same turf section 212 can be intermittently repainted using the same stencil 214.

Multi-Pigmented Turf Areas

Figure 18:
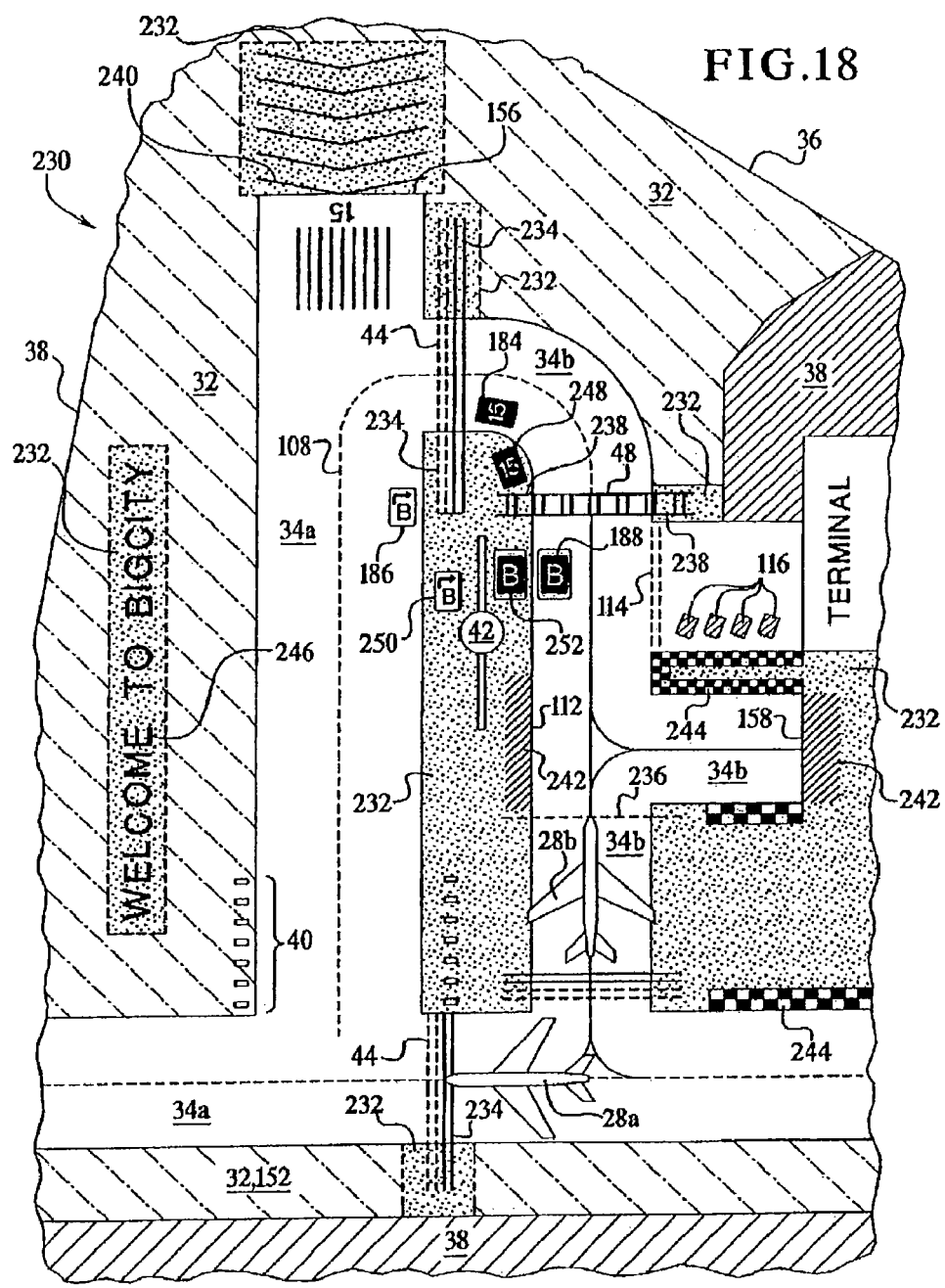
FIG. 18 is a fragmentary top plan view of an airport or airfield, illustrating sections of airport runways, taxiways and segments of adjacent artificial turf having marking fibers or strands which define safety indicia or markings.

Referring now to FIG. 18, a top plan view of an airport or airfield 230 includes one or more areas of synthetic turf 32, one or more areas 152 of artificial turf having an arrester base (which can also be multi-pigmented) and one or more segments 232 of artificial turf employing the multi-pigmented turf system 190 via the methods of manufacture discussed above with respect to FIGS. 14 through 17. The multi-pigmented turf segments 232 are generally adjacent to or near runways 34a and taxiways 34b or sections thereof as illustrated in FIG. 18, but may be substantially spaced away from such runways or taxiways.

The present disclosure includes the multi-pigmented artificial turf segments 232 touching or abutting or substantially touching or abutting the runways 34a or taxiways 34b. The present disclosure includes the multi-pigmented turf segments 232 residing anywhere on the premises of the airport or airfield and in safety areas in one embodiment. In one embodiment, the multi-pigmented turf segments 232 include touching or abutting both sides of a runway 34a or taxiway 34b and extending outward to the surrounding safety areas, as desired by the airport operator, builder or maintainer.

The multi-pigmented turf segments 232 are adapted to match any shape or contour created by the runways 34a or taxiways 34b, airport fences 36, natural grass areas 38 or by any other roads, driveways, accessways, pathways, trees, bushes, buildings, terminals, garages, hangers (not illustrated), or any other structures associated with an airport or airfield. The multi-pigmented turf segments 232 are likewise adaptable to accommodate any interior obstruction, such as any airport lighting 40, e.g., runway or approach lights, interior natural grass sections 38, drains or drainage ways 42, access roads, buildings, garages, hangers (not illustrated), or any other structures or apparatuses associated with an airport or airfield.

The present disclosure includes any multi-pigmented turf segment 232 extending any distance transversely or perpendicularly from the length of a runway 34a or taxiway 34b. The present disclosure also includes installing the multi-pigmented turf segments 232 on one or more of the runway ends 156 or taxiway ends 158. The base color or colors of the multicolored turf segments 232 extend a workable distance (e.g., two to three feet, 0.61 to 0.91 m) past their airport markings to enable the turf installers to fix the turf to its base and to other turf sections without damaging the marking.

Many airports contain parallel runways 34a or taxiways 34b. In such cases, the present disclosure includes installing a multi-pigmented turf segment 232 having an extended section of the natural base color, i.e., natural grass or green. As described above in connection with FIGS. 14 and 15, the multicolored turf segment 232 includes the base or natural turf color having any area of extension away from the other colors, i.e., the marking fibers. The segment 232 further includes the base color being any desired by the airport operator and is not limited to being green. The segment is also adaptable to have a plurality of base colors.

The multi-pigmented turf segments 232 also include a plurality of airport markings and symbols, which are normally either pavement markings or markings displayed by airport signs. In general, runway markings are white, while taxiway markings are yellow. Airport signs are typically either red and white or black and yellow. In many instances, information on airport signs, including airport boundary signs, is also painted on the airport runway 34a or taxiway 34b pavement. The present disclosure contemplates enhancing airport markings by extending the pavement markings and permanently displaying additional markings or signage on the multi-pigmented turf segments 232. It should be appreciated from the discussion in connection with FIGS. 14 and 15 that the synthetic markings are permanent, durable and adapted to be plowed, vacuumed, power washed, etc.

Runway and Taxiway Holding Position Markings

As illustrated in FIG. 18, one marking that the multicolored turf segments 232 include is a runway holding position marking 234. It is critical that pilots observe and properly obey the pavement runway holding position markings 44, which airports normally paint onto a runway 34a or taxiway 34b just prior to or adjacent to an intersecting runway 34a. The synthetic runway position markings 234 match the like pavement holding and position markings 44 in one embodiment and therefore consist of four parallel lines, two solid and two dashed.

As illustrated by the airplane 28a, which is in a proper hold position, pilots should stop on the solid-line side of the pavement runway position markings 44. A pilot should not cross the pavement runway position markings 44 without tower control clearance. The pavement runway holding position markings 44 also designate when an aircraft has properly left or cleared the runway. An aircraft is not clear of the runway until all parts of the aircraft cross the pavement runway position markings 44. Airports also include runway position signs (not illustrated) having the same four lines, two solid and two dashed. Pilots exiting the runway observe these signs to properly exit the runway.

The multi-pigmented turf segments 232 are positioned so that the runway holding position markings 234 are adjacent to the pavement markings 44, which extend the pavement runway holding position markings 44 in one direction onto the multicolored turf segment 232 (e.g., to the left), or which extend the pavement markings 44 in both directions (e.g., to the left and to the right). The multi-pigmented turf segments 232 include the runway position markings 234 having any length and thereby extending the pavement markings 44 any distance desired by the airport operators. Depending upon how the artificial turf is rolled out, i.e., lengthwise along the runway 34a or taxiway 34b or perpendicular to such, the most economical length of the synthetic runway position markings 234 may be the width of a turf roll, e.g., 12 or 15 feet (3.65 to 4.57 m) or a multiple thereof.

The thickness and color of each of the lines of the synthetic runway position markings 234 and the respective spacing apart of the lines are the same as the like pavement position markings 44. Prefabricated rolls of artificial or synthetic turf in one embodiment have one foot (30.5 cm) thick lines that are spaced apart ½ foot (15.25 cm), however, different airports may desire different line widths and spacing, in which case a synthetic turf segment 232 having a customized runway position marking 234 is provided. The color of the runway position markings 234 is white or yellow in various embodiments depending upon whether the multicolored turf segment 232 abuts a runway 34a or taxiway 34b, respectively.

Extending the pavement markings 44 via the synthetic runway position markings 234 provides a plurality of benefits. Depending on the size of the aircraft, how high off the ground a pilot may be sitting and the current condition of the painted line on the runway/taxiway pavement, a pilot may not readily see the pavement runway position marking 44. A pilot's line of sight over the nose of the aircraft to align the nose to an invisible plane perpendicular to the aircraft is limited. Pilots, however, are readily able to see to their left or right. Thus, they can more accurately align the aircraft with the synthetic runway position marking 234 extending perpendicularly or transversely from the length of the runway 34a or taxiway 34b via a multi-pigmented turf segment 232.

Extending the pavement runway position markings 44 via the synthetic runway position markings 234, transversely or perpendicularly from the length of the runway 34a or taxiway 34b, enhances the pilot's ability to see the airport marking because the pilot can readily see in these directions. Furthermore, the permanent nature of the multicolored turf segments 232 having dyed white or yellow holding position fibers in stark contrast to the surrounding base green fibers further enhances the pilot's ability to see the synthetic runway position markings 234. In contrast, the usually gray pavement does not contrast the pavement markings 44 as well. Further, the paint of the pavement marking 44 may become worn or chipped.

Extending the pavement markings 44 via the synthetic runway position markings 234, transversely or perpendicularly from the length of the runway 34a or taxiway 34b also enhances the pilot's ability to see the airport marking when exiting a runway 34a because the pilot sees the synthetic holding position marking 234 on the multi-pigmented turf segments 232 before reaching the runway 34a or taxiway 34b onto which the pilot is to turn. The synthetic marking 234 is an additional, permanent, readily seen and well-delineated signal for the pilot exiting a runway 34a.

As illustrated in FIG. 18, another marking that the multicolored turf segments 232 include is a taxiway holding position marking 236. Pilots and ground crew drivers must observe and properly obey pavement taxiway holding position markings 46, which airports normally paint onto a runway 34a or taxiway 34b just prior to an intersecting taxiway 34b. The pavement taxiway position marking 46 consists of a single dashed line. As illustrated by the airplane 28b, which is in a proper hold position, pilots should stop before the dashed line of the pavement taxiway position marking 46 and should not cross without tower control clearance.

The present disclosure includes permanently extending the pavement taxiway position markings 46 by placing multi-pigmented turf segments 232 having synthetic taxiway holding position markings 236 adjacent to the pavement markings 46. The multicolored turf segments 232 position the taxiway position markings 236 adjacent to the like pavement markings 46, which extend the pavement taxiway position markings 46 in one direction onto the multi-pigmented turf segment 232 (e.g., to the left) or which extend the pavement markings 46 in both directions (e.g., to the left and to the right).

The multicolored turf segments 232 include the taxiway position markings 236 having any length and thereby extending the pavement markings 46 any distance desired by the airport operators. Depending upon how the artificial turf is rolled out, i.e., lengthwise along the runway 34a or taxiway 34b or perpendicular to such, the most economical length of the synthetic taxiway position markings 236 may be the width of a turf roll, e.g., 12 or 15 feet (3.65 to 4.57 m) or a multiple thereof.

The thickness and color of the dashed lines of the synthetic taxiway position markings 236 and the distance between the dashes are the same as the like pavement taxiway position markings 46 in one embodiment. Prefabricated rolls of artificial or synthetic turf in one embodiment have one foot (30.5 cm) thick lines, however, different airports may desire different line widths and dash spacing, in which case a synthetic turf segment 232 having a customized taxiway position marking 236 is provided.

The color of the taxiway position markings 236 is white or yellow in one embodiment depending upon whether the multi-pigmented turf segment 232 abuts a runway 34a or taxiway 34b, respectively. The benefits of extending the pavement taxiway position markings 46 transversely or perpendicularly from the length of the runway 34a or taxiway 34b onto the multicolored turf segments 232, via the taxiway position markings 236, are the same as described for extending the pavement runway position markings 44.

ILS Critical Area Boundary Markings

As illustrated in FIG. 18, a further marking that the multi-pigmented turf segments 232 include is an ILS boundary marking 238. It is critical that pilots observe and properly obey the pavement instrument landing system ("ILS") boundary markings 48, which airports normally paint onto a runway 34a or taxiway 34b to mark the boundary of an ILS critical area. Airplanes must taxi beyond or out of the ILS critical area or past the pavement boundary markings 48 or stop short of the pavement boundary markings 48 (depending upon the direction of travel) when the airport is using the instrument landing system. An aircraft taxiing into an ILS critical area can interfere with the ILS signal to approaching aircraft. The pavement ILS boundary markings 48 consist of two longer parallel lines and a plurality of shorter, evenly spaced apart, perpendicular line pairs, as illustrated in FIG. 18.

The present disclosure includes permanently extending the pavement ILS boundary markings 48 by placing multicolored turf segments 232 having synthetic ILS boundary markings 238 adjacent to the pavement markings 48. The multi-pigmented turf segments 232 position the ILS boundary markings 238 laterally adjacent to the pavement markings 48, which extend the like pavement ILS boundary markings 48 in one direction onto the multicolored turf segment 232 (e.g., to the left) or which extend the pavement markings 48 in both directions (e.g., to the left and to the right).

The multi-pigmented turf segments 232 include the ILS boundary markings 238 having any length and thereby extending the pavement markings 48 any distance desired by the airport operators. Depending upon how the artificial turf is rolled out, i.e., lengthwise along the runway 34a or taxiway 34b or perpendicular to such, the most economical length of the synthetic ILS boundary markings 238 may be the width of a turf roll, e.g., 12 or 15 feet (3.65 to 4.57 m) or a multiple thereof.

The thickness and color of the parallel and perpendicular lines of the synthetic ILS boundary markings 238 and the distances between the parallel lines and the perpendicular lines are the same as the like pavement ILS boundary markings 48 in one embodiment. Prefabricated rolls of artificial or synthetic turf in one embodiment have one foot (30.5 cm) thick lines, however, different airports may desire different line widths and spacing, in which case a synthetic turf segment 232 having a customized ILS boundary marking 238 is provided.

The color of the ILS boundary markings 238 is white or yellow depending upon whether the multicolored turf segment 232 abuts a runway 34a or taxiway 34b, respectively. The benefits of extending the paved ILS boundary markings 48 transversely or perpendicularly from the length of the runway 34a or taxiway 34b onto the multi-pigmented turf segments 232, via the ILS boundary markings 238, are the same as described for extending the pavement runway position markings 44.

Runway and Taxiway End Markings

Airports typically place yellow chevron markings at a runway's end to designate an area that is unusable for landing, takeoff and taxiing. Referring to FIG. 18, one or more multicolored turf segments 232 provide one or a plurality of yellow synthetic chevron markings 240 in one embodiment. The multi-pigmented turf segment 232 having the synthetic chevron markings 240 abuts a runway end 156. The present disclosure includes providing prefabricated multicolored turf segments 232 having a predetermined number of chevron markings 240 of a predetermined size. The airport operator, alternatively, specifies the number and size of chevron markings 240 for the turf area 32, whereby a custom multi-pigmented turf segment 232 having the specified chevron markings 240 is provided.

Although the chevron markings 240 include having any customized thickness, in one embodiment they are 1 foot (30.5 cm) thick. A chevron marking 240 includes individually two orthogonal or otherwise angled lines (e.g., 45 degrees from runway centerline 108) having ends that meet substantially along the dashed centerline 108 of the runway 34a and ends that terminate substantially along an extension of the runway edge lines. The chevron markings 240 are evenly spaced apart individually so as to appear to form a series of arrows pointing toward the safe landing, take-off and taxiing area of the runway 34a.

The multicolored turf segment 232 having the chevron markings 240 also includes having an arrester bed base 78 as discussed above. As disclosed in connection with FIGS. 10 and 11, the arrester base 78 is also installed at either or both ends 156 of a runway 34a for the purpose of absorbing the energy and safely slowing a runaway aircraft. The present disclosure includes the multicolored turf segment 232 displaying the above described chevron markings 240 and having an arrester bed base 78, wherein the chevron markings extend from the runway end 156 for some or all of the distance of the arrester bed base 78, which is below the artificial multi-pigmented turf segment 232. The arrester base 78 in one embodiment extends under the entire multicolored turf segment 232 and continues underneath an arrester bed area 152 for a predetermined distance.

It should be appreciated that the multi-pigmented turf segments 232 are adaptable for any marking subsequently developed by the industry or set by regulation for standardized use with the arrester bed system 160 discussed in connection with FIG. 11 or other arrester bed systems adapted to slow the motion of a runaway aircraft. Furthermore, the multicolored turf segments 232 also include having the above described chevron markings 240 in non-arrester bed areas, i.e., in areas not having an arrester bed base 78.

Airports typically place white end markings at a taxiway end to designate that a taxiway does not extend into the marked area and that the area is unusable for taxiing. Referring to FIG. 18, one or more multicolored turf segments 232 include one or a plurality of synthetic taxiway end markings 242, which are white in one embodiment. The synthetic taxiway end markings 242 designate actual taxiway ends 158 as well as any area, such as the multi-pigmented turf segment 232 abutting the taxiway side 112 at the intersection of two taxiways 34*b*, in which the airport operator desires to indicate that a taxiway 34*b* does not continue. In FIG. 18, the taxiway end markings 242 on the multicolored turf segment 232 abutting the side 112 indicate that the taxiway 34*b* does not continue through the intersection. The taxiway end markings 242 on the multi-pigmented turf segment 232 abutting the taxiway end 158 indicate that the taxiway 34*b* physically ends.

The airport operator determines the number of synthetic taxiway end markings 242 for the multicolored turf segment 232 to permanently display. The taxiway end markings 242 include having any desired thickness and length and are one foot (30.5 cm) thick in one embodiment. The taxiway end markings 242 include collectively a plurality of parallel markings, which are at a predetermined angle, e.g., forty-five degrees, from the taxiway end 158 or an area of a taxiway side 112 that the airport operator wishes to mark. The taxiway end markings 242 are evenly spaced apart so as to collectively appear to form a blocked-off area of multi-pigmented turf 232, wherein the taxiway end markings 242 are collectively substantially as wide or wider than the width of the taxiway 34*b*.

Extending synthetic chevron markings 240 and taxiway end markings 242 transversely or perpendicularly from the runway end 156 or from the taxiway end 158 or side 112 via the multicolored turf segments 232 enhance a pilot's or ground crew's ability to navigate safely throughout the airport 230. Until now, attempting to permanently display the chevron markings and taxiway end markings on natural grass would be futile. Moreover, the permanent nature of the multi-pigmented artificial turf segments 232 having dyed yellow or white fibers for the chevron markings 240 or the taxiway end markings 242, respectfully, in stark contrast to the surrounding base green fibers, further enhances the pilot's and ground crew's ability to see the synthetic chevron markings 240 or end markings 242 in comparison with similar pavement markings.

No Parking Area and Ground Message Markings

Airports typically display double dashed taxiway edge lines 114 to designate a portion of the edge of a taxiway 34*b* in which adjoining pavement is available for taxi. FIG. 18 illustrates that in these high traffic areas and in other areas of the airport 30 that are susceptible to a large flow of airplane taxiing as well the movement ground vehicles 116, the multicolored turf segments 232 have synthetic no parking area markings 244. The no parking area markings 244 designate areas in which an airplane's wing or tail may clip or hit a parked ground vehicle 116 or other aircraft. The synthetic no parking area markings 244 also designate areas in which it is vital to keep the area free and clear for airplanes 28*a* and 28*b* and/or ground vehicles 116.

As illustrated in FIG. 18, the synthetic no parking area markings 244 in one embodiment include a plurality of checkered rows of multi-pigmented artificial turf. In one embodiment the checkers comprise a row of one foot by one foot (30.5 cm by 30.5 cm) square areas of alternating color next to a similar row having the colors reversed. The alternating colors include red and white, yellow and black, white and black, yellow and green, white and green or any other combination of these colors or other colors desired by the airport operator. The squares include being any size and the checkers include any number of alternating rows, however, the squares are big enough and there are enough rows for a pilot or driver to readily see the area from at least 20 to 50 feet (6.1 m to 15.25 m) away. In one embodiment, the checkered rows extend a perpendicular distance of three to thirty feet (0.91 m to 9.1 m) from the edge or end of a runway 34*a*, taxiway 34*b* or other pavement area of the airport 230.

It should be appreciated that the synthetic no parking area markings 244 are adaptable to include other markings or indicia subsequently developed by the industry or set by regulation, wherein the industry developed or regulated markings or indicia extend perpendicularly from a paved area onto the multicolored artificial turf segments 232 for a predetermined distance. Moreover, the synthetic no parking area markings 244 are adaptable to include a customized design by an airport operator or a particular pattern used by an airport.

FIG. 18 further illustrates that the multi-pigmented turf segments 232 include having permanent character markings 246, whereby the airport 30 communicates, in writing, with pilots, passengers, the ground crew, etc. The character markings 246 include English, Spanish or French lettering or any lettering of any other language desired by the airport operators. The character markings 246 also include Arabic or Roman numerals, punctuation or any other characters found on a standard typewriter. The character markings 246 further include any type of indicia or logo, such as an advertising indicia or logo.

The character markings 246 include being any size and in one embodiment are large enough to be seen from ten miles (16.1 km). The multicolored turf segments 232 include character markings 246 that welcome air passengers to the city to which the airport belongs or services. Other character markings 246 designate the name of the airport, the number of a runway or other landing instruction desired by the airport operator. Still other character markings 246 provide advertising. The character markings 246 in one embodiment include being any color and are white, yellow or other marking color that contrasts well with the green base color of the multi-pigmented turf segments 232.

Holding Position, Directional and Location Markings

As seen in FIG. 18, airports typically display one or more pavement painted holding position signals 184, directional signals 186 and/or location signals 188 on the paved runways 34*a* or taxiways 34*b*. The pavement holding position signals 184 direct an aircraft to hold short of a particular runway, while on a taxiway. The pavement directional signals 186 inform the pilot of the direction and designation of an upcoming intersecting runway 34*a* or taxiway 34*b*, an upcoming intersection of a plurality of runways 34*a* or taxiways 34*b* or an upcoming intersection of a combination of runways 34*a* and taxiways 34*b*. The location signals 188 identify the current runway/taxiway on which the aircraft is located.

As illustrated in FIG. 18, the airport markings of the multi-pigmented turf segments 232 include having one or more synthetic holding position signals 248, one or more synthetic directional signals 250 and/or one or more synthetic location signals 252. In accordance with known airport markings, both the synthetic holding position signals 248 and the synthetic location signals 252 include a darker background, e.g., black or red, and lighter lettering or numbering, e.g., white in one embodiment. The synthetic directional signals 250 include a lighter background, e.g., white or yellow and a darker lettering or numbering, e.g., black in one embodiment. The multicolored artificial turf segments 232 provide these synthetic markings in a smaller size, same size or larger size than their pavement counterparts.

The synthetic signals 248, 250 and 252 include being in lieu of the paved surface signals 184, 186 and 188, respectively, or in addition to the paved surface signals (especially in areas that accumulate snow). If in lieu of the pavement surface signals, 184, 186 and 188, the locations of the synthetic holding position signals 248, the directional signals 250 and the location signals 252, respectively, are at or near the location of the runway 34a or taxiway 34b on which the pavement markings would appear in one embodiment. If in addition to pavement surface signals, the locations of the synthetic signals 248, 250 and 252 are near or a slight distance away from the location of the runway 34a or taxiway 34b on which the pavement markings appear in one embodiment.

The latter scenario enhances the paved airport signals by providing an additional and in one embodiment earlier communication or direction to the pilot. Even when in lieu of the pavement signals, however, the artificial turf holding position signals 248, the directional signals 250 and the location signals 252 will likely appear more visible and wear better over time than would the same pavement signals.

Figure 19:
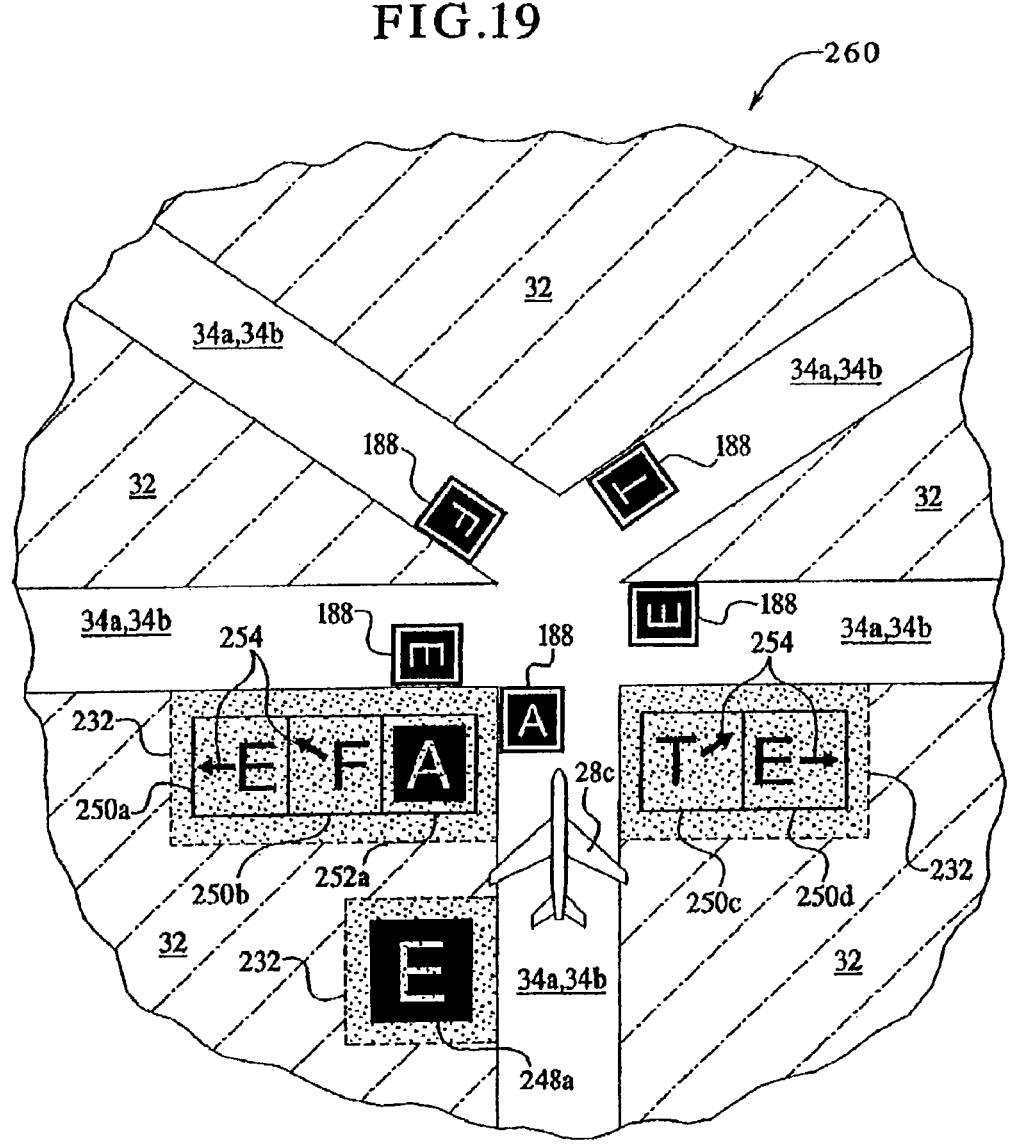
FIG. 19 is a fragmentary top plan view of an airport or airfield, illustrating sections of airport runways, taxiways and segments of adjacent artificial turf having marking fibers or strands which define holding position, direction and location signals.

Referring now FIG. 19, a top plan view of an airport or airfield 260 includes areas of artificial turf 32 and multi-pigmented turf segments 232, which have various synthetic safety markings or indicia of the present disclosure. Both the turf areas 32 and the multicolored turf segments 232 are in one embodiment adjacent to and extend from the runways 34a and taxiways 34b or sections thereof. Each of the pavement location signals 188, "A," "E," "F" and "T" designates a runway 34a or a taxiway 34b for the purposes of this illustration. The airplane or aircraft 28c currently resides on the runway/taxiway "A" and must make a turn onto one of the other runways or taxiways "E," "F" or "T." For purposes of illustration, only the synthetic holding position signals 248, the directional signals 250 and the location signals 252 are illustrated, although the multi-pigmented turf segments 232 include having any of the above described artificial turf markings.

The airport 260 illustrates one embodiment of the present disclosure, wherein the pilot must choose between a plurality of different runways 34a and/or taxiways 34b. In such a situation, airports typically display one or a bank of pavement or upright signs, having the indicia of the synthetic signals 250a, 250b, 250c, 250d, 248a and 252a, to direct the pilot. As illustrated in FIG. 19, the upright or pavement signs have been replaced by multicolored turf segments 232 displaying the same bank of indicia as permanent artificial turf markings.

The multi-pigmented turf segments 232 provide the synthetic directional signals 250a through 250d. The synthetic directional signals 250a through 250d include directional arrows 254 pointing in approximate alignment with their respective runways 34a or taxiways 34b relative to the pilot's perspective. The directional signals 250a through 250d also include the designation (e.g., "E," "F" or "T") of the respective runway 34a or taxiway 34b. The directional signals 250a through 250d include being as big as necessary for the pilot of the airplane 28c to easily see the synthetic markings. The directional signals otherwise follow the FAA standards as far as color and the relative sizing and spacing of the four-sided border, the directional arrows 254 and the internal lettering and/or numbering in one embodiment.

The left turn directional signals 250a and 250b include the directional arrows 254 on the left side of the marking, while the right turn directional signals 250c and 250d include the directional arrows 254 on the right side of the marking in one embodiment. Similarly, the present disclosure includes placing the left turn directional signals 250a and 250b on the left side of the runway/taxiway "A" and the right turn directional signals 250c and 250d on the right side of the runway/taxiway "A." Alternatively, the present disclosure includes placing the entire bank of directional signals 250a through 250d on either or both sides of the runway/taxiway "A." The relatively large synthetic directional signals 250a through 250d, placed to the left or right of the runway/taxiway "A," enable the pilot of the airplane 28c to easily see the location and direction of the upcoming runways 34a or taxiways 34b.

The multicolored turf segments 232 also include one or more of the synthetic holding position markings 248, such as the holding position marking 248a. The synthetic position marking 248a is as big as necessary for the pilot of aircraft 28c to easily see it. The position marking 248a otherwise follows the FAA standards as far as color and the relative sizing and spacing of the four-sided border to the internal lettering and/or numbering in one embodiment. The relatively large synthetic position signal 248a, placed to the left or right of the taxiway "A" (in this case "A" is a taxiway), enables the pilot of the airplane 28c to easily see that the pilot should hold short of a runway "E" while on the taxiway "A" and await tower control clearance.

The multi-pigmented turf segment 232 also includes one or more of the synthetic location signals 252, such as the location signal 252a. The synthetic location signal 252a is as large as necessary for the pilot of aircraft 28c to easily see it. The markings otherwise follow the FAA standards as far as color and relative sizing and spacing of the dark four-sided border, the inner lighter border and the internal lettering and/or numbering in one embodiment. The relatively large synthetic location signal 252a, placed to the left or right of the runway/taxiway "A," enables the pilot of aircraft 28c to easily see that the aircraft currently sits on the runway/taxiway "A."

Various Attachment Embodiments

Referring now to FIGS. 20 to 26, alternative embodiments for securely installing the artificial turf in and around safety areas in an airport are illustrated. Each of the figures includes common elements that have been described previously. For example, each of the embodiments illustrated in FIGS. 20 to 26 includes a section of runway 52, having a runway surface 62 and a runway side wall 64. For purposes of describing the present disclosure, the term "runway" includes both a concrete runway or taxiway alone or a concrete runway or taxiway in combination with asphalt or other type of runway shoulder. That is, it is common for commercial runways to have asphalt or petroleum based shoulder sections on either side of the main concrete section. The term runway as it used herein includes both the concrete slab and the shoulder portions or just the concrete slab if that is all that is provided. That is, other runways do not have the shoulder portions, only the concrete portion. Moreover, the present disclosure is not limited to concrete runways. The term "runway" as used herein is therefore expressly meant to include any support surface that is used by an aircraft for takeoff and landing.

Each of FIGS. 20 to 26 also includes soil 58 extending beneath and around the runway section 52. The soil 58 defines a soil surface 60 upon which the compacted base material 70 or the arrester base materials 78/162 are placed. A flow-through weed barrier 56 is placed between the base and soil top surface 60.

Each of the FIGS. 20 to 26 includes an artificial turf that is placed over the base material. The artificial turf can be turf 54 described above in connection with FIG. 5, the repelling turf 170 described above in connection with FIGS. 12 and 13, or the multi-colored or multi-pigmented turf 190 described above in connection with FIGS. 14 to 19. Any of those types of artificial turf can have, but does not have to have, a layer of infill. For example, the present disclosure expressly includes the turf 54 and 170 illustrated in FIGS. 5 and 12, respectively, having or not having the layer of infill 82, as noted by the term "optional" on FIGS. 5 and 12. Also, the multi-pigmented turf alternatively does not provide the infill layer 94 as seen in FIG. 14. When not using infill, the turf fibers (blades) can be very short, e.g., ⅛ inch to 1 inch.

Because the artificial turf systems of the present disclosure are not walked on and played on as is done with known sport turfs, the need to create a turf that is pleasant to be walked or played on is not present. To lower the cost of material and installation, the present disclosure expressly contemplates and includes the provision of artificial turf without an infill layer. Indeed, eliminating the sand infill layer reduces one very labor intensive step in the installation process.

The infill layer provides a number of benefits and therefore each of the embodiments disclosed in this specification may or may not have an infill layer. The infill helps to hold the turf down, and as illustrated in FIG. 14, infill layer 94 can be colored if desired. Further, one of the benefits of the present disclosure is sound reduction and noise abatement. The polypropylene fibers are good sound absorbers relative to natural grass blades. The sand infill is also a good sound absorber. One method expressly contemplated by the present disclosure is the reduction of noise through the provision of the artificial turf systems of the present disclosure. If desired, the polypropylene fibers can be made longer in an attempt to absorb more sound. When an airport is located close to residential dwellings, the artificial turf, including or not including an infill layer, can be used to help reduce the amount of noise that escapes the airport to the outlying residential areas.

Each of FIGS. 20 to 26 illustrates a different way to secure the artificial turf, and in particular, to secure that turf along the runway sidewall 64. Just as with the system 50 of FIG. 3, the system 110 of FIG. 7, the system 160 of FIG. 11, and the system 190 of FIG. 14, it may be necessary in FIGS. 20 to 26 to modify the sidewall 64 of the runway 52 (concrete or asphalt) to make sidewall 64 flush and suitable for abutting the installed system. In one embodiment, sidewall 64 is sawcut to make sidewall 64 flush or smooth. Such is the case when in particular member 66 is mounted to sidewall 64. It should be appreciated that only the portion of the sidewall 64 that abuts the member 66 needs to be sawcut or made flush. Therefore, the entire sidewall 64 does not need to be sawcut or otherwise made smooth. As illustrated below in FIG. 26, the present disclosure also contemplates modifying, making smooth, or sawcutting the top surface 62 of the runway 52. Asphalt shoulders typically need to be sawcut or smoothed. Concrete only runways may already be smooth enough for installing the present disclosure.

Figure 20:
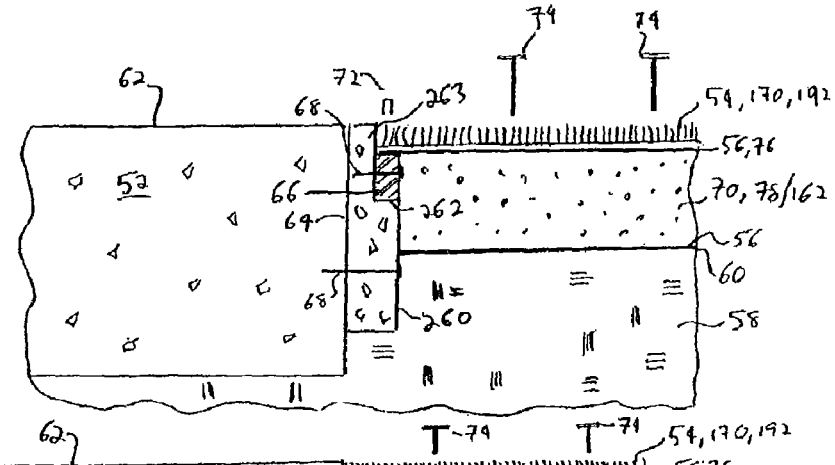

FIG. 20 illustrates an alternative embodiment, wherein any of the systems of the present disclosure can be installed without necessarily having to sawcut or make smooth the sidewall 64 of the runway 52. In certain applications, it may be too cold or otherwise unsuitable to cut or modify the runway 52. In certain applications, an airport may desire that the runway not be modified. Otherwise, certain sections of the runway may not be suited for being cut or otherwise modified. In any of those situations, the present disclosure can employ an anchor 260 to which the artificial turf 54, 170 or 192 is secured.

In one embodiment, a trench is dug into soil 58 beneath surface 60 and wooden planks or other type of barrier is constructed to form a mold into which concrete can be poured and hardened. The hardened concrete anchor 260 is either formed with a side suitable to abut the composite member 66 or is otherwise sawcut or smoothed out after formation. In an alternative embodiment, anchor 260 is premade and placed next to the runway 52.

In still a further embodiment, a plurality of poured or prefabricated anchors 160 are employed, wherein a continuous or semicontinuous member 66 is installed and secured to a plurality of the anchors 160. In such a case, the member 66 can have portions that extend towards the runway sidewall 64 in between the anchors 160. Or, a continuous member 66 is employed, wherein any gap between member 66 and sidewall 64 of runway 52 is filled with base material.

Turf 54, 170 and 192 is secured via devices 72 (e.g., galvanized staples) to the member 66 as described above. The turf 54, 170 or 192 is also secured to the base material (e.g., 70, 78/162) via one or more pinning devices 74 and/or mastique or glue between the turf and the base. As described above, either a weed barrier 56 or a sheeting membrane 76 is provided between the turf and the base material in one embodiment.

While concrete is one suitable material for the anchor 260, other materials are also suitable. Those materials include asphalt, wooden member(s), channel drain(s), solid metal beam(s), hollow metal beam(s), solid synthetic beam(s), hollow synthetic beam(s), structural member(s) and any combination thereof. The member 66, besides being a composite stud as described above, can also be any of the materials or structures described for anchor 260.

As illustrated in FIG. 20, anchor 260 defines a notch 262. The member 66 is fitted into notch 262, so that the width of the anchor 260 in the notched and unnotched area is approximately the same. In an alternative embodiment, anchor 260 does not define notch 262, wherein member 66 simply attaches to the substantially continuous side surface of anchor 260.

In the embodiment illustrated in FIG. 20, the member 66 is shorter by a certain distance than a length of the leg 263 of the notch 262. That allows the turf 54, 170 or 192 to extend slightly above, flush or slightly below the top of the leg 263 of the notch 262. In an alternative embodiment, the leg 263 of the notch is substantially flush with the member 66, wherein the turf covers additionally the top of the leg 263 of the notch 162 of the anchor 260.

Member 266 is installed to anchor 260 via any of the mechanisms described above. In one example, one or more ramsets 68 are used to pierce and extend into the concrete. Suitable ramsets 68 can alternatively be used to couple the anchor 260 to the side 64 of runway 52. It is not required, however, to fasten the anchor to the runway 52.

Figure 21:
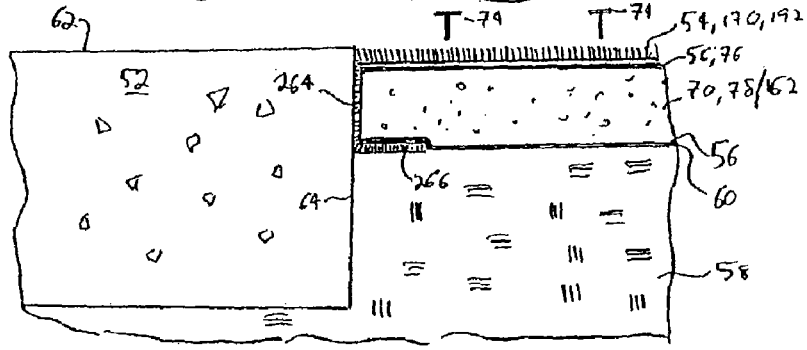

Referring now to FIG. 21, in another alternative embodiment, the weight of the base material 70, 78/162 is used to secure the turf 54, 170 or 192 along the sidewall 64 of runway 52. The turf of FIG. 24 includes a vertically extending section 264 that is crimped between the runway sidewall 64 and the base material 70, 78/162. The turf additionally includes a horizontally extending section 266 that is crimped between the base 70, 78/162 and the top surface 60 of soil 58. In an embodiment alternative to the one illustrated in FIG. 21, only the vertically extending section 264 is employed, and not the horizontally extending section 266. Furthermore, the vertically extending section 264 can extend for any suitable distance along the runway sidewall 264 (e.g., not all the way to the base).

As illustrated, a flow-through weed barrier 56 or a waterproof membrane 76 is employed between the turf and the base. A flow-through membrane 56 is alternatively or additionally employed between the base and the soil 58. Mastique, glue and/or one or more pinning devices 74 are used additionally to attach the turf to the base.

The invention of FIG. 21 enables the turf to be installed without attaching a member 66 to the runway 52. It may be desirable to sawcut or otherwise modify and make smooth the sidewall 64 of runway 52. Such modification aids the smooth insertion of the vertical section 264 between the runway 52 and the base material. Such modification may also reduce the likelihood of crimping or folding occurring in the artificial turf 54, 170 or 192 when it is folded over and pulled taught.

In the illustrated embodiment of FIG. 21, sections 264 and 266 include grass-like fibers. In an alternative embodiment, a length of the turf backing without fibers is used for sections 264 and 266 wherein the fibers begin where the turf begins to extend along the top of the base at the base 70, 78/162.

Figure 22:
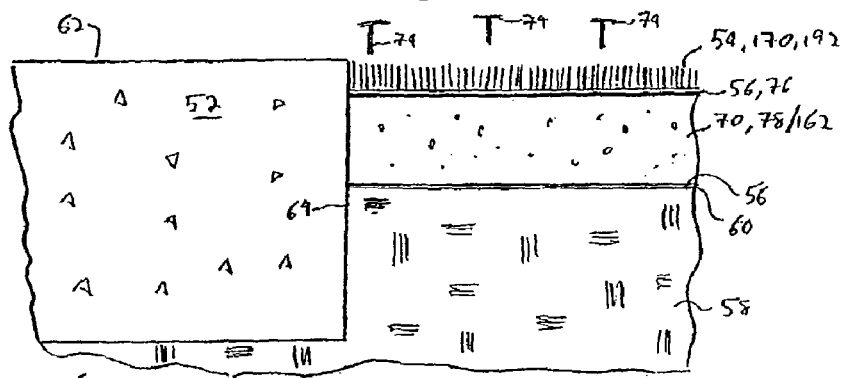

Referring now to FIG. 22, a further alternative embodiment for securing the artificial turf of the present disclosure is illustrated. In FIG. 22, the pinning devices 74 are used in such a frequency along the sidewall 64 of the runway 52 so that the turf 54, 170 or 192 does not lift up from the base 70, 78/162 due to the forces of nature or the force of a jet engine blast. For example, spacing the pinning devices 74 apart approximately six inches along the sidewall 64 is one suitable spacing for the pinning devices 74. One suitable pinning device is described above in connection with FIG. 4. Another suitable pinning device is a ⅜ inch thick by six inch long rebar formed in the shape of a "T". The "T" pin can be thicker or narrower or longer or shorter than ⅜×6 inch as desired. In one embodiment, the "T" pin 74 is suitable structurally be driven, for example, by a mallet to pierce the compacted rock base 70. The pinning device 74 may or may not extend all the way through the base layer 70, 78/162.

The sidewall 264 may or may not be sawcut modified or otherwise made smooth for the embodiment illustrated in connection with FIG. 22. Because there is no member abutting the sidewall 64, it is less important in FIG. 22 to have a flush concrete or asphalt surface for the runway 52. Alternatively, the edge of the turf 54 is modified to correct or compensate for any inconsistencies in the sidewall 64. The embodiment of FIG. 22 also includes any of the combinations of flow-through barrier 56 and/or sheeting membrane 76 discussed herein.

Figure 23:
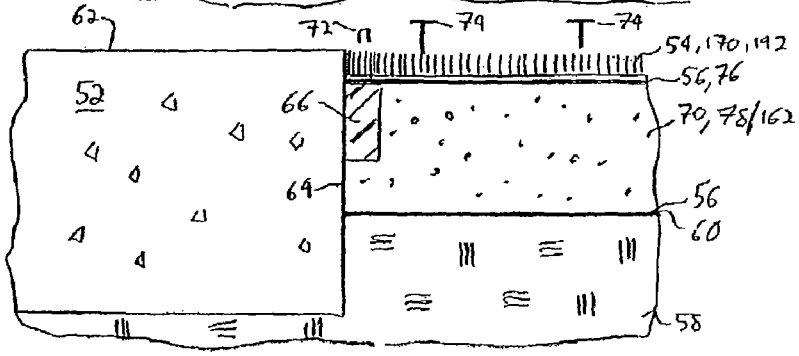

Referring now to FIG. 23, a further alternative embodiment is illustrated for securely installing the artificial turf along the sidewall 64 of the runway 52. The invention of FIG. 23 is very similar to the embodiments disclosed in connection with FIGS. 3, 7, 11 and 14. The member 66 in FIGS. 3, 7, 11 and 14 is either glued, fastened or otherwise suitable attached to the sidewall 64 of the runway 52. Here, the member 66 is not fixedly attached to runway 52. That is, in the illustrated embodiment, the member 66 is held firm against the sidewall 64 of the runway 52 via forces from the compacted base 70 or the arrester base 78/162. The embodiment of FIG. 23 eliminates a step in the installation process (attachment) versus the processes described above.

In an embodiment, the base material is poured and compacted if necessary up to the point where the member 66 is to be installed. The member 66 is then loosely placed against the sidewall 64 of the runway 52. The remainder of the base is then poured behind the member 66, pushing such member up against the sidewall 64 of the runway 52. The base 70 is compacted, which further forces the member 66 against the runway 52.

In one embodiment, the runway (including the shoulder thereof) is sawcut, modified or otherwise made to be flush to provide a smooth surface against which the member 66 abuts. The force of the base material should also help to bend the somewhat flexible member 66 or plurality of members 66 so that they conform to the contours of sidewall 64 of runway 52.

In FIG. 23, pinning devices 72 and 74 are employed as described above. The embodiments of FIG. 23 also include the weed barrier 56 and sheeting membrane 76 variations disclosed above.

Figure 24:
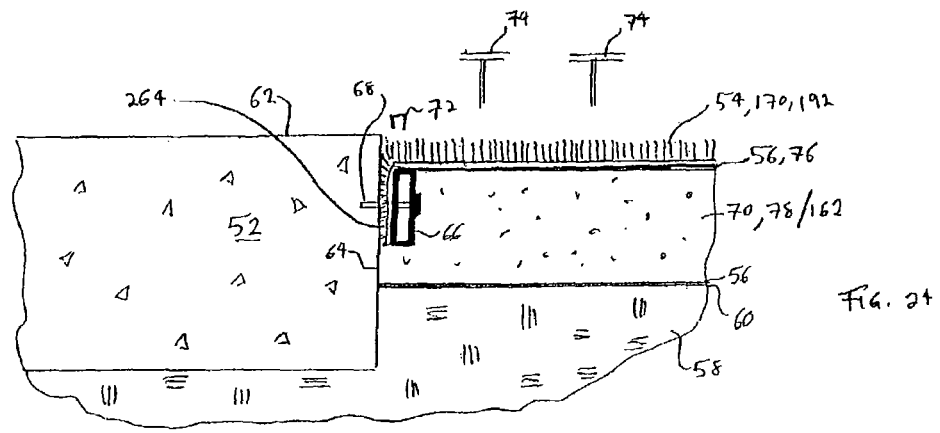

Referring now to FIG. 24, a further alternative embodiment is illustrated. It should be appreciated that member 66 in FIGS. 23 and 24 can be any of a variety of different types of members 66. For example, the member 66 is any one of the structures or materials described above for the anchor 260 in connection with FIG. 20.

In the embodiment illustrated in FIG. 24, the member 66 is a channel drain. A channel drain is a structure known to those skilled in the art of landscaping, civil engineering and drainage systems. Channel drain 66 in an embodiment is partially open on top to allow water that drains off of runway 62 to flow into the lumen defined by channel drain 66. The water collects inside channel drain 66 and flows in one or both directions towards one or two openings, respectively, at the end of the drain 66, which is/are located at any point convenient to the airport along the runway 52. Channel drain 66 is strong enough to support the weight and force of the ramset 68, as well as the base material, including compacted base 70.

The embodiment of FIG. 24 includes one or more or all of the pinning devices 72 and 74, as well as the weed barrier 56 and/or the membrane 76. The embodiment is also suitable for any of the different turfs 54, 170 or 172, as well as base materials 70, 78/162. In FIG. 24, a section 264 is folded between sidewall 64 and member 66. As in FIG. 21, section 264 may or may not have grass-like strands.

Figure 25:
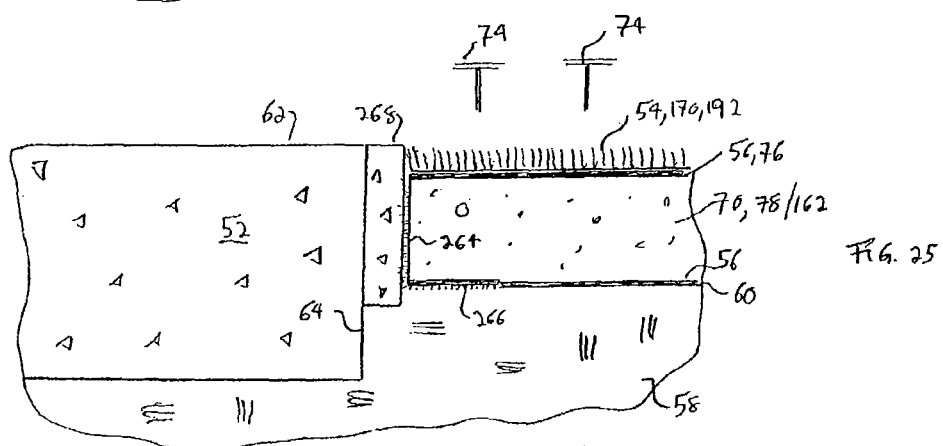

Referring now to FIG. 25, a further alternative embodiment for installing the artificial turf 54, 170 or 192 securely against the runway 52 is illustrated. In FIG. 25, the vertical section 264 is sandwiched between the base 70 or 78/162 and a member 268. In one embodiment, member 268 is poured in between the base material and the runway 52 after the turf has been folded over the base material. In one alternative embodiment, the material is further folded between the base material 70, 78/162 and the top surface 60 of soil 58. It should be appreciated, however, that member 268 can alternatively be any of the structures or materials disclosed herein for the member 66. Section 266 is optional. Vertical section 264 and horizontal section 266 may or may not include grass-like fibers as described above.

The embodiment of FIG. 25 allows for a smooth transition between the side of the runway 52 and the turf and base without having to sawcut or otherwise make flush the sidewall 64 of the runway 52. That is, the poured concrete member 268 compensates for any imperfections in the sidewall 64 of runway 52.

The embodiment of FIG. 25 includes any of the turfs 54, 170 or 192 described herein. The embodiments also include either base material 70 or arrester base material 78/162. Further, any of the weed barrier 56 and sheeting membrane 76 embodiments described above can be employed with the embodiment of FIG. 25. The turf is further secured to the base material via pinning devices 74, glue or mastique.

Figure 26:
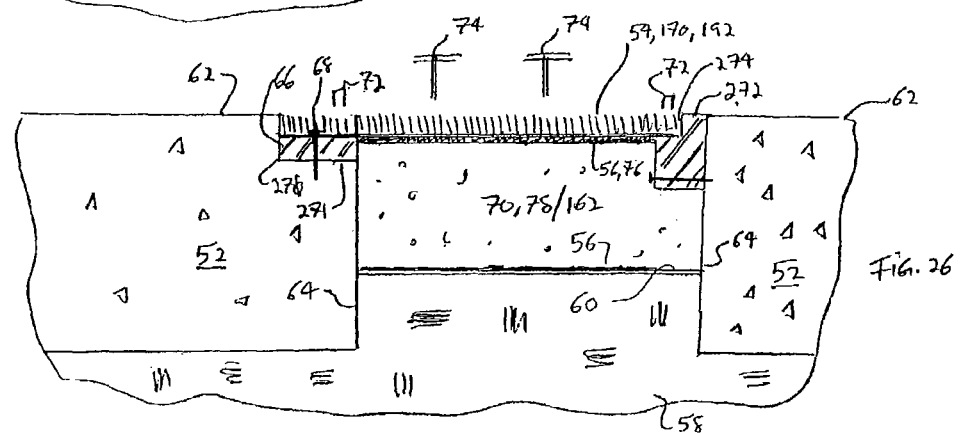

Referring now to FIG. 26, a number of alternative embodiments for securing the turf along the side of the runway 52 are illustrated. In one alternative embodiment, a notch 270 is sawcut into the sidewall 64 of runway 52. The notch is formed having substantially flush sidewalls, especially the horizontal sidewall 271, which abuts a horizontally mounted member 66. Member 66 includes any of the variations discussed above. The member 66 is held firm against the notch 270 via glue, mastique and/or ramsets 68 as described above. The turf is secured to the member 66 via the ramset 68, glue, mastique and/or a plurality of staples 72. In an alternative embodiment, the turf is sandwiched in between the member 66 and the horizontal wall 271 of the notch 270, similar to the sandwiched turf in FIG. 24.

Further alternatively, an alternative member 272 defines a notch 274 into which the turf 54, 170 or 192 resides and is secured. The turf is secured to the notch via a suitable glue, mastique and/or a pinning device 72. One or more ramsets 68 secures the alternative member 272 to sidewall 64 of runway 52 alone or in combination with a suitable glue/mastique. The sidewall 64 of runway 52 is sawcut, modified or otherwise made to be flush with member 272.

Any of the embodiments discussed in connection with FIG. 26 is suitable to be used with any of the weed barrier 56/membrane 76 embodiments described herein. Further, one or more pinning devices 74 is used to further secure the turf 54, 170 or 192 to the base 70, 78/162.

Referring now to FIG. 27, in another alternative embodiment, the weight of the base material 70, 78/162 is used to secure a fabric, woven, sheeted or otherwise flexible attachment piece or material 280. In one embodiment, material 280 is made of a geotextile or weed barrier material, such as flow-through barrier 56. In another embodiment, material 280 is made of the membrane material 76. In further embodiments, the piece 280 is made of canvas, a polymer mesh, a polymer sheet, a fabric mesh, a fabric sheet and any combination thereof.

As illustrated, a flow-through weed barrier 56 or a waterproof membrane 76 can be employed additionally between the turf and the base. A flow-through membrane 56 is alternatively or additionally employed between the base and the soil 58. Horizontal section 284 is a weed barrier in one embodiment, forming a part of or being addition to layer 56. Mastique, glue and/or one or more pinning devices 74 are used additionally to attach the turf to the base. Material 280 is fastened or attached to base 70, 78/162 via pinning devices 74 or otherwise temporarily weighting down until the turf or synthetic cover is placed onto piece 280.

While the invention of FIG. 27 enables the turf to be installed without attaching a member 66 to the runway 52, it may be desirable to sawcut or otherwise modify and make smooth the sidewall 64 of runway 52 to properly align the top of the turf with the topside 62 of runway 52. Such modification also aids the smooth insertion of the vertical section 282 of material 280 between the runway 52 and the base material 70, 78/162. Base material can also be dirt or compacted dirt. Such modification may also reduce the likelihood of crimping or folding occurring in the piece 280 when it is folded over and pulled taught.

Horizontal section 284 of material 280 can extend for any suitable distance, e.g., six inches to fifteen feet. Horizontal section 284 is also optional and only vertical section 282 is used in one embodiment. Section 286 of material 280, which may be for example one inch to fifteen feet long is pulled taught over the base 70, 78/162. One or more pinning devices 74 can be used to hold section 286 in place until turf 54, 170, 192 is laid in place over section 286.

In one embodiment, the turf is glued or mastiqued to section 286 in various places to the piece 280. In one embodiment, the section 286 is glued continuously along the edge of the runway 52 to the material 280. Additionally or alternatively, turf 54, 170, 192 is fastened to the section 286 before the fastened section 286/turf 54, 170, 192 is pulled taught over the base. One or more fasteners 288, such as bolts, pins, hooks, buttons, clamps, snaps, zippers, etc., is used to fasten the turf to material 280. If used instead of glue, the turf is more readily removed and replaced if damaged. Turf 54, 170, 192 is held in place additionally via pinning devices 74 and infill as described above.

Although not illustrated, in an alternative embodiment, material 280 is wedged between two portions of base material 70, 78/162. One of the portions of material abuts the runway 52. A section 284 can extend beneath either or both of the portions of base material.

Referring now to FIG. 28, a number of alternative embodiments for the present disclosure are illustrated. In any of the embodiments described herein, as is the case with any of the turfs 54, 170 and 192 disclosed herein, an infill layer may or may not be used. As described above, the infill helps with sound absorption, as well as adding weight to help hold the turf against the soil surface or base. On the other hand, it is desirable to reduce costs wherever possible, and to make installation as simple as possible. Eliminating the infill layer decreases cost and simplifies installation. Eliminating the infill layer also makes cleaning the turf, as well as repairing damaged portions of the turf easier.

An alternative attachment system 300 is illustrated in FIG. 28. System 300 includes the member 66, which is attached to the sidewall 64 of the runway 52 via a suitable glue, mastique and/or one or more ramsets 68 as described above. As further described above, the sidewall 64 is sawcut, modified or otherwise made flush to abut the side of member 66. Member 66 includes any alternative variation for the member described herein including all structures and materials called out for of anchor 260 of FIG. 20.

Extending outwardly from member 66 are a plurality of structural braces 302. Braces 302 include any of the variations, i.e., materials and/or structural shapes, described above for the member 66 and anchor 260. For example, braces 302 are, in one alternative embodiment, poured or prefabricated concrete slabs. In alternative embodiments, however, the braces 302 are hollow or solid, metal, plastic or other suitable beam or structural member, as described above.

In one embodiment, braces 302 are of the same recycled composite material as disclosed above for member 66. Braces 302 in an embodiment have flanges 304 that allow braces 302 to couple securely to member 66. In one embodiment, flanges 304, and indeed the edge of brace 302, is produced or cut at an angle that allows the braces 302 to follow the desired grade (e.g., 2%) of the ground as it extends and slopes away from the runway (including runway shoulder).

The system 300 allows for a number of variations to be used for the base material applied beneath the artificial turf. As stated above, one of the primary goals of the present disclosure is to provide a stable base that allows security vehicles to maneuver easily along the system in any type of weather to reach an accident or for any other reason. Further, the system, in one embodiment, supports the weight of an aircraft, such as a jetliner that has, for whatever reason, veered off the runway 52.

The compacted base 70 and each of its alternatives described in connection with FIG. 3 is also a suitable base for the system 300. Alternatively, an uncompacted base 306 is also suitable. The uncompacted base 306 in an embodiment includes rock or crushed rock with variously sized particles, for example, from ¾ inch down. In another embodiment, rock of approximately the same size is used. Still further, arrester base material 78 can be used beneath braces 302, base 70 or base 306.

Because the braces 302 provide support, the rock base does not have to be as strong. The rock base 306 can be tailored more for drainage than is the compacted base 70. Using rock of a similar size provides strength so that a aircraft tire does not sink between braces 302, while having more room in the interstices between the similarly sized rock particles to allow water to flow more easily therethrough.

In a further alternative embodiment, a strong, perforated or porous sheet 308 is applied on top of the braces 302. The space between the braces 302 is backfilled with dirt 58 after the braces 302 are installed. The perforated sheet 308 is then applied on top of the soil 58 and braces 302. The turf 54, 170 or 192 is then installed, with or without infill on top of the perforated or porous sheet 308. The perforated or porous sheet 308 is made of a strong polymer or plastic material in one embodiment. In an alternative embodiment, perforated or porous sheet 308 is metal.

In a still further alternative embodiment, a stabilizing frame 310 is employed. Frame 310 can be employed in addition to or in place of the member 66. In the illustrated embodiment, frame 310 is placed flush up against sidewall 64 of runway 52. Frame 310 is made of any suitable plastic, metal or wood material. In one embodiment, frame 310 is prefabricated with turf or other covering preinstalled, brought to the airport or airfield, set in place and attached to other frames 310 and/or runway 52.

In one embodiment, frame 310 includes a pointed section 312 that aids the frame when an operator attempts to force the frame into non-excavated soil 58. Alternatively, soil 58 is excavated down to a level and the frame 310 is placed on the excavated soil surface. The top of the frame 310 sits a desired distance below the top surface 62 of runway 52. Here, the bottom of frame 310 can include flange sections (not illustrated) that tend to prevent frame 310 from sinking into the dirt, for example, due to the weight of a safety vehicle or an aircraft that has veered off of runway 52.

Frame 310, in one embodiment, is attached via flanges 304 and ramsets 68 to the sidewall 64 of runway 52. In an alternative embodiment, frame 310 is connected to a member, such as member 66, which is, in turn, fastened to runway 52. In a further alternative embodiment, frame 310 is not connected to runway 52 in any manner and may or may not be connected to other abutting frames. The frames can be provided in any desired sizes, for example, in six foot by six foot square sections, or other distance suitable for transportation. The walls of frame 310 can be perforated to aid in drainage and can be any suitable desired length, e.g., two inches to 10 inches. Frame 310 includes internal members and crossbracing as necessary to strengthen the frame so that the frame does not deform or does not deform substantially due to the weight of a runaway aircraft.

As illustrated, frame 310 can be filled in with various materials. In one embodiment, openings defined by the frame are filled with soil 58. In an alternative embodiment, the openings are filled with compacted base materials 70. In a further alternative embodiment, the base material includes uncompacted particulate 306. In one embodiment, the base material includes sand or compacted dirt. As further illustrated, the perforated sheet 308 in one embodiment is employed in combination with frame 310.

Flow-Through Matting as an Alternative to Artificial Turf

In any of the preceding embodiments disclosed in connection with FIGS. 1 to 28, the artificial turf 54, 170 or 192 can be replaced alternatively with or used alternatively with a relatively smooth perforated or porous mat 316. Mat 316 either defines perforations 318, is porous, open celled, includes granules bonded together, is woven or is otherwise constructed so that water can drain through mat 316. Unlike sports applications, the synthetic covering (the term "synthetic covering" includes any embodiments described herein for the artificial turf and for the flow-through mat of the present disclosure) used herein does not have to be comfortable to walk on or be suitable for playing a sports game. Indeed, the disclosure in connection with the repelling turf 178 (FIGS. 12 to 14) indicates that it is desirable to have a surface that is uncomfortable to walk on. In that regard, mat 316 or the colored fibers of the artificial turfs can be black so as to absorb the sun and provide a surface that is too hot for a bird or animal to stand on for an appreciable period of time.

Mat 316 is desirable versus artificial turf because it is cheaper to produce and install. Mat 316 does not use an infill layer of particulate or sand (please note that in an embodiment, the artificial turf does not include an infill layer either). Mat 316 in one embodiment is green or otherwise includes an image of an area of grass so as to appear, at least from an airplane, like grass. Mat 316 is also very well suited for displaying logos or advertising that can be seen from an airplane taking off landing at an airport.

To that end, the present disclosure expressly contemplates a method for financing the systems disclosed herein (i.e., for mats and artificial turf). That method involves the turf installer obtaining permission from an airport to rent or sell space on the turf. The installer can directly or through an agent sell advertising space to one or more advertisers or entities. The money obtained from the advertising can partially or completely pay for the turf with respect to the airports. The airports can obtain the turf free or at a substantially reduced cost. The installer can rent or sell the advertising space and change advertising as desired. In that manner, the turf can continue to generate revenue for the installer and/or advertiser.

Mat 316 can be anywhere from ten to ninety percent open to allow for proper flow-through drainage. Such percentage open is achieved alternatively through perforations, pores, spaces between granules, spaces between weaves, etc. Mat 316 can be applied by hand, by machine or be sprayed in place. As seen in FIG. 27, mat 316 in one embodiment includes protrusions 314, e.g., wedges, triangles, diamonds, pyramids or other shapes that enhance the sound absorption ability of mat 316. Placed in safety areas alongside runways or taxiways, mat 316 helps to absorb sound from aircraft taking off and landing. Those protrusions 314 not only help with sound absorption but also with chemical spill hazard reduction wherein the mat 316 or any of the turfs, infill and/or base materials soak up chemical spills.

Mat 316 is made of plastic, rubber, any other type of suitable synthetic material and any combination thereof. In an embodiment, the mat 316 is a plastic material selected from: acrylic, CPVC, CTFE, delrin, Kel-F, kynar, nylon, polycarbonate, polyester, polyurethane, polyethylene, polyimide, polypropylene, polystryrene, PVC, PVDF, ULTEM and any combination thereof. The plastic mat has any suitable desired thickness; for example, ⅛ inch (3.18 mm) to three inches (7.62 cm). In another embodiment, the synthetic mat 316 is made of a rubber material, such as: buna-N, butyl, EPDM, gum; hard, natural sponge, neoprene, silicone, vinyl, viton and any combination thereof. The rubberized mat is any suitable desired thickness, such as ⅛ inch (3.18 cm) to three inches (7.62 cm).

One suitable set of materials for the matting 316 is made by Recreational Surfaces of 68 Southleigh Road, Denvilles, Havant, Hampshire, U.K. The materials are marketed under the tradenames Polyflex 942™, Polyflex 950-4™ and Polyflex 950-3™ (multiple and single layered). Mats 316 can be colored to produce any type of advertising, logos, airport markings, etc. The mat 316 can have multiple layers. The materials exhibit good physical characteristics (adhesion, elongation, tensile strength, etc.) and resistance to chemical degradation and fire. In one embodiment, mat 316 includes rubber granules bound with polyurethane or other rubber or polymer binding agent. In another embodiment, mat 316 includes polymer granules bound with polyurethane or other rubber or polymer binding agent. The above materials are laid by hand, by machine or are sprayed in place.

The mat 316 is firmly attached via pinning devices 74 to any of the base materials disclosed herein, braces 302 or frame 310 (for purposes of describing the present disclosure, frame 310 includes a collection of braces 302). The mat 316 can also be stapled via devices 72 to the frame 310 (including braces 302) and member 66. The mat 316 is further alternatively glued or attached via mastique to either the frame 310 (including braces 302), member 66 and/or the base material. Different sections of mats 316 can also be glued or pinned together. For example, a strip of weed barrier 56 or membrane 76 can be placed beneath the seam between two sections of mat 316, wherein both sections are glued or pinned to the barrier/membrane. Separate sections can be removed to change or replace advertising.

In one embodiment, mat 316 is adhered to a flow-through barrier 56, which is in turn fixed or pinned to a flow-through base material, e.g., base 70, 78/162. Mat 316 is then further held in place via pinning devices 74. FIG. 27 illustrates the above arrangement. The weed barrier 56 can be folded under the base. Alternatively or additionally a member 66 or anchor 260 is used to further secure mat 316 in safety areas around airports and airfields. Mat 316 and any of the systems disclosed in connection with FIGS. 1 to 28 is alternatively installed along roadsides, riverbanks, mountainsides, railway lines, and in the interior of racetracks, such as auto race tracks and horse race tracks. Those locations are also well suited to display advertising and logos.

In an alternative embodiment, a section of flow-through rubberized mat 316 is installed in combination with artificial turf. Further, as illustrated, any of the embodiments described in connection with FIG. 28 also includes, when desired, a flow-through weed barrier 56 or waterproof membrane 76 applied between the synthetic covering (turf or mat) and or between the base material and soil 58.

Power, Heating and Fire Suppression

Referring now to FIG. 29, one embodiment of a solar powered system 320 is illustrated. System 320 includes a plurality of reflecting mirrors 322 that are set up to track the sun automatically or be in a fixed position. Mirrors 322 are shaped and mounted in an orientation to concentrate the incident solar insulation on their surfaces and to focus the solar concentrated flux on a central mirror 324. The mirrors are shown mounted above ground, which is advantageous to keep the mirrors from becoming covered with snow, dirt, sand and other debris. In an alternative embodiment, mirrors 322/324 are embedded into the turf or synthetically covered safety system, wherein the mirrors are surrounded, at least partially by artificial turf or a flow-through porous mat.

The mirrors 322 form rows, e.g., one or more rows, on each side of the central mirror 324, which extends along the runway with the rows of mirrors 322. System 320 is placed on one or both sides of a runway 52 (including taxiways). The actual total area of reflecting surface of the mirrors needed depends on factors such as whether mirrors 322 track the sun or area fixed in position and the reflectivity of mirrors 322. The amount of land needed to produce an appreciable amount of power, e.g., enough to run at least the runway lighting system should be provided by the area adjacent to a commercial runway or even a smaller airport runway.

System 300 takes advantage of the fact that the safety systems of the present disclosure at least involve the removal of the natural grass surface in safety areas and can involve the excavation of an appreciable amount of the soil 58 beneath the natural grass. As illustrated, the major components of solar system 320 may be provided outside of the safety zone (having the aircraft supporting base). That outside area may or may not be covered with a synthetic covering (turf or mat). As illustrated, the base in the safety area can be any base described herein, e.g., base 70, arrester base 78/162, use braces 302, perforated panel 308, the frame 310, soil 58 and any combinations thereof.

The collected solar insulation from each of the mirrors 322 is transmitted to a central mirror 324, from which the solar flux is reflected down a channel through a glass lens 328 and into the aperture of a boiler 330, where it heats the boiler walls 332 and the water therein, converting the water to superheated steam. Boiler 330 has an insulated outer surface and loses very little heat through walls 332. The placement of a glass lens 328 above the aperture of boiler 330 separates the boiler 330 from the channel 326 and insures that heat from the boiler 330 is trapped around the boiler and not permitted to escape up through the channel 326. Silica glass may be used for the lens 324 or another suitable material that is capable of withstanding the considerable heat generated by the solar flux. The walls of the channels 326 are covered in one embodiment with a polished reflecting material to reflect downwards any solar flux light that strikes the walls of channel 326.

Superheated steam from the boiler 330 is converted to electric power via a steam turbine 334 that drives an alternator or electrical generator 336. A condenser 338 and pump 340 is also provided for converting the steam back to water and returning water to the boiler 330. The steam turbine 334 is located in an underground chamber within a few yards or meters of the boiler 330. The piping between the boiler 330 and the turbine 334 is fully insulated by wrapping and the surrounding earth to reduce heat loss.

Turbine 334 is connected by shaft to an alternator or generator 336, which produces electrical power and delivers it to one or more energy storage devices 342. The energy storage devices 342 can be any desired type of storage device, such as a battery, capacitor, flywheel, pumped hydro-storage, compressed air energy storage and any combination thereof. One or more batteries can be of a type selected from: polysulfide bromide flow battery, vanadium redox flow battery, zinc bromide flow battery, sodium sulfur battery, lithium ion battery, lead-acid battery, metal air battery and any combination of those batteries.

The energy storage devices 338 provide power to the airport safety areas as well as any other desired areas of the airport or airport surroundings. For example, system 320 can drive runway or taxiway lights or lights 345 that are used alone or in combination with marking fibers to provide indicia or advertising that can be seen by a person taking off or landing at the airport (as described above). System 320 can supply power to illuminate any of the runway markings defined by the marking fibers described above. Further, lights 345 can be used alone to provide any of the airport markings described above (FIGS. 14 to 19) or to power standard runway lights.

The water that is used by boiler 330 to make steam is recycled. Upon passing through the steam turbine 334, the steam passes through a condenser 338 and is pumped via pump 340 through a turf or synthetic mat heating system 350. As seen in FIG. 29, system 350 advantageously uses the heat created by the steam based system 320, which needs to release heat to replace water into boiler 330. The condenser 338 and pump 340, as illustrated, are placed alternatively upstream or downstream of the heating system 350 to allow hot water or steam, respectively, to flow through manifold pipe 344 and a plurality of heating pipes 354. Hot pipes 354 melt snow collecting on top of and adjacent to the pipes/tubes 354 and help to further provide a growth retarding and bird/animal retarding environment.

The material, material thickness, number/frequency and length of tubes 354 are chosen so that the pipes do not become hot enough to burn humans or animals/birds. Pipes 354 are spaced apart a suitable distance to melt snow off of the safety area adjacent to the runway/taxiway 52. In one embodiment, the pipes are laid on top of the infill layer or between the turf fibers if no infill is used. Or, tubes 354 are laid on top of the synthetic mat. Pipes/tubes 354 have any desired cross-sectional shape, e.g., circular, oval, rectangular, tape-like, etc. In a still further alternative embodiment, heat conducting tubes are imbedded into or are otherwise integral with (i.e., integral but on top of) the mat or turf matting and have any desired cross-sectional shape.

System 320 is steam driven in one embodiment but alternatively employs photoelectric panels 322 instead of mirrors 322, for example, if the flux through channel 324 cannot be concentrated enough to heat the boiler 330 to generate steam. Or, the reflective mirrors 322 may prove bothersome to pilots, traffic control or ground crews. Or, for any other reason it may be desirable for system 320 to be a photoelectric system. Such a system does not require the central mirror 324, channel 326, glass 328, boiler 330, turbine 334, generator 336, condenser 338 or pump 340. The photoelectric panels 322 are again mounted off of the ground in one embodiment to avoid being covered or traveled over inadvertently. Alternatively, photoelectric panels 322 are mounted into the ground, either as part of one of the base materials described above or outside of same.

Photoelectric panels 322 convert solar energy into electrical energy as is well known. That electrical energy is stored in one or a series of batteries or other type of storage device 342 (all embodiments listed above for storage device 342 are applicable to the photoelectric version of system 320). Panels 322 are connected in series or parallel to storage devices 342 to concentrate energy storage in the devices to build higher relative voltages or currents, respectively.

Storage devices 338 drive any of the above mentioned outputs, such as runway/taxiway lights, advertising lights 345, airport markings, etc. Additionally, the devices drive a resistive element-based heating system, which is used instead of the steam-based heating system described above. Resistive elements are supplied externally or integrally with the synthetic covering (turf or mat) to electrically heat-up and melt snow, etc. The electrically resistive elements are in one embodiment in the form of a resistive tape or thin strip secured on top of or integrally formed on top of the turf backing, infill layer or on top of the flow-through mat. The electrical system is advantageous in one aspect because it is easier to back-up, namely, a back-up generator or other electrical power system can be used alternatively when solar power becomes spent.

System 320 (steam or photoelectric) can also be used to drive a fire suppression system 360 illustrated in FIG. 29. Suppression system 360 includes a controller (not illustrated) that in one embodiment is maintained at the control tower, where airport controllers are able to monitor sensor outputs for different grid portions of safety areas at the airport. System 360 can be backed-up electrically in case solar power becomes spent. It should also be appreciated that while FIG. 29 shows all three systems 320, 350 and 360, any one or combination of the systems is alternatively provided.

A source (not illustrated) of fire suppressant gas, such as $CO_2$ is provided at some location internal or external to the safety area. A water pipe 390 leads from the airport's regular water supply to the system 360. In case the main supply 360 is interrupted, such as by low water pressure during a fire, an auxiliary water supply is also provided. An auxiliary pipe 392 may provide water from an auxiliary source of water or from the same source but through a different path. One or more pump 370 is provided to pump the water. The $CO_2$ is pressurized to drive the $CO_2$ to the safety areas.

The fire suppression system is automatically and/or manually controlled via the control tower. Strain gauge sensors 362 and/or smoke or heat detecting sensors 364 are provided to sense if an aircraft has stopped on the turf/mat or if a fire has occurred, respectively. Strain gauge sensors 362 are mounted below the turf/mat and look for an abnormal force or weight that is stationary, i.e., not just a vehicle or aircraft moving over the sensors 362. Smoke or heat detecting sensors 364 are provided on top of the turf/mat.

A fire suppressant liquid tank 366 is provided (e.g., in a remote location) and is in fluid communication with a water pipe 368 that allows water to flow from the source 370 into the tank 366 to pressurize the chemical therein and cause the chemical suppressant to flow through a valve 372. Valve 372 is actuated automatically or via a controller to control an amount of fire suppressant fluid that is able to pass through a venturi pump valve 374 positioned within the water pipe 376 leading from pump 370 to the chemical suppressant header 378. That pump 374 enables a mixing of the fire suppressant fluid with water before the mixture 380 flows through main 376 and to and through a plurality of conventional nozzles 378 positioned through, beneath or on the turf/mat.

The fire suppressant fluid is a detergent foam, a protein foam, an aqueous film forming foam, such as the LIGHT WATER™ brand of aqueous film forming foam sold by 3M Corporation, other suitable chemical suppressant and any combination thereof. Aqueous film forming foams are particularly advantageous in that they are designed to be used with water and, when proportioned with water and applied with conventional foam or water/fog equipment, generate a white foam with the ability to make water float on flammable liquids, which are otherwise lighter than water. The foam spreads over the surface of the burning material and forms a blanket in the manner of conventional foams. The aqueous solution drains from the foam bubbles and forms a vapor sealing film that floats on the surface of the burning matter and suppresses volatile vapors, sparks, or the like. The chemical fluid has a low surface tension in one embodiment provides excellent penetrating and wetting qualities.

When sensors 362/364 sense a stopped aircraft, fire or smoke, system 360 is automatically activated. A signal is sent to the control tower that knows the zone of the safety area from which the sensor is located. The control tower operator can shut down the system or manually trigger the suppression system in other zones if needed. The chemical suppressant valve 372 and pump 370 are triggered, automatically or manually, as is the $CO_2$ on/off valve (not illustrated). $CO_2$ replaces oxygen, which is a component of combustion. $CO_2$ 384 is released via nozzles 382 in a manner similar to the release of the chemical mixture 380 from nozzles 378.

If it is determined that the $CO_2$, in displacing oxygen, will deprive exiting passages, ambulance crews, paramedics and other safety personnel of oxygen, the $CO_2$ usage can be cut back or eliminated altogether. The present disclosure, however, contemplates employing any suitable and safe fire suppression material as well as providing a system that soaks up and suppresses chemical spills caused by airport accidents.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention is claimed as follows:

1. An airport safety system comprising:
    a runway or taxiway area of airport land wherein natural grass has been removed substantially from the ground; and
    artificial turf having a plurality of synthetic fibers, the turf including multiple sections fastened together to form a large, heavy turf mass, the turf mechanically and/or adhesively, securely installed in the area without the use of a layer of infill dispersed between the fibers, the turf delineating at least a portion of one of the taxiway or runway.

2. The system of claim 1, which includes a growth retarding base beneath the turf.

3. The system of claim 1, wherein the growth retarding base is selected from the group consisting of: rock, sand, concrete and any combination thereof.

4. The system of claim 1, which includes at least one membrane positioned beneath the turf.

5. The system of claim 1, wherein the turf is attached to the runway/taxiway.

6. The system of claim 1, wherein the turf is attached to a member that is attached to the runway/taxiway.

7. The system of claim 6, wherein an edge of the runway/taxiway is modified to be positioned against the member.

8. The system of claim 6, wherein the member is selected from the group consisting of: a solid metal beam, a hollow metal beam, a channel drain, a solid synthetic beam, a hollow synthetic beam, a wood beam, a structural member, and any combination thereof.

9. The system of claim 1, wherein the turf is attached to the ground via a mechanism selected from the group consisting of: glue, a pinning device, a flexible material secured in place with a base placed beneath the turf, and any combination thereof.

10. A method for increasing safety at airports comprising:
    (a) removing natural grass from a safety area at an airport having a runway or taxiway;
    (b) installing an artificial turf in the area without the use of a layer of infill, the artificial turf including at least one plastic selected from the group consisting of nylon, polypropylene, and polyurethane and configured and arranged to absorb aircraft fuel from an accident occurring on or near the turf; and
    (c) delineating at least a portion of one of the runway or taxiway with the installed turf.

11. The method of claim 10, which includes placing a growth retarding base beneath the turf.

12. The method of claim 11, wherein the growth retarding base is selected from the group consisting of: rock, sand, concrete and any combination thereof.

13. The method of claim 10, which includes positioning at least one membrane beneath the turf.

14. The method of claim 10, which includes attaching the turf to a runway/taxiway.

15. The method of claim 14, which includes attaching the turf to a member that is attached to the runway/taxiway.

16. The method of claim 15, which includes modifying an edge of the runway/taxiway to be positioned against the member.

17. The method of claim 15, wherein the member is selected from the group consisting of: a solid metal beam, a hollow metal beam, a channel drain, a solid synthetic beam, a hollow synthetic beam, a wood beam, a structural member, and any combination thereof.

18. The method of claim 10, which includes attaching the turf to the ground via a mechanism selected from the group consisting of: glue, a pinning device, a flexible material secured in place with a base placed beneath the turf, and any combination thereof.

19. An airport runway/taxiway system comprising:
    a base located adjacent to a taxiway; and
    an artificial turf glued to the base and installed without an infill material, the artificial turf including at least one edge defining at least a portion of an edge of the taxiway to help delineate the taxiway.

20. The airport runway/taxiway system of claim 19, wherein the base includes a material selected from the group consisting of: rock, crushed rock or concrete.

21. The airport runway/taxiway system of claim 19, the artificial turf displaying advertising.

* * * * *